US011561317B2

(12) United States Patent
Olsson et al.

(10) Patent No.: US 11,561,317 B2
(45) Date of Patent: Jan. 24, 2023

(54) GEOGRAPHIC MAP UPDATING METHODS AND SYSTEMS

(71) Applicant: SeeScan, Inc., San Diego, CA (US)

(72) Inventors: Mark S. Olsson, La Jolla, CA (US); Michael J. Martin, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 409 days.

(21) Appl. No.: 16/382,136

(22) Filed: Apr. 11, 2019

(65) Prior Publication Data

US 2019/0317239 A1 Oct. 17, 2019

Related U.S. Application Data

(60) Provisional application No. 62/656,259, filed on Apr. 11, 2018.

(51) Int. Cl.
*G01V 3/12* (2006.01)
*G01C 21/32* (2006.01)

(52) U.S. Cl.
CPC .............. *G01V 3/12* (2013.01); *G01C 21/32* (2013.01)

(58) Field of Classification Search
CPC .......... G01V 3/12; G01V 3/165; G01C 21/26; G01C 21/32; G06K 9/0063; G06K 9/00637; G06K 9/00651; G06K 9/4609; G06K 9/4671; G06K 9/6254; G06T 7/50; G06T 7/74; G06T 7/337; G06T 7/579
See application file for complete search history.

(56) References Cited

U.S. PATENT DOCUMENTS

| | | | | |
|---|---|---|---|---|
| 5,968,109 A | * | 10/1999 | Israni | G01C 21/32 701/532 |
| 6,047,234 A | * | 4/2000 | Cherveny | G01C 21/32 701/451 |
| 8,903,137 B1 | | 12/2014 | Guo et al. | |
| 9,465,129 B1 | * | 10/2016 | Olsson | G01V 3/15 |
| 2002/0184235 A1 | * | 12/2002 | Young | G01V 11/00 |
| 2009/0262974 A1 | | 10/2009 | Lithopoulas | |
| 2010/0092045 A1 | * | 4/2010 | Zimmer | G06F 16/29 382/113 |
| 2011/0181289 A1 | * | 7/2011 | Rushing | G01V 3/081 324/326 |

(Continued)

OTHER PUBLICATIONS

International Searching Authority, "Written Opinion ci the international Searching Authority" for PCT Patent Application No. PCT/US19/27106, dated Oct. 19, 2022, European Patent Office, Munich.

*Primary Examiner* — Alvaro E Fortich
(74) *Attorney, Agent, or Firm* — Steven C. Tietsworth, Esq.; Michael J. Pennington, Esq.

(57) ABSTRACT

Methods and systems for updating digital maps by refining map feature positions and improving map position accuracy are disclosed. Geographic map updating may include a base map element and an update element where the base map element may include a representation of the map area displaying features thereof and the update element may include a geographic feature identification element and one or more positioning elements. One embodiment includes identifying a point of interest's position data and updating the map data within a map region surrounding the point of interest.

14 Claims, 28 Drawing Sheets

(56) References Cited

U.S. PATENT DOCUMENTS

| | | | |
|---|---|---|---|
| 2013/0195363 A1* | 8/2013 | Janky | G06K 9/00 |
| | | | 382/195 |
| 2015/0219767 A1* | 8/2015 | Humphreys | G01S 19/43 |
| | | | 342/357.26 |
| 2017/0084037 A1 | 3/2017 | Barajas Hernandez et al. | |
| 2017/0160420 A1* | 6/2017 | Olsson | G01V 3/15 |

* cited by examiner

GEOGRAPHIC MAP UPDATING METHODS AND SYSTEMS

FIELD

This disclosure relates generally to methods and systems for refining map feature positions and improving map position accuracy in digital maps. More specifically, but not exclusively, the disclosure relates to methods and systems for updating and refining map feature positions and improving map position accuracy in mapping-based utility locating systems.

BACKGROUND

In typical mapping systems, images or other renderings of an area may be associated with locations on the Earth. For instance, an aerial photograph of a house may be assigned GPS coordinates corresponding to a general location on the Earth's surface. Likewise, other geographic feature may be assigned locations relative to the Earth's surface for various mapping purposes. In most applications, precision in the location of such geographic features is neither necessary nor possible. For instance, driving navigation towards a particular destination address may take a user in the general proximity of the destination leaving the user to figure out precisely where to go once generally near to the destination.

Additionally, the precision of location of geographic features may change over time. Movement of tectonic plates, shifting of ground, and/or other changes within the map environment may contribute to degrading of geographic feature location precision over time. Similarly, map position inaccuracies may result from the technique used in creating the map. For example, a series of contiguous satellite or other aerial photographs or image tiles may be joined together to create a map. In creation of such maps, due to the angles at which the image has been taken, curvature of the Earth or changes in elevation within each image, and/or small movements of the camera, may be adjusted for by rubber-sheeting techniques to distort such images to allow contiguous image tiles to be seamlessly joined. In some such maps, geographic features may be distorted, resulting in inaccurate geographic feature positions and thereby inaccurate maps.

Maps, as used with utility excavation operations (i.e. when digging into the ground), require the precise location of gas lines or other utilities to be known in order to facilitate safe excavations and avoid costly damage to infrastructure and human lives. Such maps may require the underground utility location to be known relative to a precise location on the ground level of the Earth's surface. Movement of map features and/or inaccurately mapped geographic features in utility mapping applications may result in incorrect excavation location and ultimate costly destruction of infrastructure and death or injury to crews excavating such utilities.

The initial generation of some such maps may be particularly expensive. For instance, maps involving indexing of high resolution aerial photograph to geographic features on the Earth's surface that have had their positions determined via real time kinematic (RTK) satellite navigation or other precise positioning techniques requires both highly specialized and expensive tools as well as a great deal of human labor to produce thus resulting in a high cost to generate such maps. Likewise, rubber-sheeting techniques may still introduce inaccuracies in the creation of some such maps. Often, the solution as known in the art is to recreate the map which may both extremely expensive and labor intensive. Other known solutions for updating geographic features or other known map features lack the resolution required for precise mapping applications such as with utility locating, mapping, and/or excavation.

Accordingly, there is a need in the art to address the above-described as well as other problems related to the creation and updating of maps, as well as for map systems with improved location precision relating to both a map itself and geographic or other features in the map.

SUMMARY

In accordance with various aspects of this disclosure, a geographic map updating system may include a base map element and an update element. The base map element may be or include a representation of the map area displaying features thereof. The update element may further include a geographic feature identification element and one or more positioning elements. The geographic feature identification element may identify geographic features (e.g., manhole covers, traffic arrows, painted marks on a street, and/or other marks or features) within an area on the Earth's surface coinciding with the same features represented within the base map element. For instance, the geographic feature identification element may include a human or artificial intelligence or like machine learning algorithms identifying a geographic feature within a mapped area along the Earth's surface that may, generally through pattern matching or like algorithms, be matched to features within the base map element of the same area. The positioning elements may determine the position of the geographic features identified along the Earth's surface by the geographic feature identification element. The positioning elements may include one or more devices or systems for determining the position of each geographic feature along the Earth's surface. For instance, a user may direct a laser rangefinder device working in tandem with global navigation satellite systems (GNSS) to determine the position of geographic features along the Earth's surface. Such positioning elements may further include light detection and ranging (LiDAR), inertial navigation systems (INS), optical tracking systems, and/or other like devices and systems for determining positions on the Earth's surface. Such position elements may generally be achieved through measurement at a point existing on the geographic feature referred to herein as a "reference point". For example, this reference point may be or include the center point of manhole cover, the tip of a traffic arrow painted on a street, or other point on a geographic feature that may coincide with the same point within the same feature within the base map element. The "reference point" may be the location point (e.g., the laser dot produced by a laser rangefinder device) in which position of the geographic feature is measured. The geographic map updating system may further include a processing element for comparing and updating base map element data according to update element data. Data may further be stored within a data storage element.

In another aspect, the present disclosure may include a method for updating the position of a geographic feature within a map. The method may include a step wherein a geographic feature is identified. In another step, a position measurement at a reference point of the geographic feature is determined. In some embodiments, a step may be included wherein photographs or other images of the geographic feature and surrounding environment may be generated. In another step, the geographic feature may be correlated to features representing the geographic feature within the base map. This step may include the use of pattern recognition, artificial intelligence, and/or other like algorithms or techniques to match geographic features between a base map and the updated geographic feature position data. In another step, the difference in position between reference points on the newly identified geographic feature and the same geographic feature within the base map may be determined. In another step, the image tile(s) or other feature region(s) containing the geographic feature may be translated based on the determined reference point position differences. In another step, the geographic feature position and related mapping data may be stored and optionally displayed.

In another aspect, the present disclosure may include a method for updating the position of a geographic feature within a map. This method may include a step whereby a utility locating and mapping operation is performed having one or more geographic features identified and the positions thereof determined. The method may further include a step whereby processing of utility locating and mapping data and geographic feature position data is performed. In another step, the difference in position between the geographic feature(s) from the utility locating and mapping data and coinciding geographic feature(s) within the base map may be determined. In another step, the image tile(s) or other feature region(s) containing the geographic feature is translated based on the updated geographic feature position data. In another step, rubber-sheeting or like techniques may be used may be used to distort the boundaries of the image tile(s) or other feature region(s) allowing the one or more translated image tiles or other feature regions to seamlessly adjoin with neighboring image tiles or other feature regions while maintaining the updated position of the measured geographic feature. The data may further be stored and/or displayed on one or more devices.

In another aspect, the present disclosure may include a geographic map updating method. The geographic map updating method may include a step wherein position updates for one or more geographic features within a mapped area may be determined. The geographic feature position updates may be selectively chosen by a user and/or through machine algorithms. In another step, geographic features within base map may be aligned to the geographic feature positions within the updated map area and the image tile or other feature regions may be distorted to maintain smooth and continuous boundaries to neighboring image tiles or other feature regions. In an optional step, a quality metric may be generated describing how accurately the base map or image tiles or other feature regions within a base map align with the updated map data. In another step, the method may store and optionally display the updated base map and related data.

In another aspect, the present disclosure may include another geographic map updating method. The geographic map updating method may include a step wherein position updates for one or more geographic features within a mapped area may be determined. The geographic feature position updates may be selectively chosen by a user and/or through machine algorithms. In another step, a best fit position for the base map may be determined by analyzing translation vectors from the position updates. In another step, the base map or regions within the base map surrounding the geographic features may be translated based on best fit data. In another step, the method may store and optionally display the updated base map and related data.

In another aspect, the present disclosure may include a method for aligning and improving the precision of additional maps to a geographically updated base map. The method may include a step wherein position updates for one or more geographic features within a mapped area may be determined. The geographic feature position updates may be selectively chosen by a user and/or through machine algorithms. In another step, a geographic map update may be determined for the base map based on the position updates of the geographic features. In another step, one or more geographic features within the updated base map correlating to features within one or more additional maps may be determined each corresponding to a translation vector. In another step, one or more translation vectors for additional map(s) may be determined based on alignment of correlating geographic features. In another step, the one or more additional maps may be translated based on the one or more translation vectors. In another step, the method may store and optionally display the updated and additional map data.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Terminology

Figure 1A:
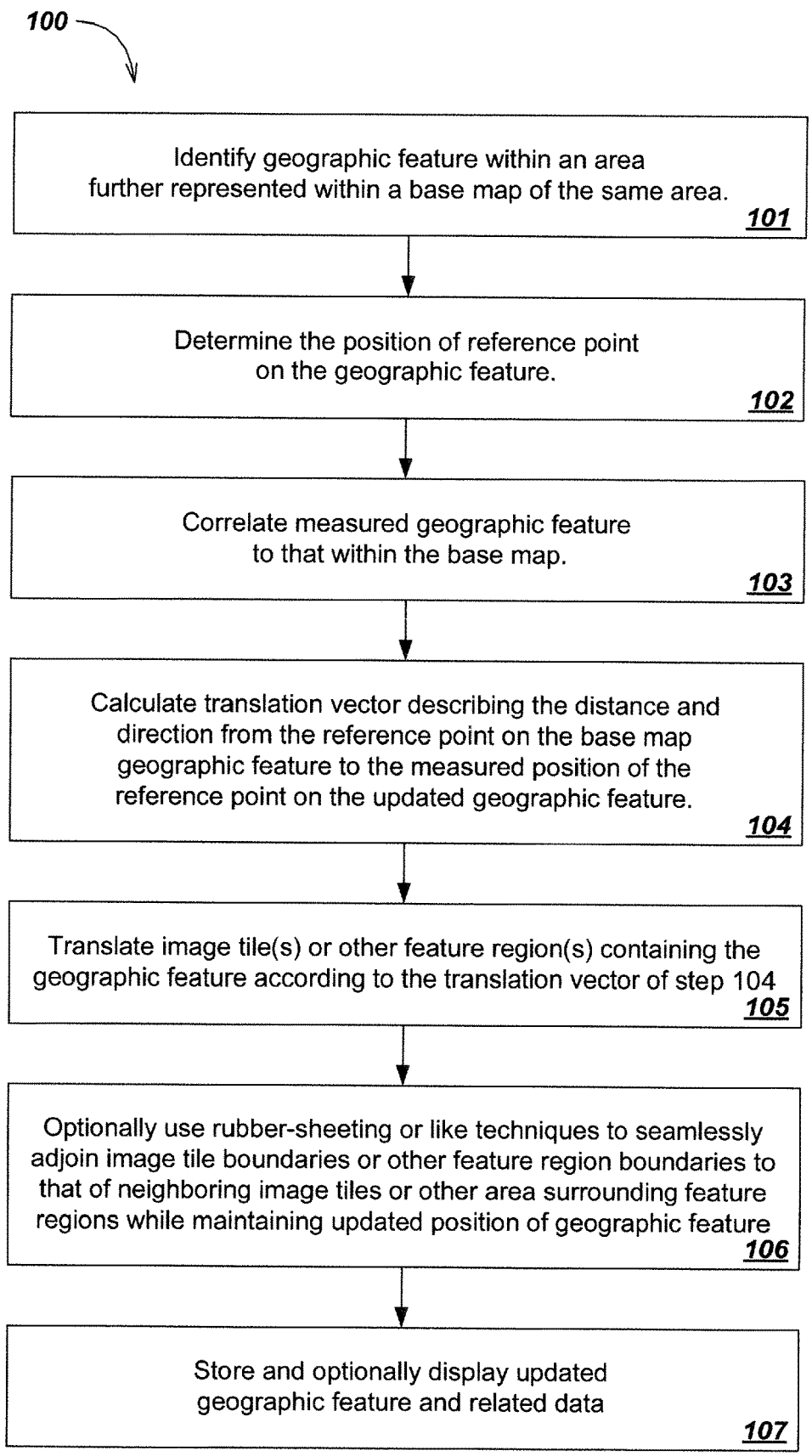
FIG. 1A is a method describing updating the position of a geographic feature via a measured reference point.

As used herein, the terms "buried objects," "buried assets," and "buried utilities" include conductive objects such as water and sewer lines, power lines, and other buried conductors, as well as objects located inside walls, between floors in multi-story buildings, or cast into concrete slabs as well as non-conductive utilities and electronic marker devices. They further include other conductive and nonconductive objects disposed below the surface of the ground. In a typical application a buried object is a pipe, cable, conduit, wire, or other object buried under the ground surface, at a depth of from a few centimeters to meters or more, which has an alternating current flowing in it (the alternating current generates a corresponding electromagnetic field). In a locate operation, a user, such as a utility company employee, construction company employee, homeowner, or other person attempts to find the utility based on sensing of magnetic fields generated by the AC current flow in the utility. The sensed information may be used directly or may be combined with other information to mark the utility, map the utility (e.g., by surface position as defined by latitude/longitude or other surface coordinates, and/or also by depth), and/or for other related purposes.

As noted above, locating buried utilities or other assets may be done by receiving electromagnetic signals emitted from the utilities and then processing these signals in one or more "utility locator devices", "utility locators", or simply "locators". Utility locators sense the magnetic field component of the electromagnetic signal emitted from a flowing AC current and process the signal accordingly to determine information about the buried object. Typical locators use one or more horizontal antennas to determine when the locator is directly above the utility, and then use vertical or omnidirectional antenna coil arrays to determine depth. Applicant's more advanced locators use additional antennas, such as multiple omnidirectional antenna arrays, dodecahedral antenna arrays, and other advanced techniques and devices, such as those described in the incorporated applications, to determine additional information about the buried utilities as well as their associated environment by measuring and processing multiple magnetic field signals in two or three orthogonal dimensions and over time and position.

As used herein, the term "position" in relation to mapping refers to a location on the Earth's surface (e.g., latitudinal and longitudinal world coordinates). Position may, in some mapping embodiments, include an orientation or heading at that location on the Earth's surface. In relation to devices that may be used in the mapping process as well as utility data, "position" may refer to a location in space, typically in three-dimensional (X, Y, Z coordinates or their equivalent) space, as well as an orientation of the source at that location. The orientation may generally refer to the relative direction or heading which may generally be a compass direction. In some instances, such as with utility lines and/or some utility locating devices, "position" may include "pose" or tilt data of an object in three dimensional space at a location.

As used herein, the term "geographic feature" may be a feature within the mapped area. For instance some common geographic features may include but are not limited to manhole covers, painted street elements, intersections between ground surface materials (e.g., asphalt, concrete, grass, dirt, or other like materials), or the like. A geographic feature may generally include features that are naturally existing and recognizable in the area mapped but may also include features that may be placed or marked upon the ground surface by a user and further recognizable in the corresponding imagery of the map area. The correlation of recognition of geographic features between maps and measured on the Earth's surface may general include the use of pattern recognition, artificial intelligence, and/or other machine learning algorithms or technologies. In utility locating and mapping operations, a geographic feature may generally be an element of some significance to locating buried utilities. For instance, such a geographic feature may be a conductive object or otherwise emit one or more signals that may be measured by a utility locator device. It is noted that the measurement of geographic feature positions may be actualized through measurement at a point on the geographic feature referred to herein as a "reference point".

The "reference point" may be or include the center point of manhole cover, the tip of a traffic arrow painted on a street, or other point on a geographic feature that may coincide with the same point within the same feature within the base map element. The "reference point" may be the location point (e.g., a laser dot produced by a laser rangefinder device) in which position of the geographic feature is measured. The reference point may, in some embodiments, exist in a physically separate location relative to the geographic feature.

As used herein, the term "positioning elements" refers to one or more devices or systems for determining the position of each geographic feature along the Earth's surface. For instance, a user may direct a laser rangefinder device working in tandem with global navigation satellite systems (GNSS) to determine the position of geographic features along the Earth's surface. Such positioning elements may further include light detection and ranging (LiDAR), inertial navigation systems (INS), optical tracking systems, and/or other like devices and systems for determining positions on the Earth's surface. Such elements may comprise data representing particular maps, features on maps, or other associated information. "Elements" as described herein may also include modules implemented in hardware and associated software that include electronic components, processors, and/or associated firmware or software to implement the associated element functions digitally.

The geographic features may generally be included in a "base map" as well as within one or more "image tiles" or other "feature regions." The "base map" may be a map of a location. Generally, but not exclusively, the "base map" may be comprised of a series of contiguous satellite or other aerial photographs or "image tiles" seamlessly joined together to represent the Earth's surface. The "image tile" may, in some embodiments, be an area surrounding a geographic feature that is predefined or user defined or defined by machine algorithms. The image tile may be the photograph or image of which the map is comprised containing the geographic feature. Each image tile may have "image tile boundaries" describing the limit or dividing lines of each image tile, separating each image tile from contiguous image tiles. In other embodiments, the image tile may be a new or otherwise updated photograph or image containing the geographic feature and surrounding area merged into another map. In some embodiments, the translated areas may be "feature regions" each comprising a quantity of space surrounding each geographic feature instead of the aforementioned image tiles.

The term "translation vector" as used herein may describe the direction and magnitude representing the direction and distance of the geographic feature translation. The resulting geographic feature post translation may be referred to herein as "updated geographic feature." As used herein, the updated geographic feature may have an "updated geographic feature position" referring to the translated position of the geographic feature.

As used herein, the term "related data" may refer to data representing, calculating, and/or determining base maps, geographic features, updated geographic features, positions or updated positions, translation vectors, image tiles, image tile boundaries, and/or feature regions. Such related data may include that generated by tracked distance measuring devices or systems, utility locator devices, and/or utility locating systems.

The term "updated data" used herein may refer to the revised geolocation of a geographic feature or reference point that may differ to the corresponding geographic feature or reference point in the base map as well as other data relating to the process of determining the revised geolocation. In some embodiments, such updated data may be collected through a utility locating and mapping procedure wherein the updated data may include the predicted positions of utility lines in the ground as well as other data relating to the utility lines.

Overview

This disclosure relates generally to methods and systems for refining map feature positions and improving map position accuracy. More specifically, but not exclusively, the disclosure relates to methods and systems for refining map feature positions and improving map position accuracy as determined by and used within utility locating systems.

Details of example utility locating devices and systems that may be combined with the geographic map updating system and method embodiments herein, as well as additional components, methods, and configurations that may be used in conjunction with the embodiments described herein, are disclosed in co-assigned patents and patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 9,625,602, issued Apr. 18, 2017, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCA- TOR SYSTEM EMPLOYING AUTOMATED VIRTUAL DEPTH EVENT DETECTION AND SIGNALING; U.S. Pat. No. 9,599,499, issued Mar. 21, 2017, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,638,824, issued May 2, 2017, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. Pat. No. 9,488,747, issued Nov. 8, 2016, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL ROUND TRACKING APPARATUS, SYSTEMS AND METHODS; U.S. Pat. No. 9,599,740, issued Mar. 21, 2017, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. patent application Ser. No. 14/446,145, filed Jul. 29, 2014, entitled UTILITY LOCATING SYSTEMS WITH MOBILE BASE STATION; U.S. Pat. No. 9,632,199, issued Apr. 25, 2017, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/802,791, filed Jul. 17, 2015, entitled METHODS AND SYSTEMS FOR SEAMLESS TRANSITIONING IN INTERACTIVE MAPPING SYSTEMS; U.S. Pat. No. 9,085,007, issued Jul. 21, 2015, entitled MARKING PAINT APPLICATOR FOR PORTABLE LOCATOR; U.S. patent application Ser. No. 14/949,868, filed Nov. 23, 2015, entitled BURIED OBJECT LOCATOR APPARATUS AND SYSTEMS; U.S. patent application Ser. No. 15/006,119, filed Jan. 26, 2016, entitled SELF-STANDING MULTI-LEG ATTACHMENT DEVICES FOR USE WITH UTILITY LOCATORS; U.S. Pat. No. 9,341,740, issued May 17, 2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, entitled PHASE-SYNCHRONIZED BURIED OBJECT TRANSMITTER AND LOCATOR METHODS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. patent application Ser. No. 15/331,570, filed Oct. 21, 2016, entitled KEYED CURRENT SIGNAL UTILITY LOCATING SYSTEMS AND METHODS; U.S. patent application Ser. No. 15/339,766, filed Oct. 31, 2016, entitled GRADIENT ANTENNA COILS AND ARRAYS FOR USE IN LOCATING SYSTEMS; U.S. patent application Ser. No. 15/345,421, filed Nov. 7, 2016, entitled OMNI-INDUCER TRANSMITTING DEVICES AND METHODS; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/376,576, filed Dec. 12, 2016, entitled MAGNETIC SENSING BURIED OBJECT LOCATOR INCLUDING A CAMERA; U.S. patent application Ser. No. 15/396,068, filed Dec. 30, 2016, entitled UTILITY LOCATOR TRANSMITTER APPARATUS AND METHODS; U.S. patent application Ser. No. 15/425,785, filed Feb. 6, 2017, entitled METHODS AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/434,056, filed Feb. 16, 2017, entitled BURIED UTILITY MARKER DEVICES, SYSTEMS, AND METHODS; U.S. patent application Ser. No. 15/457,149, filed Mar. 13, 2017, entitled USER INTERFACES FOR UTILITY LOCATOR; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, filed Mar. 13, 2017, entitled UTILITY LOCATORS WITH RETRACTABLE SUPPORT STRUCTURES AND APPLICATIONS THEREOF; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION (QAM);

U.S. patent application Ser. No. 15/485,082, filed Apr. 11, 2017, entitled MAGNETIC UTILITY LOCATOR DEVICES AND METHODS; U.S. patent application Ser. No. 15/485,125, filed Apr. 11, 2017, entitled INDUCTIVE CLAMP DEVICES, SYSTEMS, AND METHODS; U.S. patent application Ser. No. 15/490,740, filed Apr. 18, 2017, entitled NULLED-SIGNAL UTILITY LOCATING DEVICES, SYSTEMS, AND METHODS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. patent application Ser. No. 15/590,964, filed May 9, 2017, entitled BORING INSPECTION SYSTEMS AND METHODS; U.S. patent application Ser. No. 15/623,174, filed Jun. 14, 2017, entitled TRACKABLE DIPOLE DEVICES, METHODS, AND SYSTEMS FOR USE WITH MARKING PAINT STICKS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. patent application Ser. No. 15/633,682, filed Jun. 26, 2017, entitled BURIED OBJECT LOCATING DEVICES AND METHODS; U.S. patent application Ser. No. 15/681,409, filed Aug. 20, 2017, entitled WIRELESS BURIED PIPE AND CABLE LOCATING SYSTEMS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND TRACKING APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, filed Dec. 18, 2017, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. patent application Ser. No. 15/870,787, filed Jan. 12, 2018, entitled MAGNETIC FIELD CANCELING AUDIO SPEAKERS FOR USE WITH BURIED UTILITY LOCATORS OR OTHER DEVICES; U.S. patent application Ser. No. 15/877,230, filed Jan. 22, 2018, entitled UTILITY LOCATING TRANSMITTER APPARATUS AND METHODS; U.S. Provisional Patent Application 62/620,959, filed Jan. 23, 2018, entitled RECHARGEABLE BATTERY PACK ONBOARD CHARGE STATE INDICATION METHODS AND APPARATUS; U.S. Pat. No. 9,880,309, issued Jan. 30, 2018, entitled UTILITY LOCATOR TRANSMITTER APPARATUS AND METHODS; U.S. patent application Ser. No. 15/889,067, filed Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. Provisional Patent Application Ser. No. 62/656,259, filed Apr. 11, 2018, entitled GEOGRAPHIC MAP UPDATING METHODS AND SYSTEMS; U.S. Provisional Patent Application Ser. No. 62/688,259, filed Jun. 21, 2018, entitled ACTIVE MARKER DEVICES FOR UNDERGROUND USE; U.S. patent application Ser. No. 16/144,878, filed Sep. 27, 2018, entitled MULTIFUNCTION BURIED UTILITY LOCATING CLIPS; U.S. patent application Ser. No. 16/178,494, filed Nov. 1, 2018, entitled THREE-AXIS MEASUREMENT MODULES AND SENSING METHODS; and U.S. Provisional Patent Application Ser. No. 62/777,045, filed Dec. 7, 2018, entitled MAP GENERATION BASED ON UTILITY LINE POSITION AND ORIENTATION ESTIMATES. The content of each of the above-described patents and applications is incorporated by reference herein in its entirety. The above applications may be collectively denoted herein as the "co-assigned applications" or "incorporated applications."

In one aspect, the disclosure is directed to a geographic map updating system. The system may include, for example, a base map element, including a data representation of an area displaying features thereof and an update element. The update element may include a geographic feature identification element to identify geographic features coinciding with those of the base map element, a position element for determining a position of the identified geographic features based on provided positional data, a processing element for comparing the base map element data and the update element data to determine and generate an updated map, and a non-transitory electronic data storage element for storing the base map element data, update element data, and corresponding updated map data.

The position element may include, for example, a global navigation satellite system receiver for providing the positional data to the position element, an inertial navigation system for providing the positional data to the position element, and/or a rangefinder system for providing the positional data to the position element. The base map element may include one or more satellite or other aerial photographic images represented by digital data, image tiles represented by digital data, or other feature regions represented by digital data that are organized so as to be joined together to represent all or a portion of the Earth's surface by placing the tiles together.

The update element may include, for example, a buried utility locator. The buried utility locator may be a mapping locator. The buried utility locator may include a locator housing, an electromagnetic receiver front end subsystem, coupled to or disposed in the locator housing. The front end system may include a plurality of magnetic field antennas or antenna arrays and a receiver circuit coupled thereto. The antennas may include at least a first antenna array located at a first position and a second antenna array located at a second position, spatially separated from the first position. The front end subsystem may include electronics to receive, simultaneously at the first position and the second position, a magnetic field electromagnetic signal. The update element may include one or more positioning elements. The positioning element may be disposed in the locator housing and may be coupled to the front end subsystem. The positioning element may include one or more global navigation systems antennas and receiver circuitry coupled thereto. The positioning element may be or include real time kinematic (RTK) systems or other electronics for generating location data, such as latitude/longitude coordinates. The update element may include a geographic feature identification element. The geographic feature identification element may include electronics, electronic memory, and one or more processors for generating a location for geographic features within the work environment. The update element may include a processing element, disposed in the locator housing and coupled to the front end subsystem, programmed to process a first measurement of the ambient electromagnetic signal at the first position, and a second measurement of the ambient electromagnetic signal at the second position, and determine, based at least in part on the first measurement and the second measurement, information associated with the buried conductor corresponding to location data generated by the positioning elements as well as geographic feature locations. The update element may include a non-transitory electronic memory coupled to the processing element to store the determined information pertaining to the buried conductor. The electromagnetic signal may include a combination of a direct magnetic field signal emitted from a radio transmitting antenna and a magnetic field signal emitted from the buried conductor resulting from electromagnetic coupling of the direct magnetic field signal to the buried conductor.

The update element may include, for example, a dipole tracked distance measuring system. The system may include a signal tracking device. The signal tracking device may include one or more magnetic field antenna arrays, one or more positioning elements for determining the location of the signal tracking element in three dimensional space, a processing element for processing received dipole signals and data signals from the tracked distance measuring device, a data storage element for storing geographic feature location data and other signal data, and a tracked distance measuring device. The tracked distance measurement device may include a body, a rangefinder element for measuring distance to a geographic feature, an alternating current (AC) signal generator, a magnetic field dipole antenna, and an actuator for initiating generation of an electromagnetic signal in conjunction with measuring distance. The electromagnetic dipole signal may be generated in conjunction with measuring of a distance by the rangefinder element. Information associated with a position of the tracked distance measuring device may be determined in a processing element of the signal tracking element based on receiving and processing an electromagnetic dipole signal in the one or more magnetic field antenna arrays.

In another aspect, the disclosure relates to a processor implemented method for updating the position of a geographic feature within a base map. The method may include, for example, identifying one or more geographic features, determining the position of a reference point along the one or more geographic features relative to the Earth's surface, correlating the measured geographic feature to a corresponding featured digitally represented within a base map, determining the difference in position between the reference point of base map geographic features and corresponding reference point of the geographic feature measured along the Earth's surface, translating one or more image tiles or other feature regions containing each geographic feature based on updated geographic feature position data, and storing the updated base map containing the translated map update region and geographic feature in a non-transitory electronic memory. The method may further include providing a visual display of the updated base map containing the translated map update region and geographic feature on an electronic display device.

The method may include, for example, performing rubber-sheeting signal processing at the one or more translated image tiles or other feature regions to smooth and seamlessly join the translated image tiles or other feature regions and contiguous image tiles or other feature regions of the base map. The updated position of the geographic feature therein may be maintained in the rubber-sheeting signal processing. The photographs or other imagery of the identified one or more geographic features may be locally generated. The locally generating may include capturing digital imagery in a camera or from a utility locator. The image tiles may each be an individual photograph or image from a base map comprised of a multitude of stitched together satellite or aerial photographs or other images representing the Earth's surface. The image tile or other feature regions may be a predefined region surrounding each geographic feature. The image tile or other feature regions may be a region surrounding each geographic feature determined by a user based on user input or user supplied data files. The image tile or other feature regions may be a region surrounding each geographic feature determined by a signal processing algorithm. The image tile or tiles may be replaced by a new photograph or image tile of the geographic feature and surrounding area. The new photograph or image tile may be generated when determining the updated position of the geographic feature. A pattern recognition or other machine learning algorithm may be used to identify coinciding geographic features. Reference points for geographic features may be located in a physically separate location from their corresponding geographic feature.

In another aspect, the disclosure relates to a processor implemented method for geographic map data updating via a utility locating and mapping system. The method may include, for example, performing a utility locating and mapping operation wherein one or more geographic features are identified and corresponding data representing positions thereof are determined, generating corresponding utility locating and mapping data including one or more of surface position coordinate and buried utility depth, associating the utility locating and mapping data and geographic feature position data, determining the difference in position between the newly identified geographic features from the utility locating and mapping data and the same geographic features within a base map, translating the image tiles or other feature regions containing the geographic feature on the base map based on updated geographic feature position data, correlating the utility locating and mapping data to the update geographic feature position(s) within the updated base map, and storing the updated base map in a non-transitory electronic memory. The method may further include providing a visual display of the updated base map on an electronic display device.

The method may include, for example, applying rubber-sheeting signal processing to the one or more translated image tiles or other feature regions to smooth and seamlessly join the translated image tiles or other feature regions and contiguous image tiles or other feature regions of the base map while maintaining the updated position of the geographic feature therein. The utility locating and mapping data generated by the locator may be indexed to one or more updated geographic feature positions and stored in a non-transitory electronic memory. The utility locating and mapping data may be indexed relative to the updated map.

In another aspect, the disclosure relates to a processor implemented method for geographic map data updating. The method may include, for example, determining data corresponding to position updates for one or more geographic features within a mapped area, determining data corresponding to the geographic features with a base map, aligning data corresponding to the geographic features within base map to data corresponding to the geographic features in the updated map area, geometrically modifying image tile or other feature region data to provide smooth and continuous boundaries to neighboring image tiles neighboring feature regions, and storing the geometrically modified image time or other feature region data in a non-transitory electronic memory. The method may further include providing a visual display of a map including at least the updated tile or base map on an electronic display device. The method may further include generating a quality metric describing how accurately the base map or image tiles or other feature regions within a base map align with the updated map data. The quality metric may be stored in an electronic non-transitory memory.

In another aspect, the disclosure relates to a processor implemented method for geographic map data. The method may include, for example, determining position updates for data defining one or more geographic features within a mapped area, generating translation vectors data based on the position updates, determining a best fit position for the geographic features data and the base map data by processing the translation vectors data from the position updates using a best fit algorithm, translating data corresponding to base map data or data corresponding to regions within the base map surrounding the geographic features based on the determined best fit to generate an updated base map, and storing the data corresponding to the updated base map in a non-transitory memory. The method may include providing a visual display of the updated base map on an electronic display device. The translated region surrounding the geographic features may be determined by selection input data provided by a user. The selection input data may be generated from mouse, keyboard, or other user-interface device input made by the user. The translated region surrounding the geographic features may be determined by a signal processing algorithm.

In another aspect, the disclosure relates to a processor implemented method for aligning and improving the precision of map data from geographically updated base map data. The method may include, for example, identifying data corresponding to ones of a plurality of geographic features in a mapped area, determining position updates for the plurality of geographic features data, determining geographic map update data from a base map based on the determined position updates, associating the geographic map update data with the base map, determining one or more geographic features within the updated base map correlating to features corresponding to data within one or more other maps, determining data defining one or more translation vectors for the one or more other maps data based at least in part on alignment of correlating geographic features between the updated base map and the one or more other maps data, translating positioning data in the one or more other maps data based on the data defining the one or more translation vectors, and storing the geographic map update data and data associated with the translation of the one or more other maps in an electronic non-transitory memory. The method may further include providing a visual display of the translated one or more other maps on a visual display device. The method may further include providing a visual display of an update of the mapped area based on the geographic map update data from the base map.

Various additional aspects, features, and functions are described below in conjunction with the embodiments shown in FIG. 1A through FIG. 9 of the appended Drawings.

EXAMPLE EMBODIMENTS

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Turning to FIG. 1A, a method 100 for identifying and updating geographic feature positions may include a step 101 wherein a geographic feature is identified within an area that may also be represented within a base map of the same area. Some examples of such geographic features may include but are not limited to, manhole covers or other identifiable street or sidewalk or other infrastructure elements, painted or otherwise human created marks such as the tip of a direction arrow painted on a street, and/or other elements along the Earth's surface. The geographic feature may, in some embodiments, be selected by a user. In other embodiments, the selection of geographic features may involve pattern recognition and/or other machine learning algorithms. The base map may comprise of a series of satellite or aerial photographs or other image tiles or other feature regions stitched together to represent an area of the Earth's surface. In a step 102, a position may be determined at a reference point on the geographic feature. The reference point may, for instance, be or include the center point of a manhole cover, the tip of a traffic arrow painted on a street, or other point on a geographic feature that may coincide with the same point within the same feature within the base map. The position data may include location(s) on the Earth's surface (e.g., latitude and longitude coordinates). In some method embodiments, the position data may include orientation data at that location (e.g., direction towards magnetic north) that may be used to generate a geographic rotation update of the image tile or tiles or other feature regions containing the geographic feature. In some embodiments, the step 102 may include photographing or otherwise creating imagery of the geographic feature and surrounding environment. Within step 102, the generation of geographic feature position data may include, for example, the use of global navigation satellite systems (GNSS) including real time kinematics (RTK) global positioning satellite (GPS) systems or other satellite positioning systems (e.g., GLONASS, Galileo, quasi-zenith satellite system, BeiDou, or the like), inertial navigation systems (INS), magnetic sensors (e.g., compass sensors), light detection and ranging (LIDAR) or other rangefinder devices or methods, and/or other positioning and orientation determining systems to determine the reference point position associated with each geographic feature. In even further embodiments, such as the utility locating, mapping, and geographic feature identification system 400 of FIG. 4, the identification and/or position determining may be achieved via a utility locating and mapping operation which may include the use of one or more tracked distance measuring devices/systems and/or utility locator devices and/or associated utility locating devices/systems as described in U.S. patent application Ser. No. 15/866,360, filed Jan. 9, 2018, entitled TRACKED DISTANCE MEASURING DEVICES, SYSTEMS, AND METHODS. In the various embodiments described herein, the geographic feature identification data may include a time and date relating to the geographic features updated measured position. Returning to FIG. 1A, in a step 103, the geographic feature identified on the Earth's surface may be compared to features within the base map to determine a correlating base map geographic feature. The step 103 may include pattern matching algorithms and/or other machine learning algorithms to identify correlating geographic features between those measured and those within the base map. In a step 104, the difference in position between the reference point on the measured geographic features and the correlating geographic features within the base map may be calculated. This calculation may generate a translation vector having both a direction and a magnitude representing the direction and distance of the geographic feature translation. In some embodiments, the position difference may also include an orientation measurement at that location wherein the orientation of the geographic feature at the original location is known or otherwise possible to be determined. When rotation data is applicable or able to be determined (e.g., orientation data is available at the geographic feature location in the base map and/or otherwise determined from images of the geographic feature), a rotation update may be determined. In a step 105, the position difference(s) from step 104 may be used to translate the image tile(s) or other feature region(s) containing the geographic feature. For instance, the image tile(s) or other feature region(s) surrounding the geographic feature may translate along the translation vector established between the reference point on the geographic feature within the base map and that measured on the Earth's surface. Image reconstruction, image translation, or like algorithms may be used to translate the map update region imagery to the position within the base map. In some embodiments having more than one geographic feature updates within a single image tile or other feature region, the translations may not be equivalent in direction and/or magnitude. In such embodiments, simultaneous locating and mapping (SLAM) algorithms, Kalman filters, neural network or like machine learning, bundle adjustment algorithms, particle filtering algorithms, averaging, scale invariant feature transform (SIFT), random sample consensus (RANSAC), or the like algorithms or techniques may be used to determine the translation. In some such embodiments having multiple geographic feature updates within the same image tile or other feature region, the image tile or other feature region may be distorted to accommodate the multiple different translations. In a step 106, rubber-sheeting and/or other like techniques may be used to distort the boundaries of the image tile(s) or other feature region(s) allowing the one or more translated image tiles or other feature regions to seamlessly adjoin with neighboring image tiles or other feature regions. It should be noted that the rubber-sheeting or like techniques may maintain the updated position of the measured geographic feature. In a step 107, the geographic feature position and related data may be stored and optionally displayed. The method 100 of FIG. 1A may optionally repeat identifying and updating geographic feature positions throughout a map area.

Figure 1B:
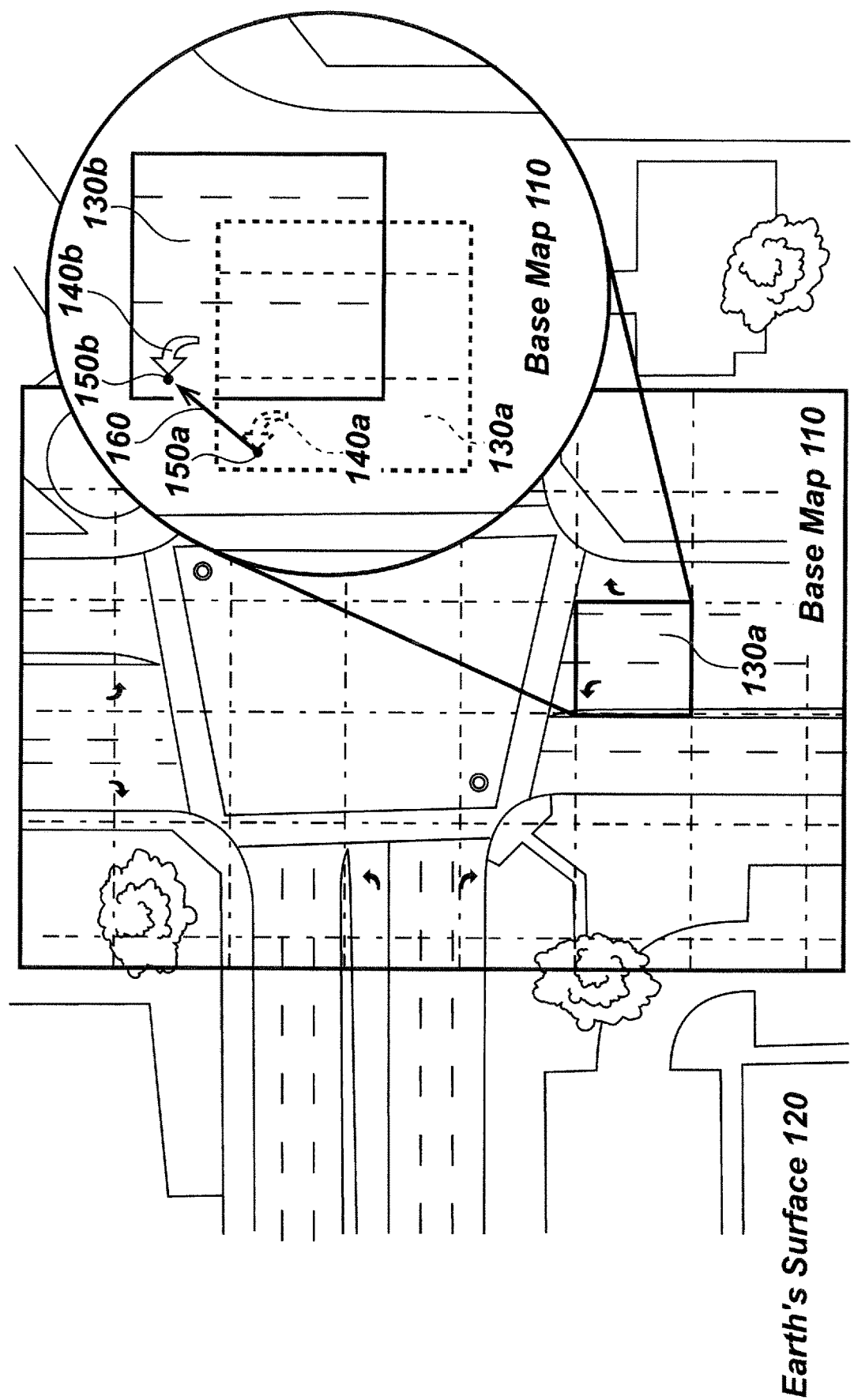
FIG. 1B is an illustration of updating a geographic feature position via translating the image tile containing the feature as related to the method of FIG. 1A.

Turning to FIG. 1B, a base map 110 may represent a portion of the Earth's surface 120. The base map 110 may be comprised of a series of individual image tiles, such as image tile 130*a* adjoined together to represent a portion of the Earth's surface. The image tiles may be positioned satellite or aerial photographs or other images stitched together representing the Earth's surface. As illustrated in FIG. 1B, a geographic feature 140*a* may have a position within base map 110 further referencing a location on the Earth's surface 120. The position of geographic feature 140*a* may include a location having latitudinal and longitudinal world coordinates (e.g., measured by one or more real time kinematics (RTK) global positioning satellite (GPS) systems, Galileo, quasi-zenith satellite system, BeiDou, or the like). In some embodiments, the position of a geographic feature may include an orientation (e.g., heading relative to magnetic north) that may further be updated (not illustrated). The position of geographic feature 140*a* may be measured via a reference point 150*a* on geographic feature 140*a*. A geographic map updating system, such as the geographic map updating system 600 illustrated in FIG. 6 or utility locating, mapping, and geographic feature identification system 700 of FIG. 7 may identify an updated position for geographic feature 140*a* to the geographic feature 140*b* position as measured at reference point 150*b* on geographic feature 140*b* relative to the Earth's surface 120. Based on the updated position data relating to reference point 150*b* on geographic feature 140*b*, a translation vector 160 may be determined wherein the difference in direction and distance to the measured reference point 150*b* on geographic feature 140*b* from a corresponding reference point 150*a* on geographic feature 140*a* within base map 110 is calculated. The translation vector 160 may be applied to all points within the image tile 130*a* such that the image tile 130*a* is translated to the image tile 130*b* position. In some embodiments, a single geographic feature may overlap into two or more image tiles. In such cases, the same translation vector may apply at each image tile or a translation may individually be determined at each image tile. In some embodiments, the movement of geographic features may be predicted (e.g., seismic data may be used to predict shifting at the Earth's surface). In such embodiments, the image tiles of a base map, such as the image tile 130*a/b* of base map 110, may be updated on an ongoing basis and/or upon a triggering event such as an earthquake or other predictive events of movement at the Earth's surface.

Figure 1C:
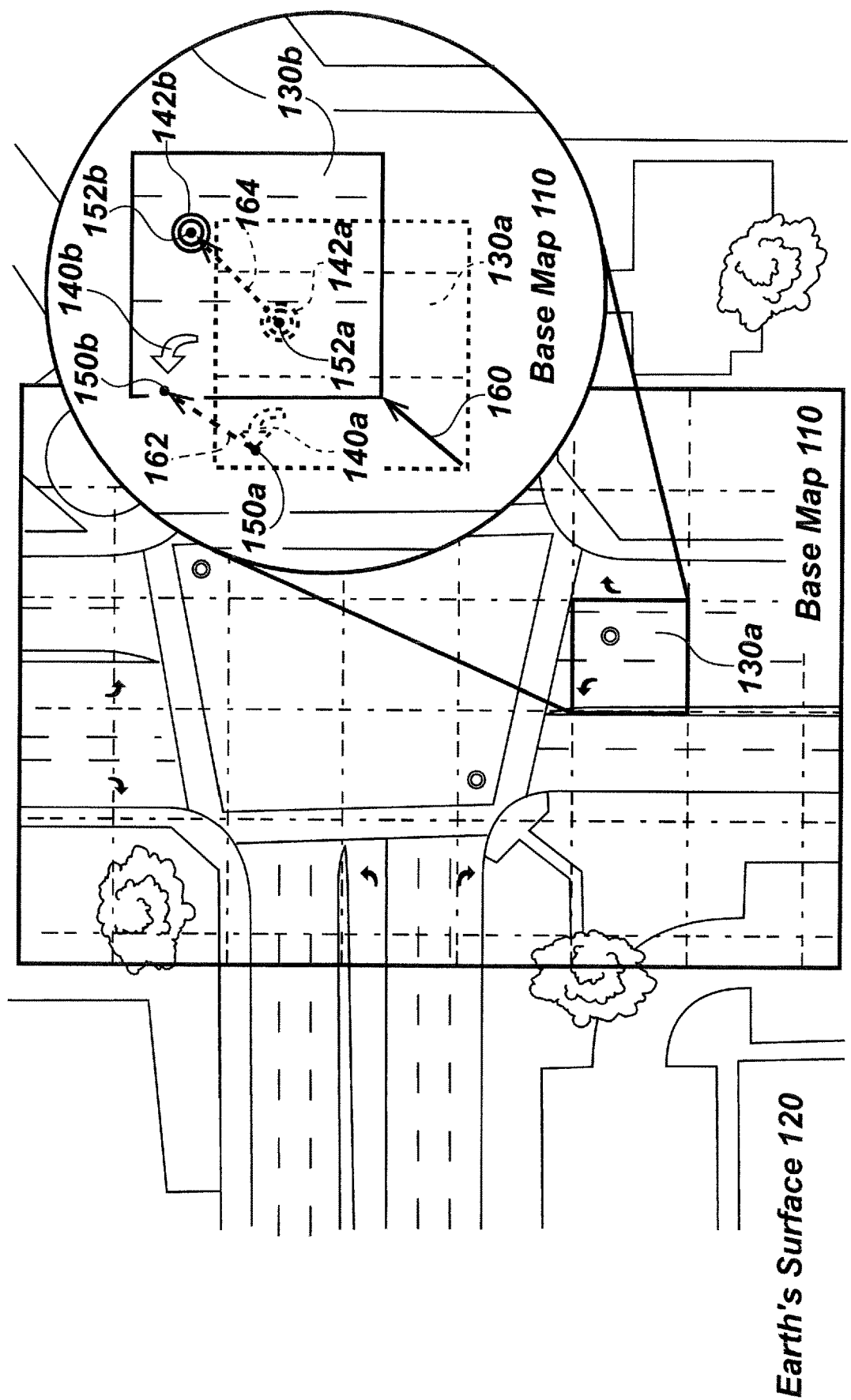
FIG. 1C is an illustration of updating geographic feature positions wherein the image tile contains multiple geographic features.

In some image tiles, more than one geographic feature may exist each having a different translation vector that may not be equal in distance and/or direction. As illustrated in FIG. 1C, the base map 110 may have geographic features 140*a* and 142*a* having positions within the same image tile 130*a*. The image tile 130*a* and geographic features 140*a* and 142*a* therein, may have positions relative to the Earth's surface 120. A geographic map updating system, such as the geographic map updating system 600 illustrated in FIG. 6 or utility locating, mapping, and geographic feature identification system 700 of FIG. 7 may identify an updated position for the geographic features 140*a* and 142*a* to the geographic feature 140*b* and 142*b* positions as measured at reference point 150*b* on geographic feature 140*b* and reference point 152*b* on geographic feature 142*b* relative to the Earth's surface 120. Based on the updated position data relating to reference point 150*b* on geographic feature 140*b* and reference point 152*b* on geographic feature 142*b*, vectors 162 and 164 may be determined wherein the difference in direction and distance to the measured reference point 150*b* on geographic feature 140*b* from a corresponding reference point 150*a* on geographic feature 140*a* within base map 110 and the measured reference point 152*b* on geographic feature 142*b* from a corresponding reference point 152*a* on geographic feature 142*a* within base map 110 are calculated. In such cases wherein the multiple vectors within a single image tile are not equal in distance or direction, such as vectors 162 and 164, a geographic update may be determined by simultaneous locating and mapping (SLAM) algorithms, Kalman filters, neural network or like machine learning, bundle adjustment algorithms, particle filtering algorithms, averaging, scale invariant feature transform (SIFT), random sample consensus (RANSAC), or the like. For instance, a single translation vector, such as the translation vector 160 in FIG. 1C, may be determined via one or more of such techniques. The translation vector 160 may be applied to all points within the image tile 130*a* such that the image tile 130*a* is translated to the image tile 130*b* position. In some embodiments, the image tile containing the multiple geographic feature translations may be distorted to accommodate precise translations for each geographic feature. Additional rubber-sheeting or like techniques may again be applied to the image tile to seamlessly adjoin the image tile with neighboring image tiles while maintaining the updated position of each geographic feature.

Figure 1D:
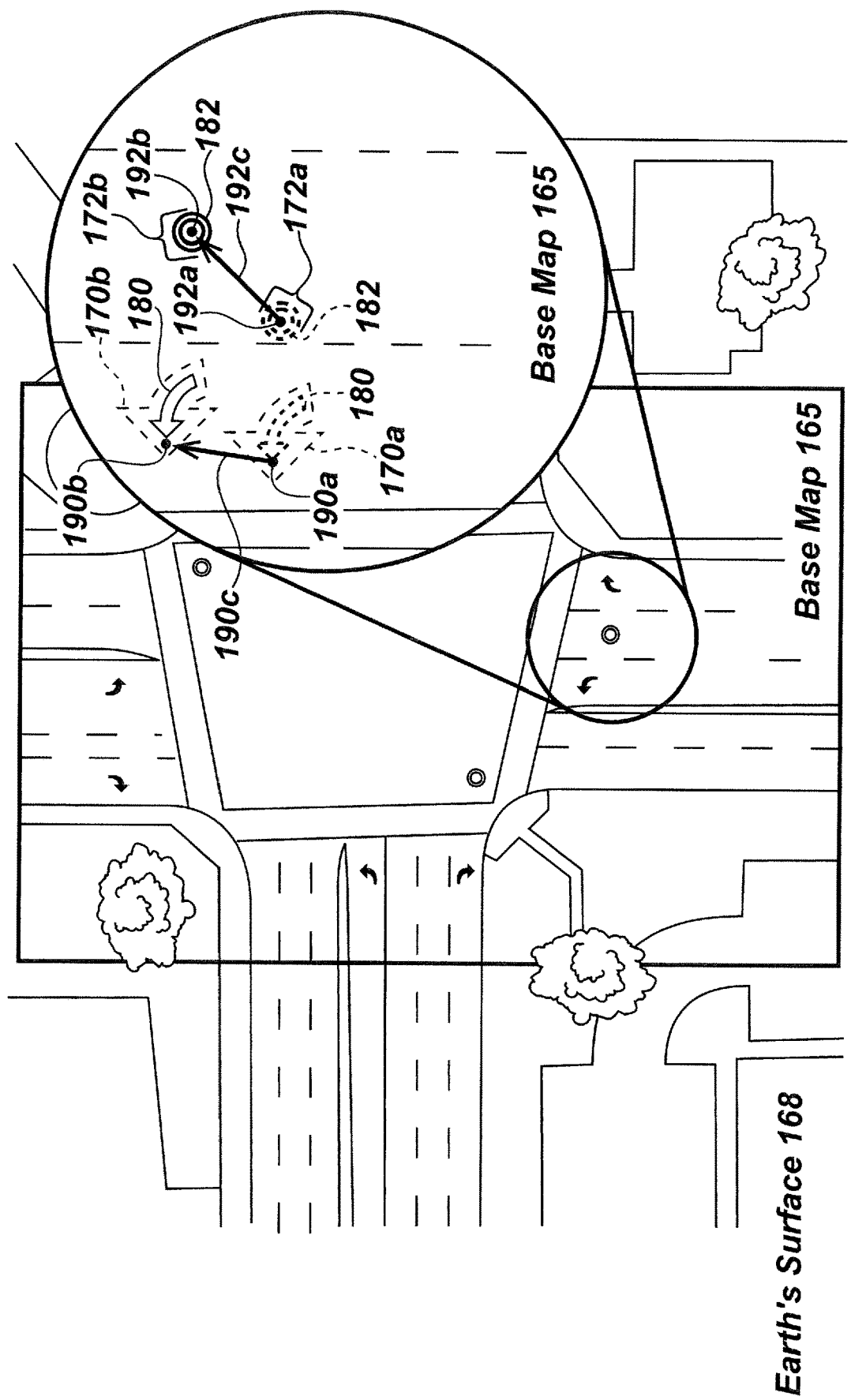
FIG. 1D is an illustration of a method of updating a geographic feature position via translating a feature region containing the feature rather than an image tile using the method of FIG. 1A.

Turning to FIG. 1D, a base map 165 may represent a portion of the Earth's surface 168. The base map 165 may include a series of feature regions, such as feature region 170a or feature region 172a, that include or surround geographic features, such as geographic feature 180 or geographic feature 182. The feature regions may include the geographic feature and surrounding area, as illustrated with geographic feature 180, or just the geographic feature, as illustrated with geographic feature 182. Each geographic feature 180 and 182 may have a position within base map 165 further referencing a location on the Earth's surface 168. The position of geographic features 180 and 182 may include a location having latitudinal and longitudinal world coordinates (e.g., measured by one or more real time kinematics (RTK) global positioning satellite (GPS) systems, Galileo, quasi-zenith satellite system, BeiDou, or the like). In some embodiments, the position of a geographic feature may include an orientation (e.g., heading relative to magnetic north) that may further be updated (not illustrated). The position of geographic features 180 and 182 may be measured via a reference point, such as corresponding reference points 190a and 192a. A geographic map updating system, such as the geographic map updating system 600 illustrated in FIG. 6 or utility locating, mapping, and geographic feature identification system 700 of FIG. 7 may identify updated positions for feature regions 170b and 172b as measured at reference points 190b and 192b. Based on the updated position data relating to reference points 190b and 192b, translation vector 190c and 192c may be determined wherein the difference in direction and distance between reference points 190a and 190b and reference points 192a and 192b are calculated. The translation vectors 190c and 192c may be applied to all points within the respective feature regions 170a and 172a such that the feature regions 170a and 172a are translated to the feature regions 170b and 172b positions respectively. In some embodiments, utility positions may be revealed in a utility locating map. For instance, utility positions may be indexed to feature regions, such as feature regions 170a/b and 172a/b, and/or reference points therein, such as reference points 190a/b and 192a/b, allowing the utility positions to be updated according to translation data determined by the geographic map updating system or methods of the present disclosure.

Figure 2A:
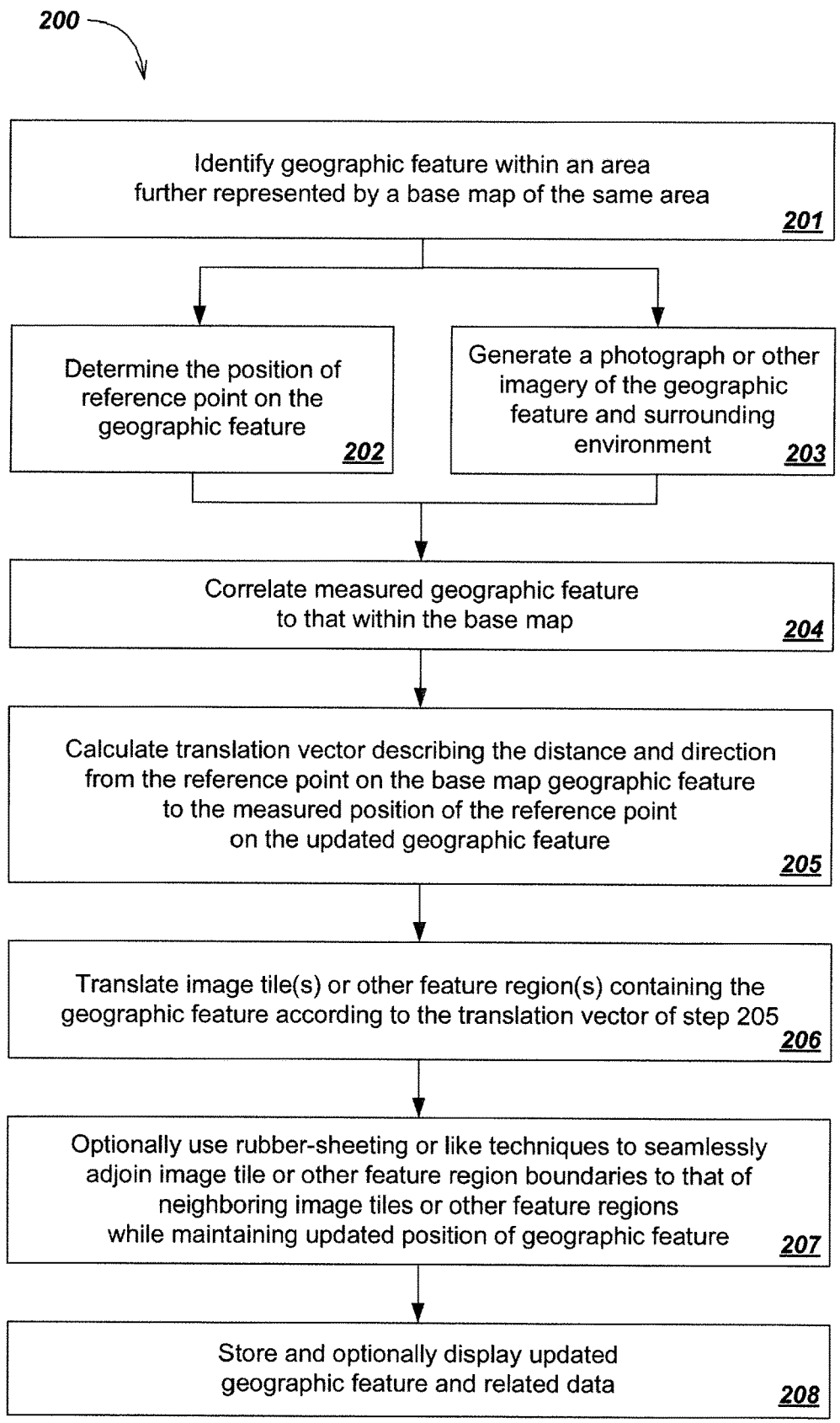
FIG. 2A is another method describing updating a geographic feature's position via a measured reference point.

Turning to FIG. 2A, a method 200 for identifying and updating geographic feature positions may include a step 201 wherein a geographic feature is identified within an area that may also be included within a base map that includes the same area. For example, step 201 may include identifying a geographic feature such as a manhole cover, traffic arrow, or like feature along the Earth's surface. In a step 202, a position (e.g., latitudinal and longitudinal world coordinates) may be determined at a reference point on the geographic feature (e.g., center point of a manhole cover, the tip of a traffic arrow painted on a street, or other point on the selected geographic feature). In a parallel step 203, a photograph or other imagery of the geographic feature and surrounding environment may be generated. The images may include orthorectified imagery gathered by an unmanned aerial vehicle such as the drone 690 in FIG. 6, images generated by a stereoscopic ground tracking device such as the optical ground tracking device 766 illustrated in FIG. 7 and described within the incorporated U.S. Pat. No. 9,841,503, issued Dec. 12, 2017, entitled OPTICAL GROUND TRACKING APPARATUS, SYSTEMS, AND METHODS, and/or images collected from a tracked distance measuring system or device such as the tracked distance measuring device 475 and/or smart phone 485 illustrated in FIG. 4 and further described in the incorporated U.S. patent application Ser. No. 15/866,360, filed Jan. 9, 2018, entitled TRACKED DISTANCE MEASURING DEVICES, SYSTEMS, AND METHODS. In a step 204, the geographic feature identified on the Earth's surface may be compared to features within a base map to determine a correlating base map geographic feature. The step 204 may include pattern matching algorithms and/or other machine learning algorithms to identify correlating geographic features between those measured and those within the base map. In a step 205, the image tile(s) or other feature region(s) containing the geographic feature may be determined. In a step 206, the difference in position between the reference point on measured geographic features and correlating geographic features within the base map may be calculated. This calculation may result in a translation vector having both a direction and a magnitude representing the direction and distance of the geographic feature translation. In a step 207, the position difference(s) from step 206 may be used to translate the image tile(s) or other feature region(s) containing the geographic feature. For instance, the image tile(s) or other feature region(s) containing the geographic feature may translate along a vector established between the reference point on the geographic feature within the base map and that measured on the Earth's surface. Image reconstruction, image translation, or like algorithms may be used to translate the image tile(s) or other feature region(s) to the position within the base map. In some embodiments, the photographs or other imagery of the geographic feature and surrounding environment generated in step 203 may replace the original base map image tile(s) or other feature region(s). In a step 208, rubber-sheeting and/or other like techniques may optionally be used to distort the boundaries of the image tile(s) or other feature region(s) allowing the one or more translated image tiles or other feature regions to seamlessly adjoin with neighboring image tiles or feature regions. It should be noted that the rubber-sheeting or like techniques may maintain the updated position of the measured geographic feature. In a step 209, the geographic feature position and related data may be stored and optionally displayed. The method 200 of FIG. 2A may optionally repeat identifying and updating geographic feature positions throughout a map area.

Figure 2B:
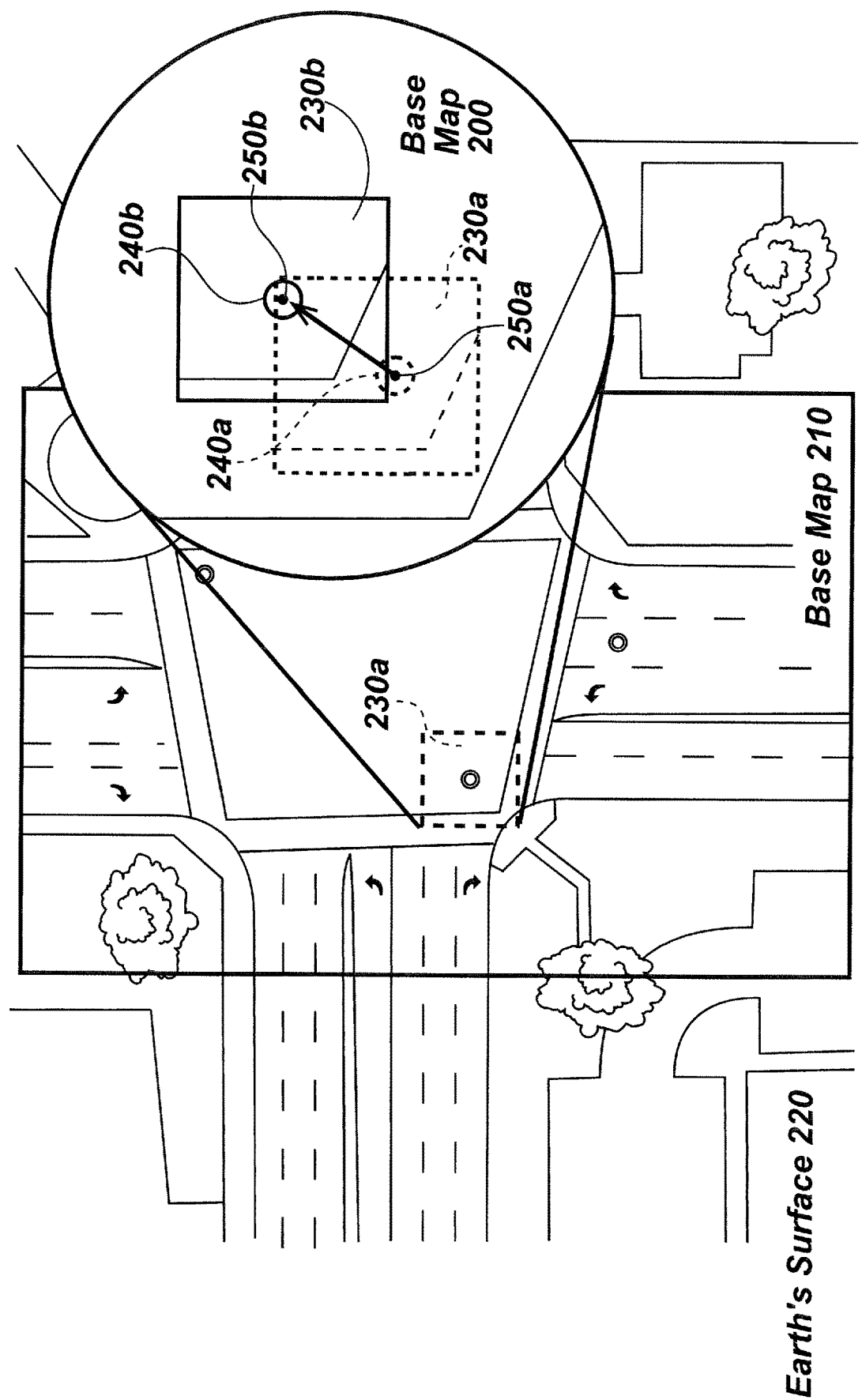
FIG. 2B is an illustration of a method of updating a geographic feature wherein the image tile or other feature regions is a quantity of space surrounding the geographic feature.

Turning to FIG. 2B, a base map 210 may represent a portion of the Earth's surface 220. As shown within FIG. 2B, the image tile 230a within base map 210 of FIG. 2B containing the geographic feature 240a/b may be a quantity of area surrounding geographic feature 240a/b. Within other embodiments described herein, the image tile may generally be an individual photograph or image from a base map comprised of a multitude of satellite or aerial photographs or other image tiles stitched together to represent the Earth's surface. In some embodiment, such as the embodiment of FIG. 2B, the image tile 230a may instead be a feature region comprising the geographic feature and, in some embodiments, a portion of space surrounding the geographic feature 240a/b. This region of space may be a predefined distance or variable distance surrounding an identified geographic feature that may be user determined or determined by algorithms. As illustrated in FIG. 2B, a geographic feature 240a may have a position within base map 210 further referencing a location on the Earth's surface 220. The position of geographic feature 240a may include a location having latitudinal and longitudinal world coordinates (e.g., measured by one or more real time kinematics (RTK) global positioning satellite (GPS) systems, Galileo, quasi-zenith satellite system, BeiDou, or the like). In some embodiments, the position of a geographic feature may include an orientation (e.g., heading relative to magnetic north) that may further be updated (not illustrated). The position of geographic feature 240a may be measured via a reference point 250a on geographic feature 240a. A geographic map updating system, such as the map updating system 600 illustrated in FIG. 6 or utility locating, mapping, and geographic feature identification system 700 of FIG. 7 may identify an updated position for geographic feature 240a to the geographic feature 240b position as measured at reference point 250b on geographic feature 240b relative to the Earth's surface 220. Based on the updated position data relating to reference point 250b on geographic feature 240b, a translation vector 260 may be determined wherein the difference in direction and distance to the measured reference point 250b on geographic feature 240b from a corresponding reference point 250a on geographic feature 240a within base map 210 is calculated. The translation vector 260 may be applied to all points within the image tile 230a such that the image tile 230a is translated to the image tile 230b position. Rubber-sheeting and/or other like techniques (not illustrated) may be used to distort the boundaries of the image tile 230b allowing the one or more translated image tiles 230b to seamlessly adjoin with neighboring image tiles while maintaining the positional accuracy of the updated geographic features.

Figure 3A:
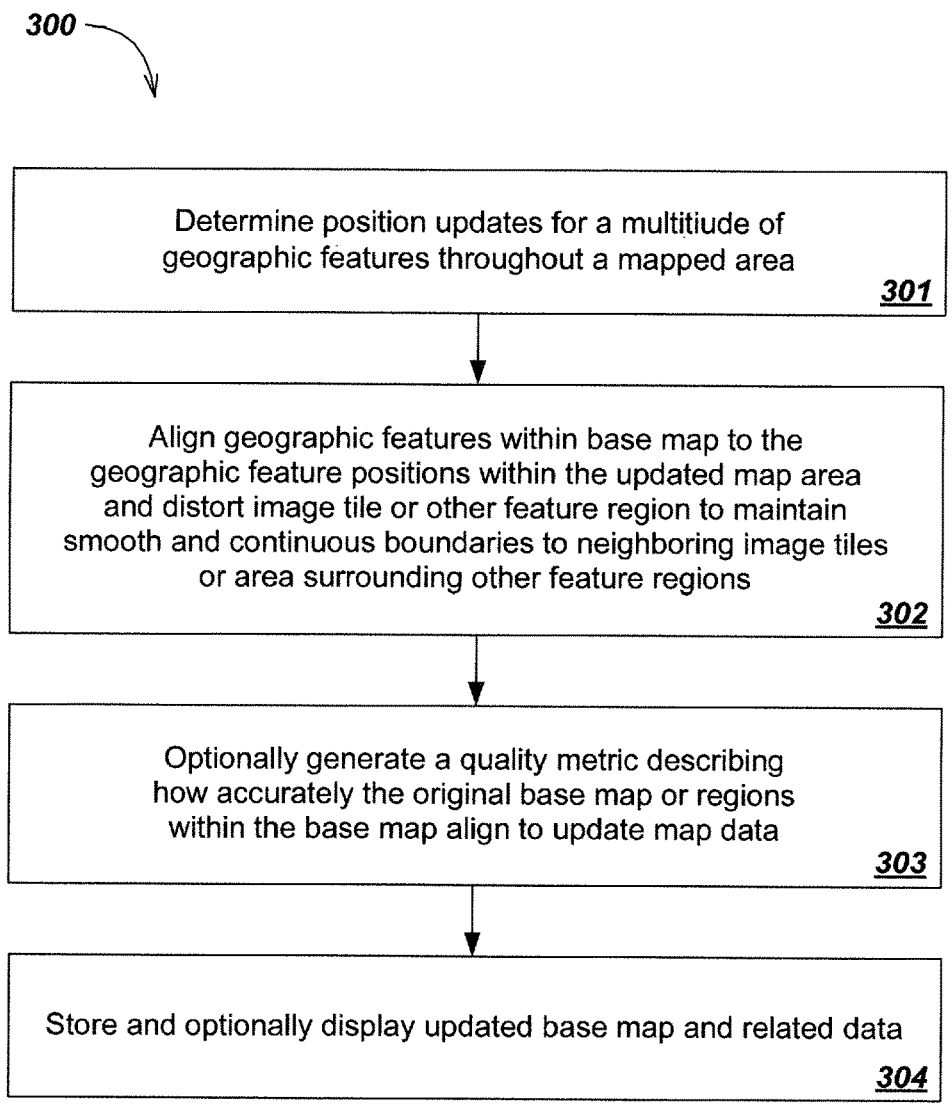
FIG. 3A is a method for geographic map updating.

Turning to FIG. 3A, a method 300 for geographic map updating is described. The method 300 may include a step 301 wherein the position of geographic features are updated using the method 100 of FIG. 1A or method 200 of FIG. 2. The step 301 may general include determining position updates for a multitude of geographic features throughout a mapped area. Within some method 300 embodiments, the geographic feature position updates of step 301 may be selectively chosen by a user and/or through machine algorithms to ensure the best possible position for each geographic feature. In a step 302, each geographic feature within the base map may align with the updated geographic feature position and the image tile(s) or other feature region(s) containing the geographic feature and further be distorted so as to maintain smooth and continuous boundaries to neighboring image tiles or other feature regions. In an optional step 303, a quality metric may be determined based on how accurately or inaccurately the original base map or regions within the base map align to the updated map dap data. In a step 304, the updated base map may be stored and/or optionally displayed.

Figure 3B:
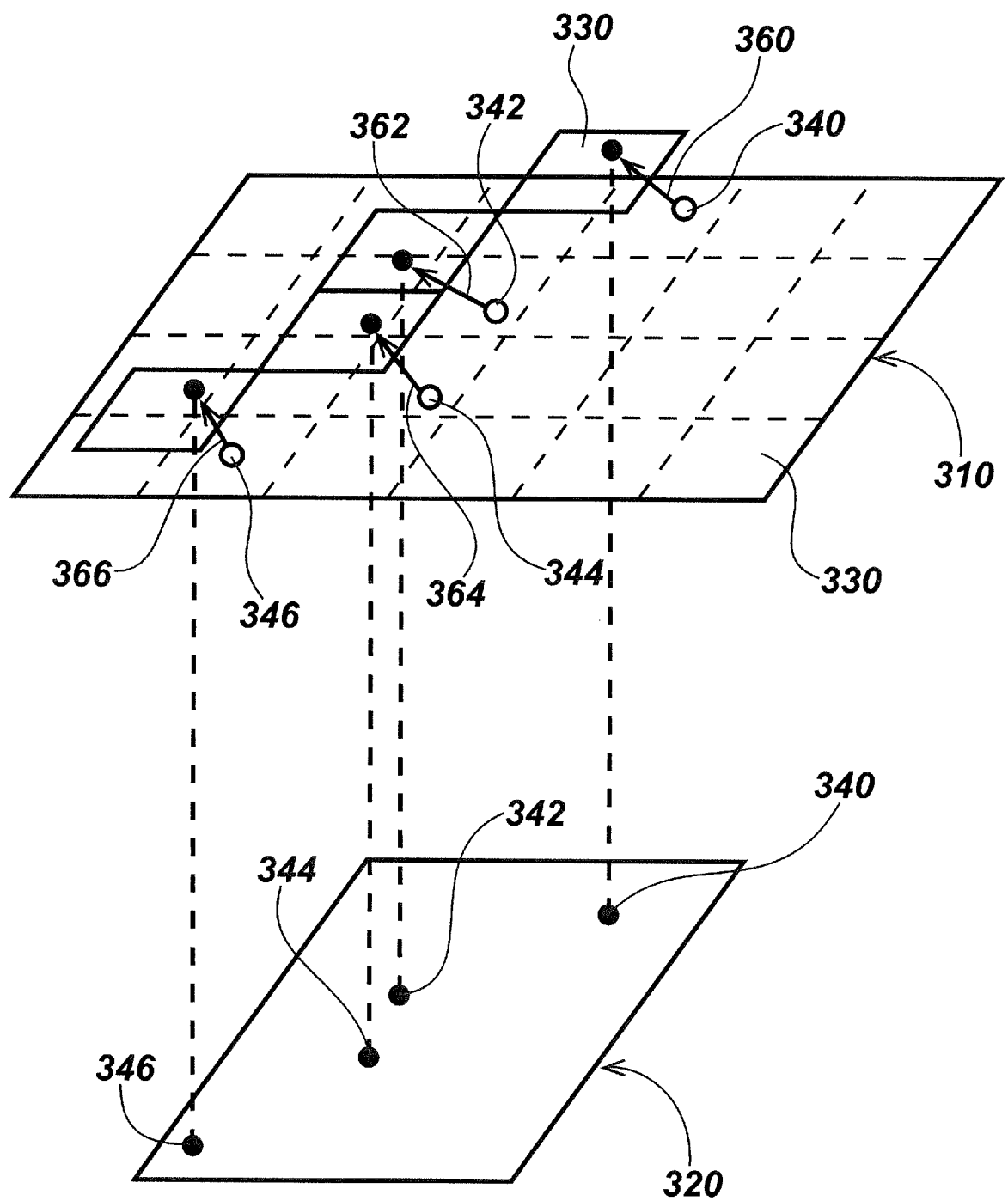
FIG. 3B is an illustration demonstrating the geographic map updating method of FIG. 3A.

Turning to FIG. 3B, a base map 310 may be comprised of a series of image tiles 330. In other embodiments, the image tiles may instead be feature regions comprising the geographic feature and, in some embodiments, a portion of space surrounding each geographic feature. An updated map area 320 may identify various geographic features having updated positions such as the geographic features 340, 342, 346, and 348. The image tiles 330 containing each geographic feature 340, 342, 346, and 348 within the base map 310 may be translated along corresponding translation vectors 360, 362, 364, and 368 to align geographic features 340, 342, 346, and 348 within the base map 310 to the geographic features 340, 342, 346, and 348 within the updated map area 320. Rubber-sheeting or like techniques may be used on translated image tile(s) 330 containing the geographic features 340, 342, 346, and 348 to maintain smooth and continuous boundaries to neighboring image tiles 330. Such techniques may maintain the updated geographic feature position.

Figure 4A:
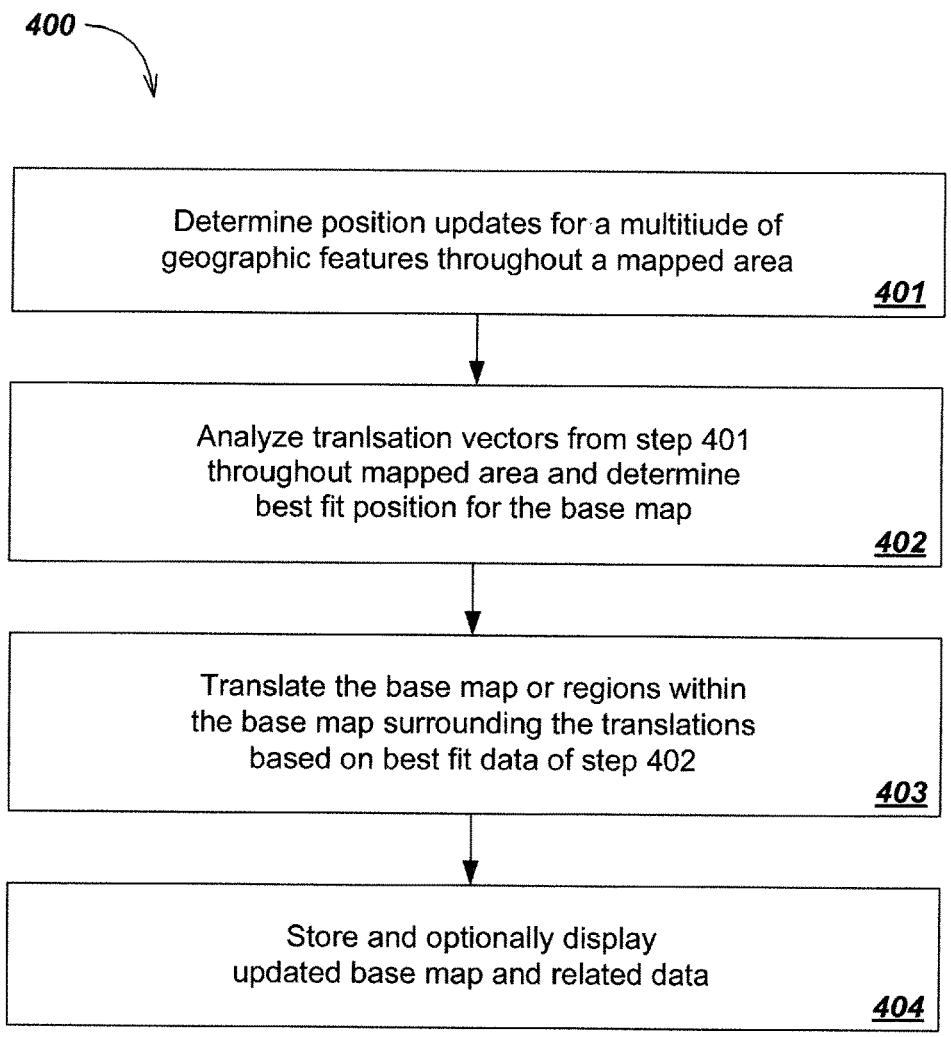
FIG. 4A is another method for geographic map updating.

Turning to FIG. 4A, a method 400 for geographic map updating is described. The method 400 may include a step 401 wherein the position of geographic features are updated using the method 100 of FIG. 1A or method 200 of FIG. 2. The step 401 may generally include determining translation vectors for updating a multitude of geographic feature positions within a mapped area. Within some method 400 embodiments, the geographic feature position updates of step 401 may be selectively chosen by a user and/or through machine algorithms to ensure the best possible position for each geographic feature. In a step 402, the translation vector(s) may be analyzed to determine a best fit in aligning the base map with the updated geographic feature positions. For instance, simultaneous locating and mapping (SLAM) algorithms, Kalman filters, neural network or like machine learning, bundle adjustment algorithms, particle filtering algorithms, averaging, scale invariant feature transform (SIFT), random sample consensus (RANSAC), or the like algorithms or techniques may be applied to a number of translation vectors, each having a magnitude and direction, to determine a geographic update for the base map position. In a step 403, the base map may be translated to the best fit determined within step 402. In some embodiments, only regions of the base map within a certain distance surrounding each translation. In such embodiments, such regions of map being translated may be user determined or determined by algorithms. It should also be noted that the updated geographic feature positions will be maintained through translation movements of a base map. In a step 404, the updated base map may be stored and/or optionally displayed.

Figure 4B:
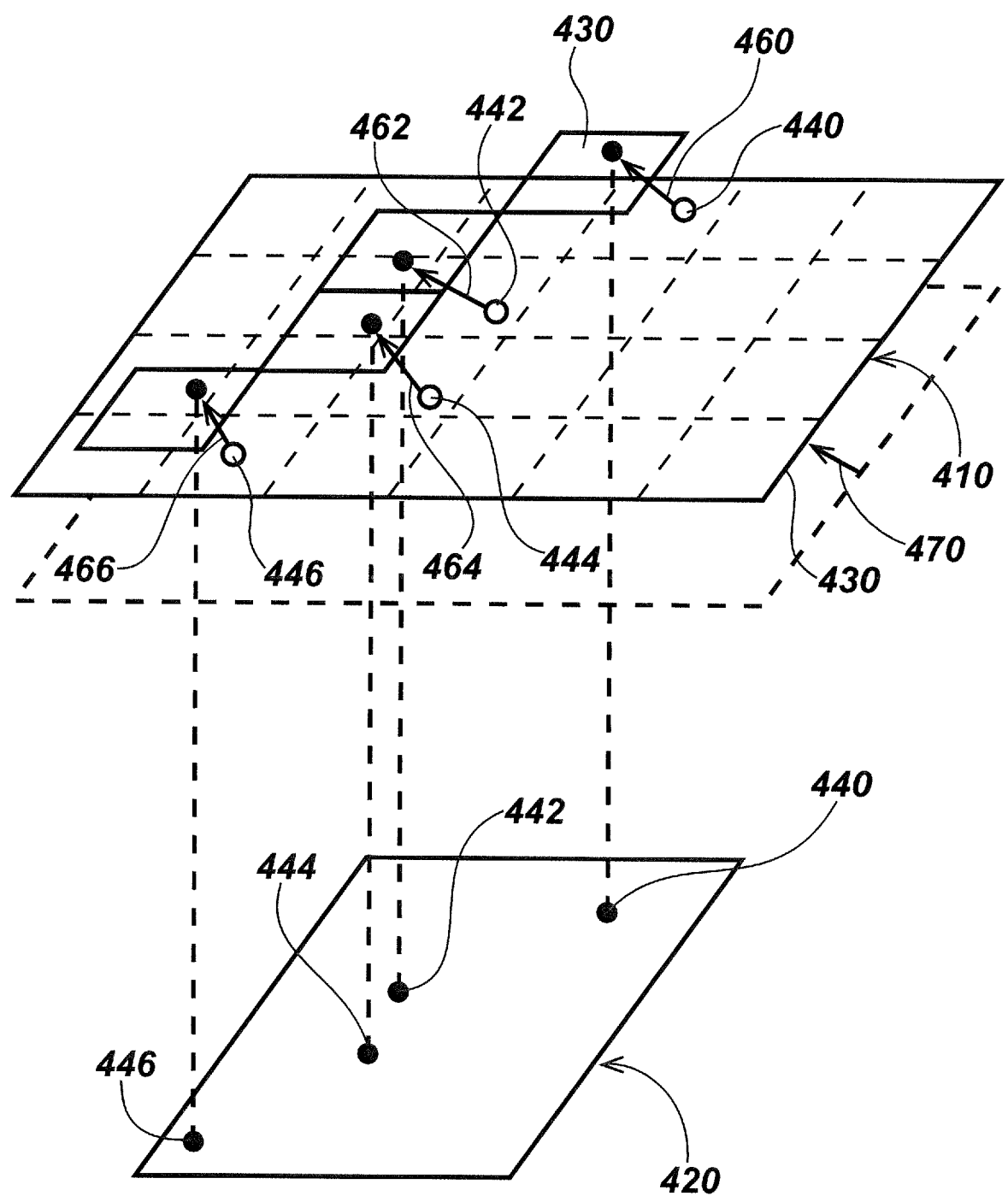
FIG. 4B is illustration demonstrating the geographic map updating method of FIG. 4A.

As illustrated in FIG. 4B, a base map 410 and an updated map area 420 may have a series of corresponding geographic features 440, 442, 446, and 448. Within the updated map 420, updated positions for geographic features 440, 442, 446, and 448 may be determined. The image tiles 430 containing each geographic feature 440, 442, 446, and 448 within the base map 410 may be translated along corresponding translation vectors 460, 462, 464, and 468 to align geographic features 440, 442, 446, and 448 within the base map 410 to the geographic features 440, 442, 446, and 448 within the updated map area 420. Rubber-sheeting or like techniques may be used on translated image tile(s) containing the geographic features to maintain smooth and continuous boundaries to neighboring image tiles. Such techniques may maintain the updated geographic feature position. The translation vectors 460, 462, 464, and 468 may be analyzed to determine a best fit in aligning the base map with the updated geographic feature positions. For instance, simultaneous locating and mapping (SLAM) algorithms, Kalman filters, neural network or like machine learning, bundle adjustment algorithms, particle filtering algorithms, averaging, scale invariant feature transform (SIFT), random sample consensus (RANSAC), or the like algorithms or techniques may be applied to a number of translation vectors, each having a magnitude and direction, to determine a geographic update translation 470 for the base map 410 position. In some embodiments, only regions of the base map 410 may be translated. These regions may be user determined or determined by algorithms or may be the image tiles or may be other feature regions. It should also be noted that the updated geographic feature 440, 442, 446, and 448 positions will be maintained through translation movements of a base map 410.

Figure 5A:
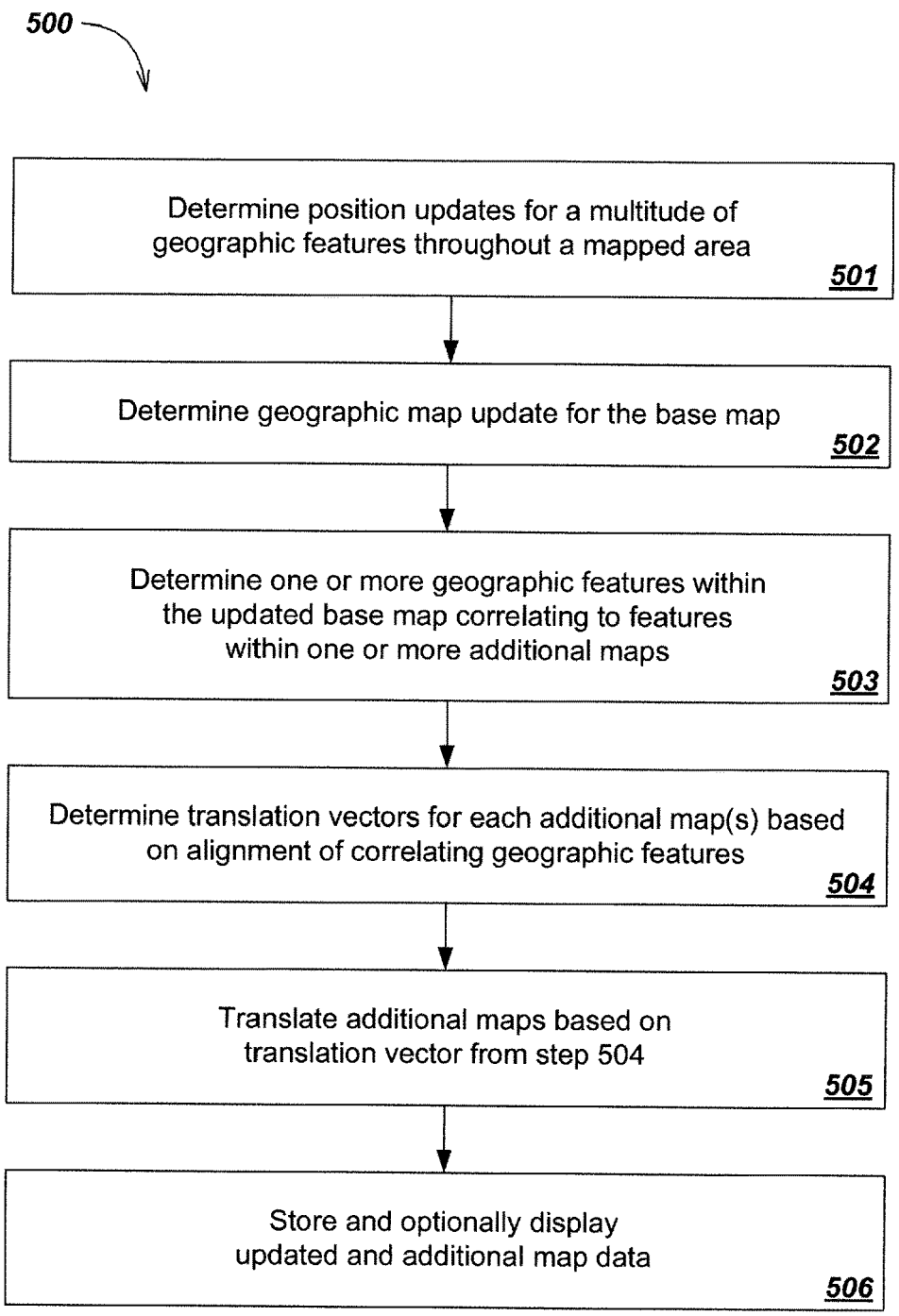
FIG. 5A is a method for updating additional maps based on features within a geographically updated base map.

Turning to FIG. 5A, a method 500 for geographic map updating is described for improving the accuracy for a multitude of maps. The method 500 may include a step 501 wherein the position of geographic features are updated using the method 100 of FIG. 1A or method 200 of FIG. 2.

In a step 502, a geographic map update may be determined using the method 300 of FIG. 3A or method 400 of FIG. 4A. In a step 503, one or more geographic features within the updated base map may be identified correlating to features within one or more additional maps. In a step 504, a translation for the other maps may be determined based on alignment of correlating geographic features. In a step 505, the one or more additional maps may be translated based on the determined translation within step 504. In a step 506, the updated map data may be stored and optionally displayed.

Figure 5B:
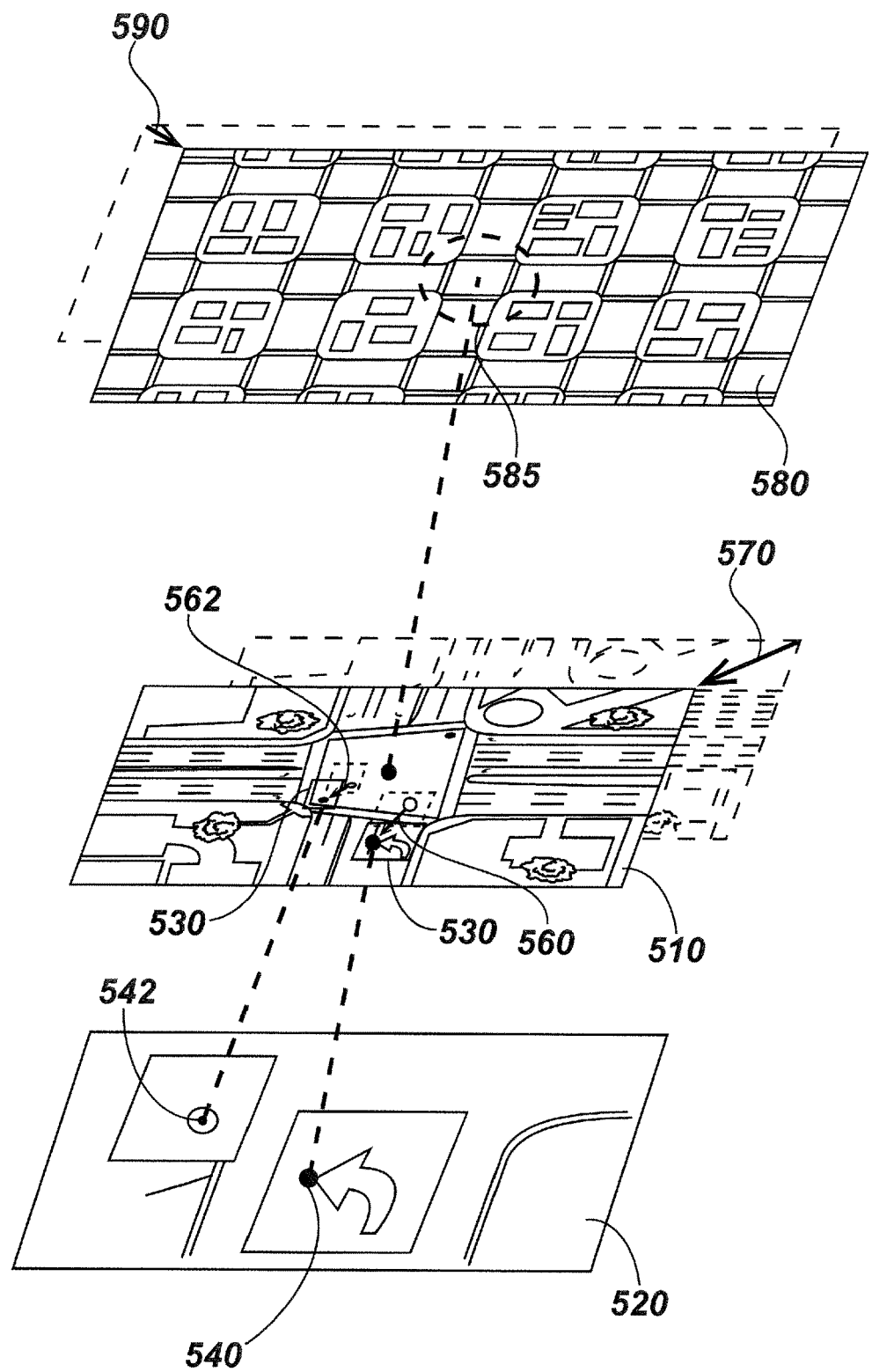
FIG. 5B is an illustration demonstrating the geographic map updating method of FIG. 5A.

Turning to FIG. 5B, a base map 510 and an updated map area 520 may have a series of corresponding geographic features 540 and 542. Within the updated map 520, updated positions for geographic features 540 and 542 may be determined. The image tiles 530 containing each geographic feature 540 and 542 within the base map 510 may be translated along corresponding translation vectors 560 and 562 to align geographic features 540 and 542 within the base map 510 to the geographic features 540 and 542 within the updated map area 520. In some embodiments, the image tiles 530 may instead be feature regions. Rubber-sheeting or like techniques may be used on translated image tile(s) or other feature region(s) containing the geographic features to maintain smooth and continuous boundaries to neighboring image tiles or other feature regions. Such techniques may maintain the updated geographic feature position. The translation vectors 560 and 562 may be analyzed to determine a best fit in aligning the base map with the updated geographic feature positions. For instance, simultaneous locating and mapping (SLAM) algorithms, Kalman filters, neural network or like machine learning, bundle adjustment algorithms, particle filtering algorithms, averaging, scale invariant feature transform (SIFT), random sample consensus (RANSAC), or the like algorithms or techniques may be applied to a number of translation vectors, each having a magnitude and direction, to determine a geographic update translation 570 for the base map 510 position. Once updated, additional geographic features within the base map 510 may be identified that may correlate to geographic features within additional maps such as map 580. For instance, the updated map area 520 may include detailed and high resolution images of each geographic feature 540 and 542 that may be used to determine the geographic map update for a larger scale base map 510. Likewise, various geographic features within the base map 510, such as feature 585, may correlate to that within map 580. The map 580 may, in some embodiments, be of larger scale than the base map 510. A geographic map update translation 590 may be determined to align the map 580 based on feature 585 position within the base map 510. In some embodiments, imagery from the updated map 520, base map 510, and/or map 580 may be merged into the updated map 520, base map 510, and/or map 580. For instance, the high resolution and detailed updated map 520 images may be merged into the base map 510 and/or map 580.

Figure 6:
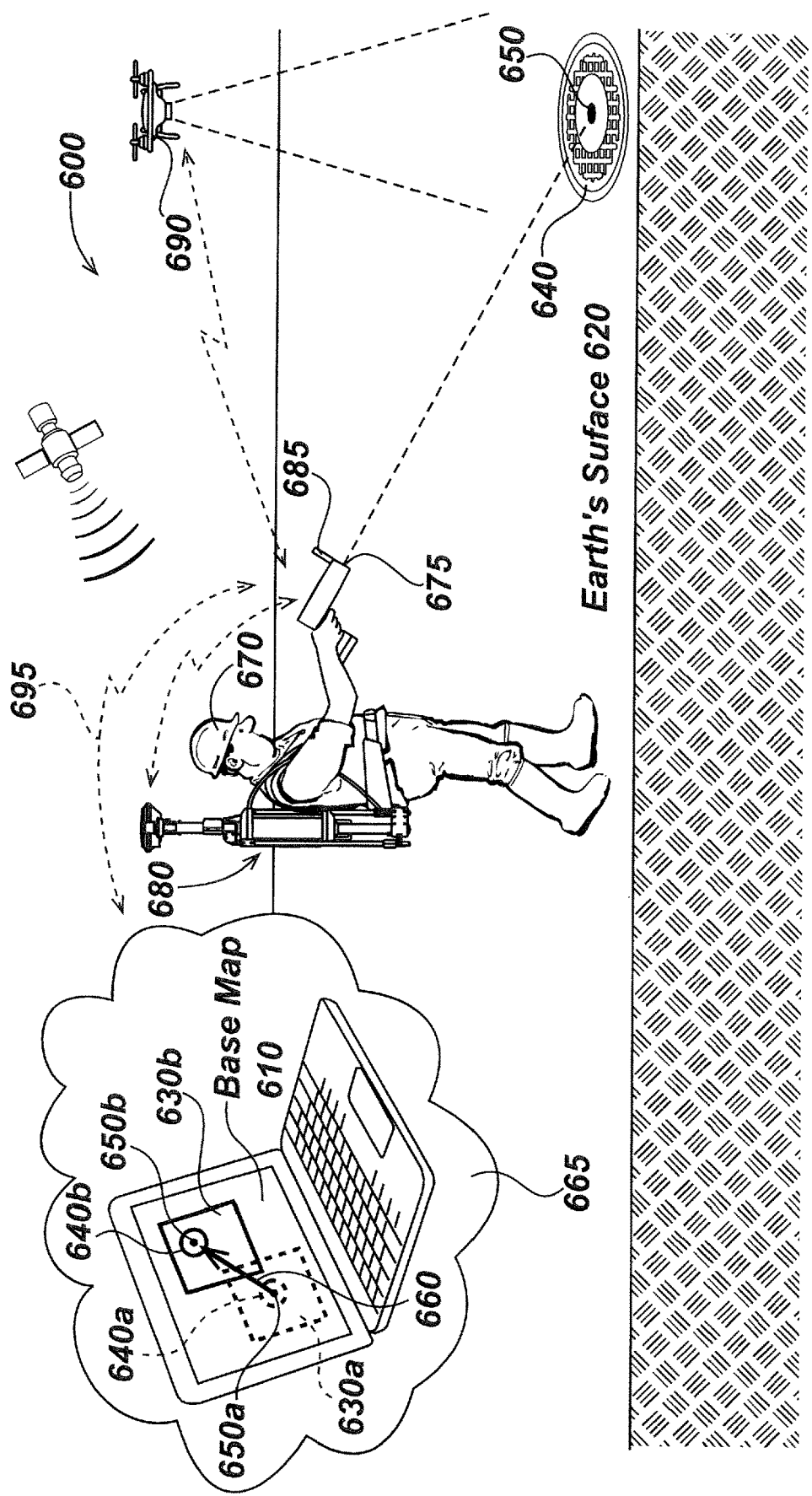
FIG. 6 is an illustration of an exemplary geographic map updating system.

Turning to FIG. 6, a geographic map updating system 600 may include a base map element 610 having at least one geographic feature 640a corresponding to a geographic feature 640 on the Earth's surface 620. Within geographic map updating system 600, the base map 610 may be a digital map accessed via one or more computing devices such as computing device 665. The computing device 665 illustrated in FIG. 6 is a laptop computer. In other embodiments in keeping with the present disclosure, a geographic map updating system may include various other computing devices including but not limited to tablets, smart phones, personal computers, utility locating system devices and/or other computing devices for storing and/or processing geographic feature and map data. The base map 610 may be stored locally on computing device 665 and/or may be stored in a remote server or like cloud based computing system. A geographic update for base map 610 may be determined wherein the position difference of a measured reference point 650b on a geographic feature 640b differs to that of a reference point 650a of a corresponding geographic feature 640a within the base map 610. The updated geographic feature 640b position may be determined via an update element wherein the geographic feature 640 is identified on the Earth's surface 620 and it's position is determined via reference point 650. For instance, within geographic map updating system 600 of FIG. 6 the user 670 may identify geographic feature 640 having a reference point 650. The geographic feature 640 may be measured at reference point 650 resulting in a reference point 650b measurement of geographic feature 640b. For instance, within the system 600 illustrated in FIG. 6, the user 670 may measure the position of reference point 650 on geographic feature 640 by aiming a tracked distance measuring device 675 at reference point 650. The tracked distance measuring device 675 may be of the variety disclosed in the incorporated U.S. patent application Ser. No. 15/866,360, filed Jan. 9, 2018, entitled TRACKED DISTANCE MEASURING DEVICES, SYSTEMS, AND METHODS. When actuated, the tracked distance measuring device 675 may measure a distance to reference point 650 on geographic feature 640 and, by communicating position data with a global navigation satellite system, such as GPS backpack device 680, determine the position of the reference point 650 and thereby geographic feature 640. The GPS backpack device 680 may be of the variety described in the incorporated U.S. patent application Ser. No. 13/851,951, filed Mar. 31, 2012, entitled DUAL ANTENNA SYSTEMS WITH VARIABLE POLARIZATION and U.S. patent application Ser. No. 14/214,151, filed Mar. 29, 2013, entitled DUAL ANTENNA SYSTEMS WITH VARIABLE POLARIZATION. In some embodiments, photographs, video, and/or other imagery of the geographic feature, such as geographic feature 640, and surrounding environment may be generated. For instance, within the system 600 illustrated in FIG. 6, the imagery may be generated by a smart phone 685 on tracked distance measuring device 675 and/or an unmanned aerial vehicle, such as drone 690, and/or other like device for generating geographic feature imagery. The updated geographic feature 640b reference point 650b position data, as well as any generated geographic feature imagery, may be communicated to one or more computing devices such as the computing device 665. For instance, a wireless signal 695 (e.g., using WIFI, Bluetooth, or other wireless technologies or protocols) may communicate updated geographic feature 640b reference point 650b position data between tracked distance measuring device 675, GPS backpack device 680, and/or smart phone 685 and computing device 665. Within a processing element, such as that which may be present within computing device 665, correlation of the measured and photographed geographic feature 640b to the corresponding geographic feature 640a within base map 610 may occur. For instance, pattern recognition or other machine learning algorithms or like techniques and algorithms may be used to determine correlating geographic features within base map 610. The updated position data of reference point 650b on geographic feature 640b may generate a translation vector 660 translating image tile 630a to image tile 630b position. In some embodiments, the translated image tiles, such as image tile 630a, may instead be other feature regions. Rubber-sheeting and/or other like techniques (not illustrated) may be used to distort the boundaries of the image tile 630b or other feature regions allowing the one or more translated image tiles 630b or other feature regions to seamlessly adjoin with neighboring image tiles or other feature regions while maintaining the positional accuracy of the updated geographic features. The resulting updated image tile 630b or other updated feature region and associated map data and images may be processed and/or stored locally on computing device 665 and/or uploaded to a remote server or other cloud based computing system. The updated geographic feature 640b data and related map data may further be communicated to other computing devices.

Figure 7:
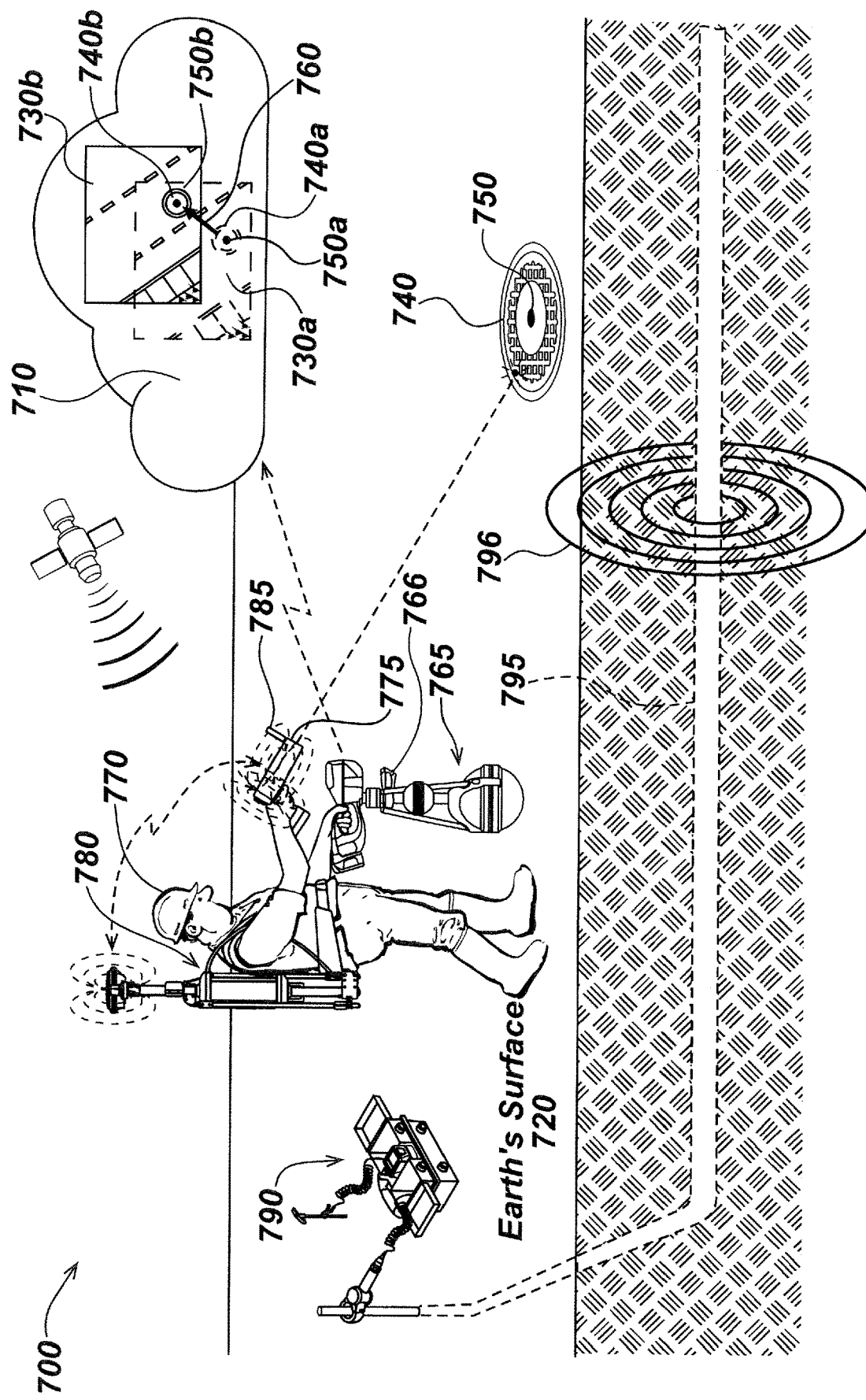
FIG. 7 is an illustration of a utility locating, mapping, and geographic feature identification system.

In keeping with the present disclosure, some geographic map updating system embodiments may include various utility locating, mapping, and geographic feature identification systems and devices. As illustrated in FIG. 7, a utility locating, mapping, and geographic feature identification system 700 may include a tracked distance measuring device 775 as held by a user 770 aimed towards a reference point 750 on a geographic feature 740. The tracked distance measuring device 775 may identify and generate position data for the reference point 750 on geographic feature 740. The tracked distance measuring device 775 and associated system devices may be of the variety as described in U.S. patent application Ser. No. 15/866,360, filed Jan. 9, 2018, entitled TRACKED DISTANCE MEASURING DEVICES, SYSTEMS, AND METHODS. As the user 770 actuates the tracked distance measuring device 775 to identify geographic feature 740 and measure the distance to reference point 750, the tracked distance measuring device 775 may generate one or more dipole signals that may be measured at a utility locator device 765 to determine the location and pose of the tracked distance measuring device 775 in three dimensional space. The utility locator device 765 may be of the variety described in U.S. patent application Ser. No. 15/866,360, filed Jan. 9, 2018, entitled TRACKED DISTANCE MEASURING DEVICES, SYSTEMS, AND METHODS and U.S. patent application Ser. No. 15/360,979, filed Nov. 25, 2016, entitled UTILITY LOCATING SYSTEMS, DEVICES, AND METHODS USING RADIO BROADCAST SIGNALS; as well as the utility locator and associated devices and systems described in the above incorporated applications. The utility locator device 765 may include GPS or like global satellite navigation systems as well as optical or inertial motion tracking devices such as the optical ground tracking device 766 for optically determining the positional movements of the utility locator device 765 along the Earth's surface 720. The optical ground tracking device 766 illustrated in FIG. 7 may be of the variety and described within the incorporated U.S. Pat. No. 9,841,503, issued Dec. 12, 2017, entitled OPTICAL GROUND TRACKING APPARATUS, SYSTEMS, AND METHODS. The position element of system 700 may further include a GPS backpack device 780 worn by user 770, may be used to determine or refine the geographic location of utility locator device 765 on the Earth's surface and, thereby, the position and pose of the tracked distance measuring device 775. The GPS backpack device 780 may be of the variety described in the incorporated U.S. patent application Ser. No. 13/851,951, filed Mar. 31, 2012, entitled DUAL ANTENNA SYSTEMS WITH VARIABLE POLARIZATION and U.S. patent application Ser. No. 14/214,151, filed Mar. 29, 2013, entitled DUAL ANTENNA SYSTEMS WITH VARIABLE POLARIZATION. The GPS backpack device 780 may include GNSS antennas and associated circuitry to determine refined position data as well as transceiver antennas and associated circuitry to broadcast one or more dipole signals measured at the utility locator device 765 and to send and receive wireless communication to and from the utility locator device 765, tracked distance measuring device 775, transmitter device 790, and/or other system devices. As described in the incorporated U.S. patent application Ser. No. 15/866,360, filed Jan. 9, 2018, entitled TRACKED DISTANCE MEASURING DEVICES, SYSTEMS, AND METHODS, the position of reference point 750 of geographic feature 740 along the Earth's surface 720 may be calculated and used to generate a geographic update for the base map 710 of the area. For instance, the base map 710 may indicate a reference point 750a position for geographic feature 740a. Upon determining the updated reference point 750b position for the geographic feature 740b, as determined with the utility locating, mapping, and geographic feature identification system 700, the geographic feature 740b may be correlated to geographic feature 740a within the base map 710. For instance, a photograph and/or other image of geographic feature 740 may be generated upon measuring the reference point 750b position through imagers on smart phone 785, within tracked distance measuring device 775, optical ground tracking device 766, utility locator device 765, and/or other system device. The geographic feature 740 images may be matched to that within base map 710 through pattern recognition or other machine learning algorithms. A translation vector 760 may be determined by finding the distance and direction from reference point 750a on geographic feature 740a original described in base map 710 to the measured reference point 750b on geographic feature 740b. Ann update may thereby be generated wherein all points within the image tile 730a containing the geographic feature 740a may be translated along translation vector 760 to the image tile 730b. In some embodiments, the translated image tiles, such as image tile 730a, may instead be other feature regions. Rubber-sheeting and/or other like techniques (not illustrated) may be used to distort the boundaries of the image tile 730b or other feature regions allowing the one or more translated image tiles 730b or other feature regions to seamlessly adjoin with neighboring image tiles or other feature regions while maintaining the positional accuracy of the updated geographic features. Processing and storing of position and other related map or other data may occur within the utility locator device 765, GPS backpack device 780, transmitter device 790, tracked distance measuring device 775 and/or smartphone 785 or other computing device, and/or may be processed and stored within a remote server or other cloud based computing system. The utility locator device 765 may also measure magnetic signal(s) 796 emitted by one or more utility lines 795 for the purposes of determining and mapping the one or more utilities 795 buried within the ground. The utility locating and mapping data may include location and orientation of the utility line as well as the pose of the utility line within the ground, the depth of the utility line, utility type, and the like. As illustrated in FIG. 7, the signal(s) 796 may be generated by and be coupled to utility line 795 via transmitter device 790. In some embodiments, the signals emitted by a buried utility may be coupled thereto from various other active sources (e.g., inherent within electric lines or coupled thereto by a connected transmitting device) and/or passive sources (e.g., coupled to the utility through broadcast radio signals or like ambient signal generating sources).

Figure 8A:
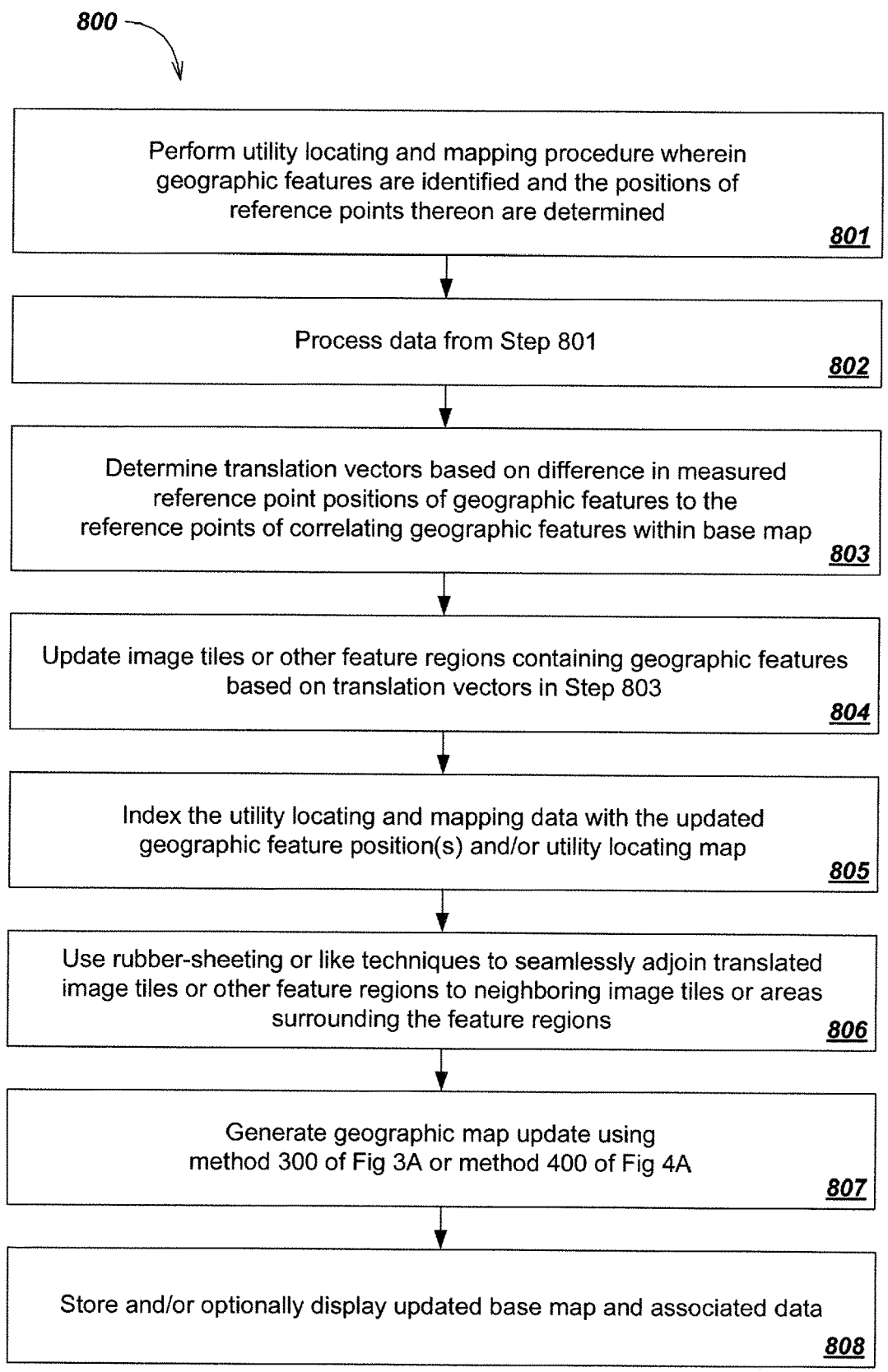
FIG. 8A is a method for geographic map updating using a utility locating, mapping, and geographic feature identification system.

Turning to FIG. 8A, a method 800 is described for using utility locating and mapping data to create a geographic update for maps of the same area. In a first step 801, a utility locating and mapping procedure is performed wherein one or more geographic features are identified and the positions are determined via a reference point on each geographic feature. Such systems and methods for generating utility locating and mapping data as well as geographic feature data may be found in the incorporated U.S. patent application Ser. No. 15/866,360, filed Jan. 9, 2018, entitled TRACKED DISTANCE MEASURING DEVICES, SYSTEMS, AND METHODS. Exemplary systems and devices for carrying out step 801 may, likewise, be described within the utility locating, mapping, and geographic feature identification system 700 illustrated in FIG. 7. For instance, a user equipped with a utility locator device, such as the utility locator device 765 of FIG. 7, may walk about an area and measure and map utility data. A user may also identify various geographic features within the locate area. The user may be equipped with a tracked distance measuring device, which may be a tracked distance measuring device 775 as illustrated in FIG. 7, for identifying and determining the position of a reference point on one or more geographic features. In such a utility locating and mapping operation, geographic features may generally be mapped to identify elements within the locate area that may influence magnetic data measured by the utility locator device. Optionally, the utility locating, mapping, and geographic feature identification system may photograph or otherwise generate imagery of the one or more geographic features. Such geographic features may further be found within a base map covering the same area in order to update and refine the geographic location of the map relative to the Earth's surface. Correlating of geographic features within a base map to those identified during the utility locating and mapping operation may include the use of pattern recognition or other machine learning algorithms or like techniques and algorithms to determine coinciding geographic features within the base map. In a step 802, utility locating and geographic feature data gathered in step 801 may be processed. The processing element or elements for carrying out the data processing for step 802 may, in part or in full, be included within a utility locator device (e.g., utility locator device 765 of FIG. 7), tracked distance measuring device (e.g., tracked distance measuring device 775 of FIG. 7), a computing device such as a smartphone (e.g., smartphone 785 of FIG. 7) or laptop (e.g., computing device 665 of FIG. 6), and/or other computing device or system device (e.g., system device 900 of FIG. 9) capable of receiving and processing the utility locating and mapping data as well as geographic feature data. Likewise, processing of data may occur within a remote server or other cloud based computing system. The processing may occur in real time or near real time and/or fully or partially occur in a post processing procedure in one or more devices. In a step 803, differences in reference point location(s) of each geographic feature from step 801 to one or more correlating geographic feature reference point location(s) within the base map of the same area may be calculated to determine one or more translation vectors for each geographic feature update. In a step 804, the image tile(s) or other feature region(s) containing the geographic feature within the base map may be updated based the corresponding one or more translation vectors from step 803. In a step 805, the utility locating and mapping data may be indexed with the updated geographic feature position data and/or otherwise within the updated base map. In a step 806, rubber-sheeting and/or other like techniques may be used to distort the boundaries of the image tile(s) or other feature region(s) allowing the one or more translated image tiles to seamlessly adjoin with neighboring image tiles or other feature regions while maintaining the positional accuracy of the updated geographic features. In a step 807, a geographic map update for the base map may be determined using the method 300 of FIG. 3A or method 400 of FIG. 4A. In some embodiments, the utility locating map imagery and data, including the location of utility therein, may optionally be merged into the base map. In a step 808, store and optionally display the updated base map and/or utility locating map and related data.

Figure 8B:
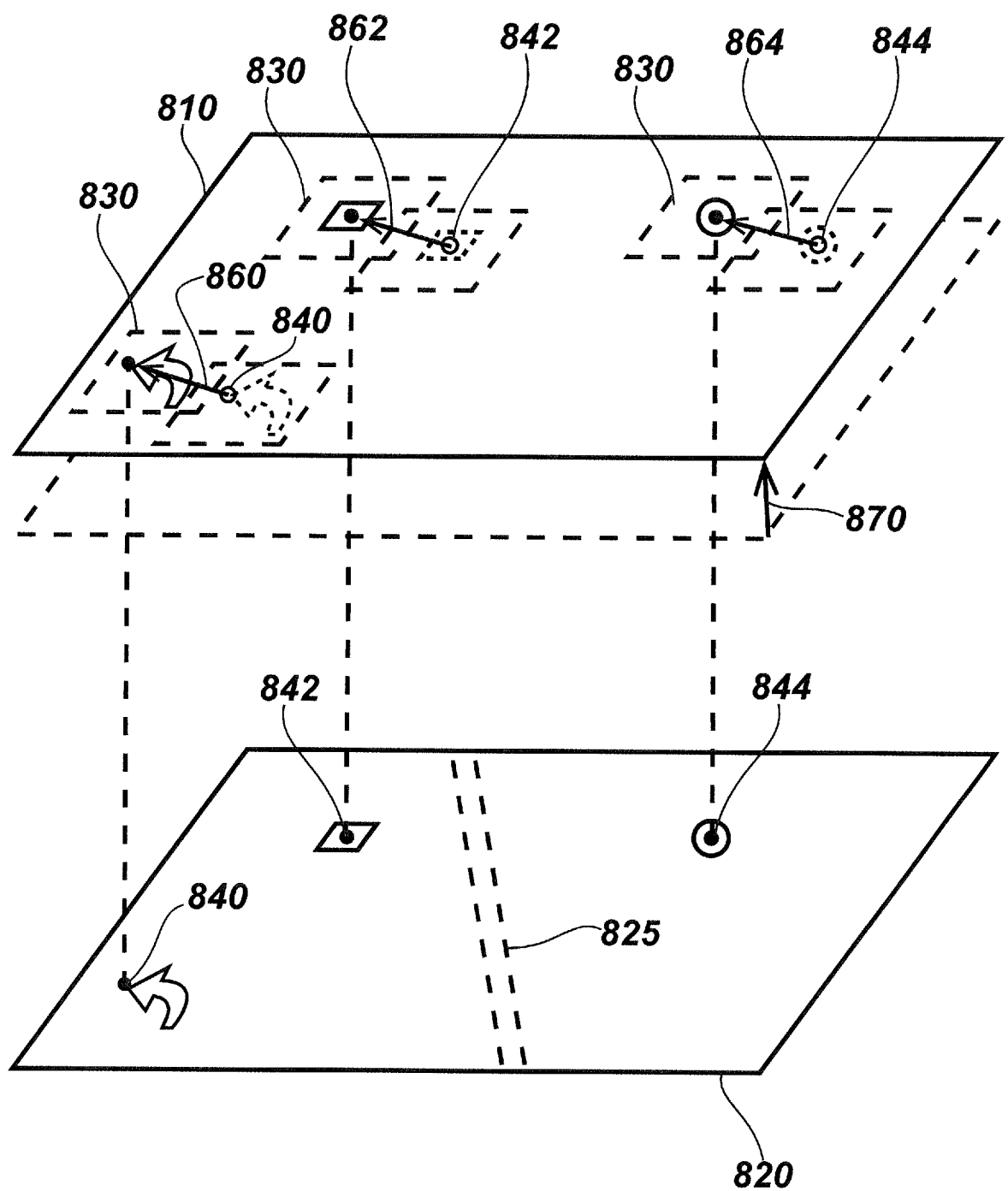
FIG. 8B is an illustration of a utility locating map with a utility line indexed therein aligning and merging with a base map.

As illustrated in FIG. 8B, the utility locating map 820 may be generated in which a number of geographic features 840, 842, and 844 positions are determined correlating to geographic features 840, 842, and 844 within a base map 810 of the same area. Utility line locations and/or other related utility data, such as utility line 825, may be included within the utility locating map 820. Based on the geographic features 840, 842, and 844 positions within the utility locating map 820, translation vectors 860, 862, and 864 may be determined to update image tiles 830 or other feature regions. Rubber-sheeting and/or other like techniques (not illustrated) may be used to distort the boundaries of the image tiles 830 or, in other embodiments, other feature regions containing geographic features 840, 842, and 844 allowing the one or more translated image tiles 830 or other feature regions to seamlessly adjoin with neighboring image tiles 830 or other feature regions. The translation vectors 860, 862, and 864 may be analyzed to determine a best fit in aligning the base map 810 with the updated geographic feature 840, 842, and 844 positions. For instance, simultaneous locating and mapping (SLAM) algorithms, Kalman filters, neural network or like machine learning, bundle adjustment algorithms, particle filtering algorithms, averaging, scale invariant feature transform (SIFT), random sample consensus (RANSAC), or the like algorithms or techniques may be applied to a number of translation vectors, each having a magnitude and direction, to determine a geographic update translation 870 for the base map 810 position. Processing of data may occur within one or more processing elements within one or more system devices. For instance, computing devices may be included within a utility locator device, smartphone, tablet, laptop, remote server or other cloud based computer, tracked distance measuring device, and/or various other utility locating devices or other computing devices.

Figure 9:
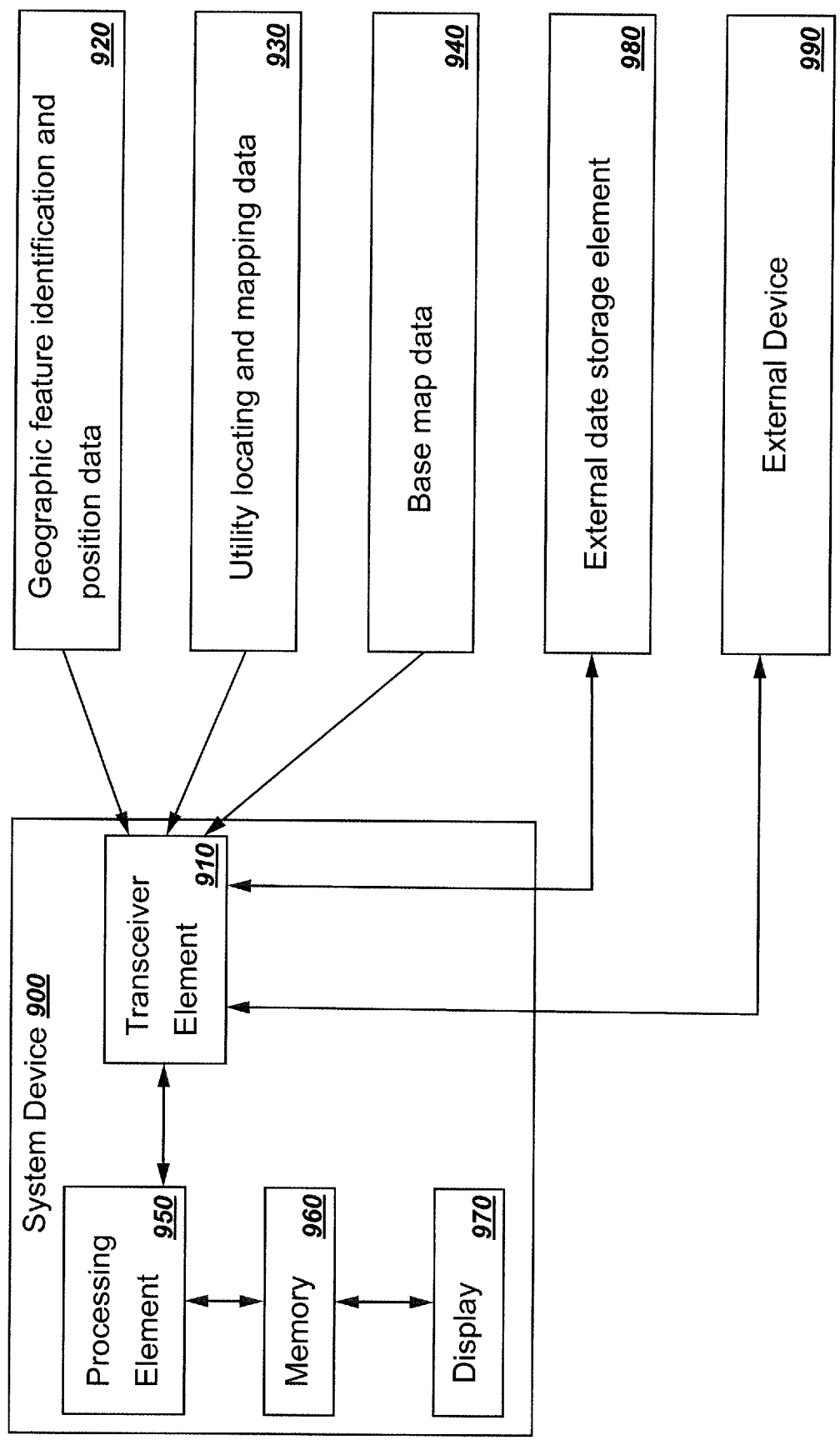
FIG. 9 is a diagram of an exemplary system device for geographic map updating.

As illustrated in FIG. 9, an exemplary system device 900 may include a transceiver element 910 for sending or receiving various types of data. The transceiver element 910 may be or include WIFI, Bluetooth, ISM, and/or other wireless modules or systems and associated circuitry for wirelessly sending and receiving data. In some embodiments the transceiver element 910 may include a wired connection to send and receive such data. In further embodiments, such as with a utility locator device, the transceiver element 910 may include antennas and circuitry to measure magnetic signals emitted by utility lines and/or other conductors. The transceiver element 910 may receive various types of data including geographic feature identification and position data 920, utility locating and mapping data 930, and base map data 940 which may further be communicated to one or more processing elements 950 for generating updated maps and correlating utility locating and mapping data therewith. The processing element(s) 950 may be or may include a single processor, or multiple processors, all of which could include multiple computing elements. The processor elements(s) may be implemented as one or more microprocessors, microcomputers, microcontrollers, digital signal processors, central processing units, state machines, logic circuitries, field-programmable gate array (FGPA), and/or any devices that manipulate signals based on operational instructions. Among other capabilities, the processor element(s) may be configured to fetch and execute computer-readable instructions and data stored in the memory, such as memory 960. In some embodiments, base map data 940 may preemptively be stored within memory 960 prior to receiving geographic feature identification and position data 920 and/or utility locating and mapping system data 930. The memory 960 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Likewise, such exemplary memory may be included in external data storage element(s) 980 and/or other external device(s) 990 which may access the data of system device 900. Optionally, system device 900 may include a display 970 for displaying maps or other data to a user. Likewise, such maps and associated data may be communicated to one or more external devices 990 for display and use of such data.

In some geographic map updating embodiments of the present disclosure, the image tiles or other feature regions of the base map may translate to updated data positions while in other embodiments the updated data may translate to the base map positions. As used herein, "updated data" may refer to the data relating to the updated geolocation of a geographic feature or reference point that may differ to the corresponding geographic feature or reference point in the base map. The embodiments wherein the base map is translated to the updated data, such as illustrated with FIG. 10A, an updated map may be generated having enhanced accuracy. In other embodiments wherein the updated data is translated to the base map, such as illustrated with FIG. 10B, the resulting updated map may allow a user a visual sense of the updated data locations relative to geographic features in the base map without having to manipulate the base map. In such embodiments, the translation of updated data may be visual only and metadata or other data relating to the updated data may be preserved. For instance, where the updated data includes utility positions in the ground, the user may benefit from gaining a visual sense of the utilities locations relative to known geographic features while the world coordinates of the utilities may remain untranslated.

Figure 10A:
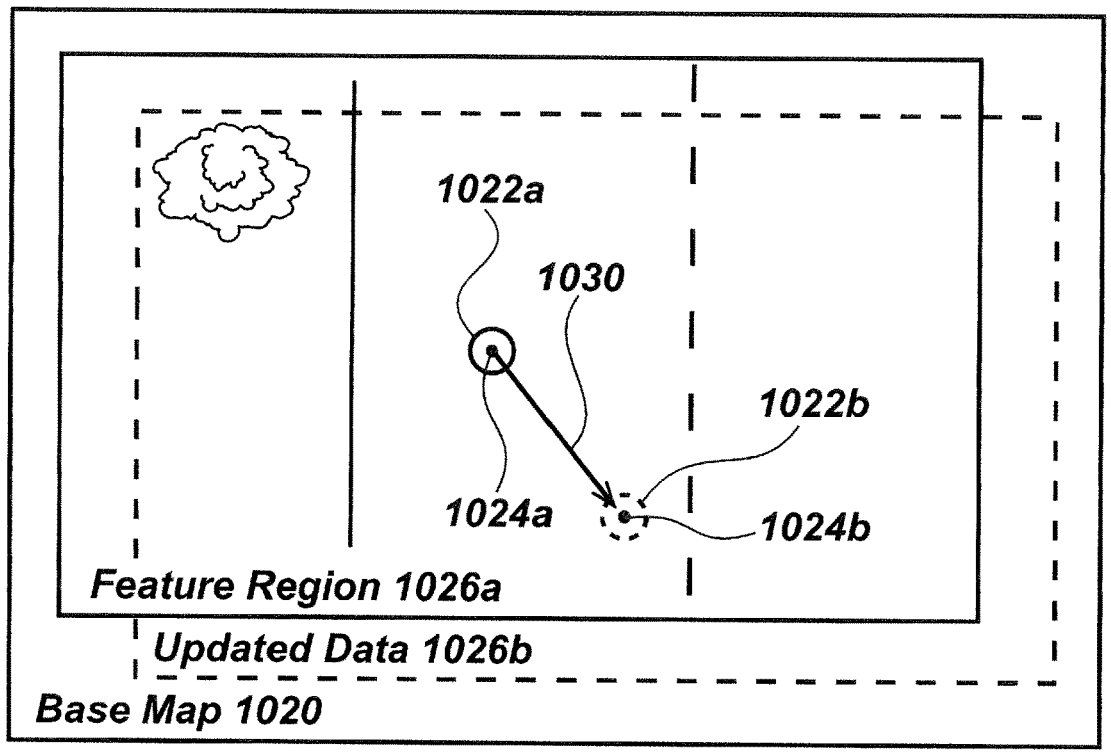
FIG. 10A is an illustration of a geographic map update wherein the feature region translates to the updated data.

Turning to FIG. 10A, a base map 1020 may indicate an initial location for a geographic feature 1022*a* with an initial reference point 1024*a* in a feature region 1026*a*. The base map 1020 may comprise a series of contiguous satellite or other aerial photographs or image tiles seamlessly joined together or other feature regions, such as feature region 1026*a*, that may represent the Earth's surface. Updated data 1026*b*, including a revised a geographic feature 1022*b* position measured at an updated reference point 1024*b*, may be determined (e.g., through a utility locating and mapping procedure or other mapping procedure). A translation vector 1030 may be determined between the initial reference point 1024*a* position and the updated reference point 1024*b* position. The feature region 1026*a* containing the geographic feature 1022*a* may translate to the updated geographic feature 1022*b* location along translation vector 1030. The resulting updated map may have improved accuracy over the original base map.

Figure 10B:
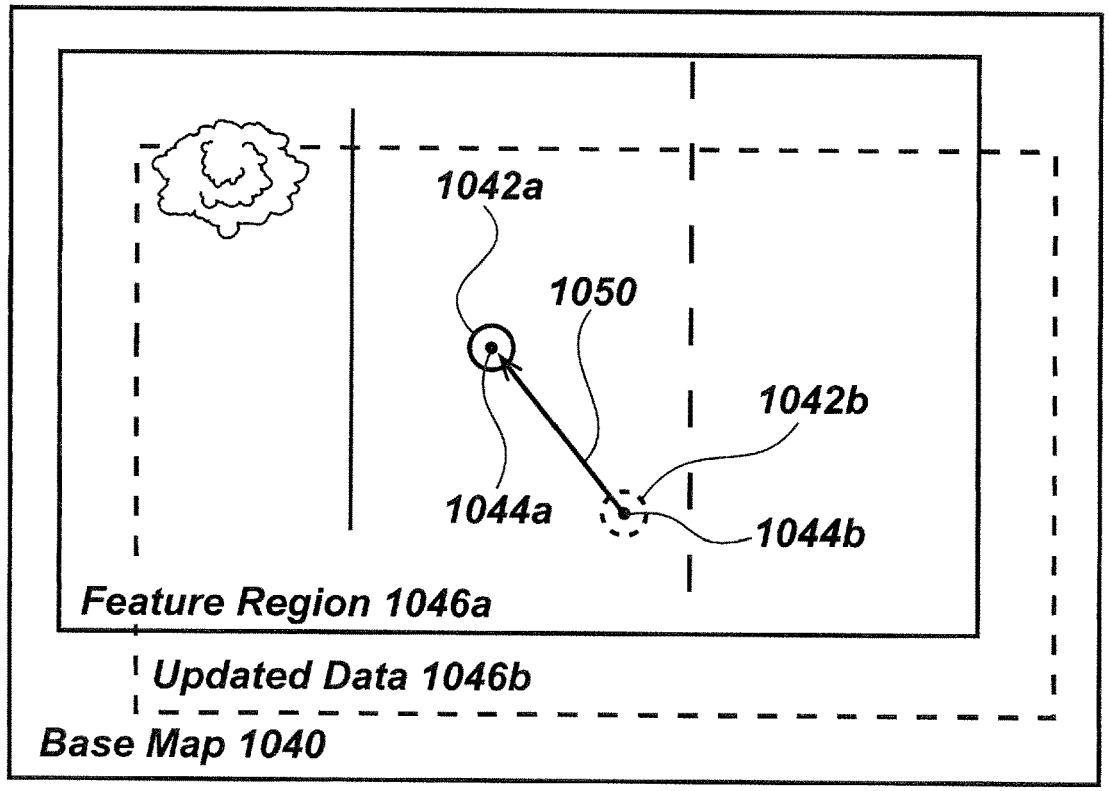
FIG. 10B is an illustration of a geographic map update wherein the updated data translates to the feature region.

Turning to FIG. 10B, a base map 1040 may indicate an initial location for a geographic feature 1042*a* with an initial reference point 1044*a* in a feature region 1046*a*. Updated data 1046*b* including a geographic feature 1042*b* measured at an updated reference point 1044*b* may be determined. A translation vector 1050 may be determined between the updated reference point 1044*b* position and the initial reference point 1044*a* in the feature region 1046*a* of the base map 1040. The updated data 1046*b* including the geographic feature 1042*b* may translate along translation vector 1050 to the geographic feature 1042*a* location. The translation of updated data 1046*b* to the original geographic feature 1042*b* of the base map 1040 may result in an updated map where a user may visually identify the location of geographic features but other data of the updated data 1046*b* (e.g., utility line positions existing beneath the ground or like data) may retain their original world coordinates. By retaining their original coordinates, a user may visually be informed of the updated data location relative to the geographic features on the base map while having access to their precise location through GPS or other world coordinate location data.

Figure 11:
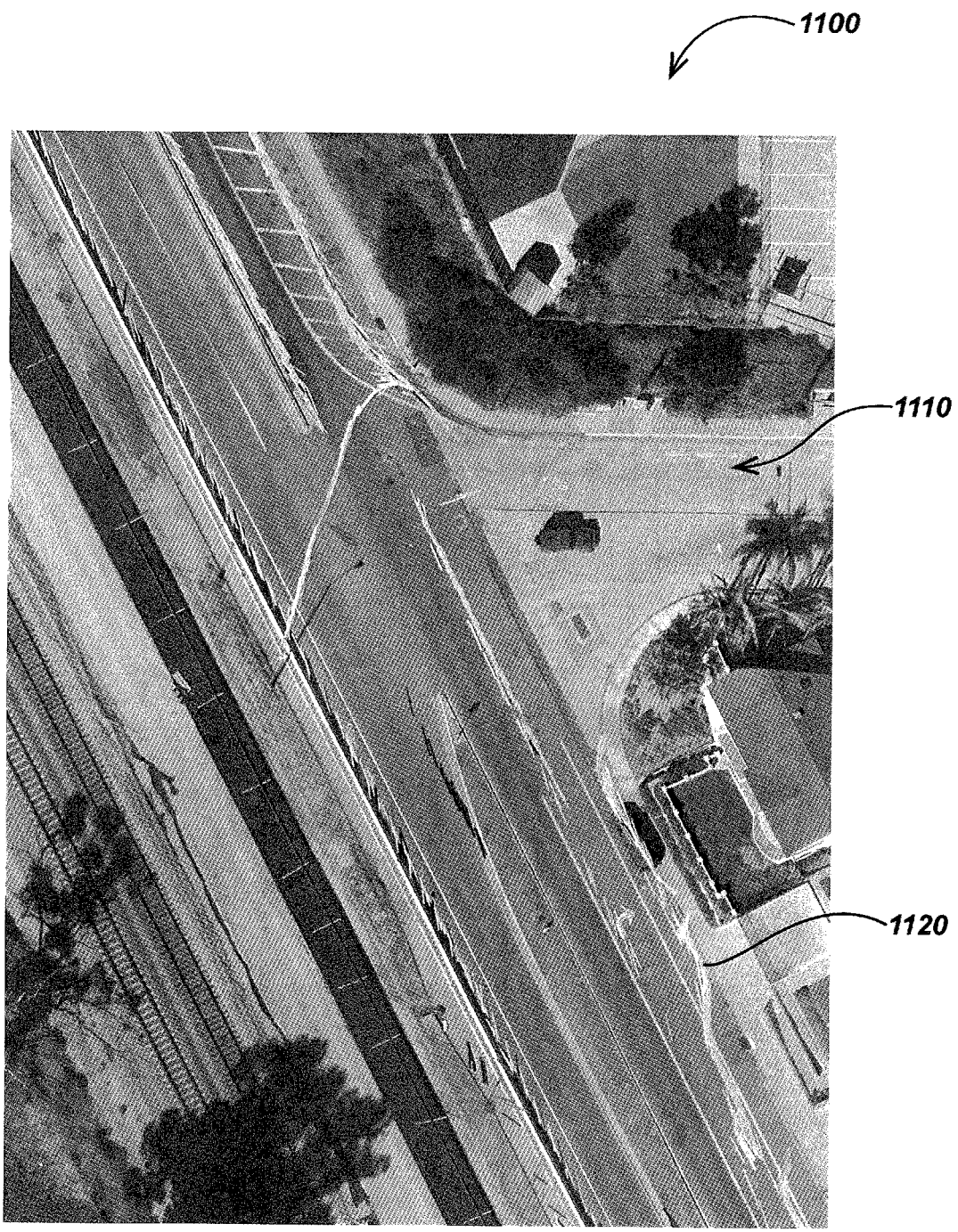
FIG. 11 is an exemplary utility map.

Turning to FIG. 11, an exemplary utility map 1100 is illustrated estimative of utility line positions and locations below the Earth's surface. The utility map 1100 may, for instance, utilize the methods and systems disclosed in the incorporated U.S. Provisional Patent Application 62/777,045, filed Dec. 7, 2018, entitled MAP GENERATION BASED ON UTILITY LINE POSITION AND ORIENTATION ESTIMATES, the content of which is incorporated by reference herein in its entirety. In FIG. 11, the utility map 1100 may comprise a map 1110 of a geographical region containing a series of line segments 1120. Each line segment 1120 may be estimative of a utility line location at a point on the Earth's surface as measured at a discrete point. In some such utility map embodiments each segment, such as segments 1120, may be color coded according to aspects of the geographic location associated with the discrete point of utility line position and orientation estimation. For instance, the selected color of each line segment 1120 may reference measured signal strength, current, phase, a utility position and orientation estimating device velocity, and/or depth of utility. For example, the line segment length may be proportional to data collection velocity and/or the opacity of each line segment may correspond to a quality metric of the data. Various other characteristics of each line segment may likewise be altered to communicate information regarding the geographic location associated with the discrete point of utility line position and orientation estimation which may include details regarding the utility line at that location. Line segment color or saturation, line width or length, pattern or styling of line, and/or opacity may all be changed to communicate such information. In other utility map embodiments, the utility line positions and orientations may be represented in various other ways.

The location and position of utility lines represented in a utility map, such as segments 1120 of utility map 1100 in FIG. 11, may be indexed to geographic features in the same utility map. In some embodiments, utility line locations and positions may be indexed in a base map in various ways. For instance, utility data may be represented using the method 1200 of FIG. 12A or method 1300 of FIG. 13A or using the various other methods described herein wherein the utility line position and other data may be indexed to the base map or indexed to the geographic feature locations or the updated data.

Figure 12A:
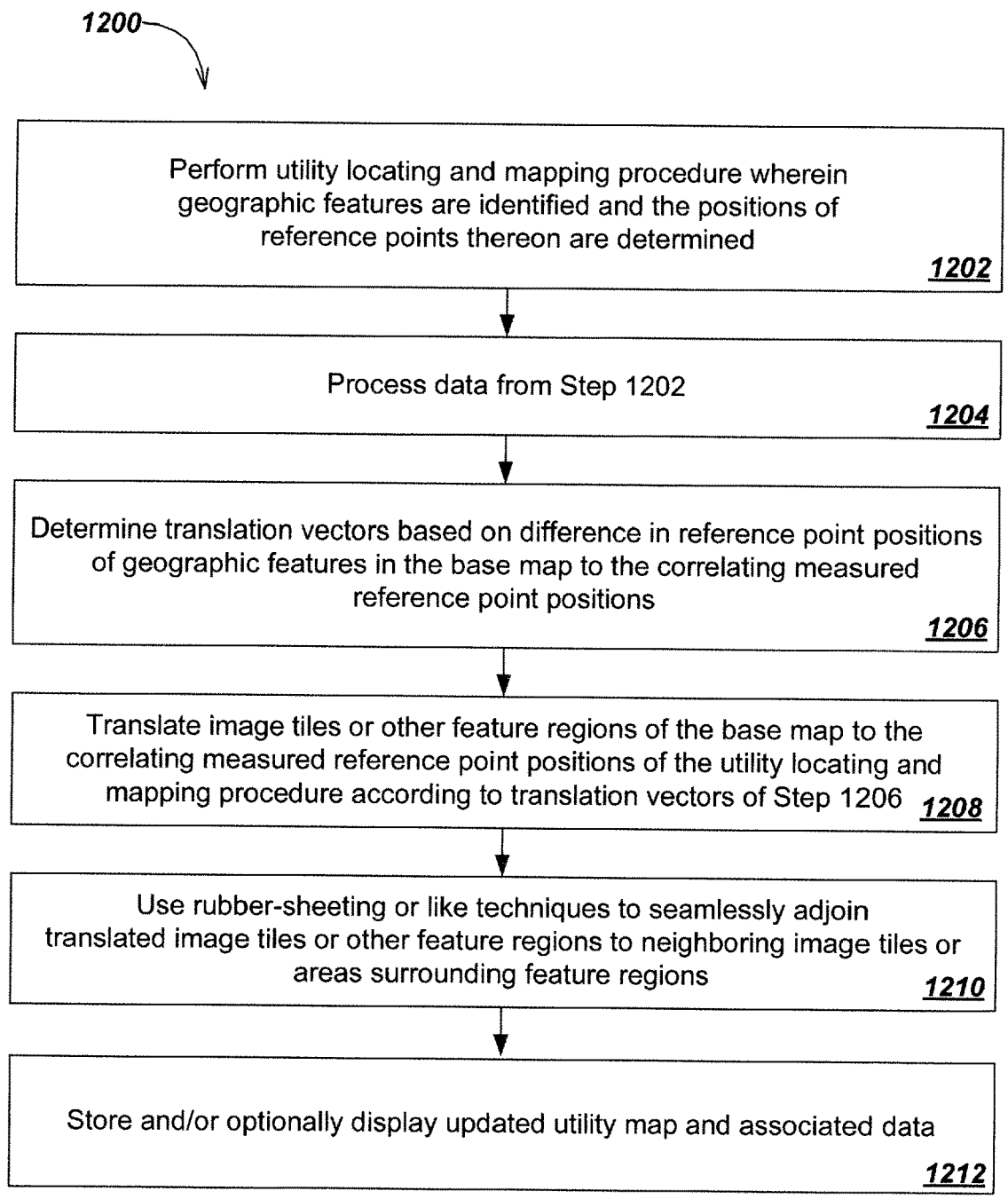
FIG. 12A is a method for geographic map updating to generate a utility locating map.

Turning to FIG. 12A, a method 1200 is disclosed having a step 1202 in which a utility locating and mapping procedure is performed wherein one or more geographic features are identified and the positions are determined via a reference point on each geographic feature. Such systems and methods for generating utility locating and mapping data as well as geographic feature data may be found in the incorporated U.S. patent application Ser. No. 15/866,360, filed Jan. 9, 2018, entitled TRACKED DISTANCE MEASURING DEVICES, SYSTEMS, AND METHODS. Exemplary systems and devices for carrying out step 1202 may, likewise, be described within the utility locating, mapping, and geographic feature identification system 700 illustrated in FIG. 7. For instance, a user equipped with a utility locator device, such as the utility locator device 765 of FIG. 7, may walk about an area and measure and map utility data. A user may also identify various geographic features within the locate area. The user may be equipped with a tracked distance measuring device, which may be a tracked distance measuring device 775 as illustrated in FIG. 7, for identifying and determining the position of a reference point on one or more geographic features. In such a utility locating and mapping operation, geographic features may generally be mapped to identify elements within the locate area that may influence magnetic data measured by the utility locator device. Optionally, the utility locating, mapping, and geographic feature identification system may photograph or otherwise generate imagery of the one or more geographic features. Such geographic features may further be found within a base map covering the same area in order to update and refine the geographic location of the map relative to the Earth's surface. Correlating of geographic features within a base map to those identified during the utility locating and mapping operation may include the use of pattern recognition or other machine learning algorithms or like techniques and algorithms to determine coinciding geographic features within the base map. In a step 1204, utility locating and geographic feature data gathered in step 1202 may be processed. The processing element or elements for carrying out the data processing for step 1204 may, in part or in full, be included within a utility locator device (e.g., utility locator device 765 of FIG. 7), tracked distance measuring device (e.g., tracked distance measuring device 775 of FIG. 7), a computing device such as a smartphone (e.g., smartphone 785 of FIG. 7) or laptop (e.g., computing device 665 of FIG. 6), and/or other computing device or system device (e.g., system device 900 of FIG. 9) capable of receiving and processing the utility locating and mapping data as well as geographic feature data. Likewise, processing of data may occur within a remote server or other cloud based computing system. The processing may occur in real time or near real time and/or fully or partially occur in a post processing procedure in one or more devices. In a step 1206, translation vectors may be determined based on differences in reference point positions of geographic features in the base map to correlating reference point positions measured in the utility locating and mapping procedure. In a step 1208, the image tiles or other feature regions containing the geographic features of the base map may be translated according to the translation vectors of step 1206. In a step 1210, rubber-sheeting and/or other like techniques may be used to distort the boundaries of the image tile(s) or other feature region(s) allowing the one or more translated image tiles or feature regions to seamlessly adjoin with neighboring image tiles or feature regions while maintaining the positional accuracy of the updated geographic features. In a step 1212, an updated utility map may be stored or optionally displayed based on the translated features and utility positions and related data. The method 1200 may be carried out in post processing where the data has been stored in a database or may be done in real time or near real time and displayed on a locator display, laptop, smart phone, and/or other computing device.

The translation of geographic features of a base map based on updated geographic feature locations via utility locating and mapping procedure data of method 1200 of FIG. 12A is further illustrated in the sequence of FIGS. 12B-12E.

Figure 12B:
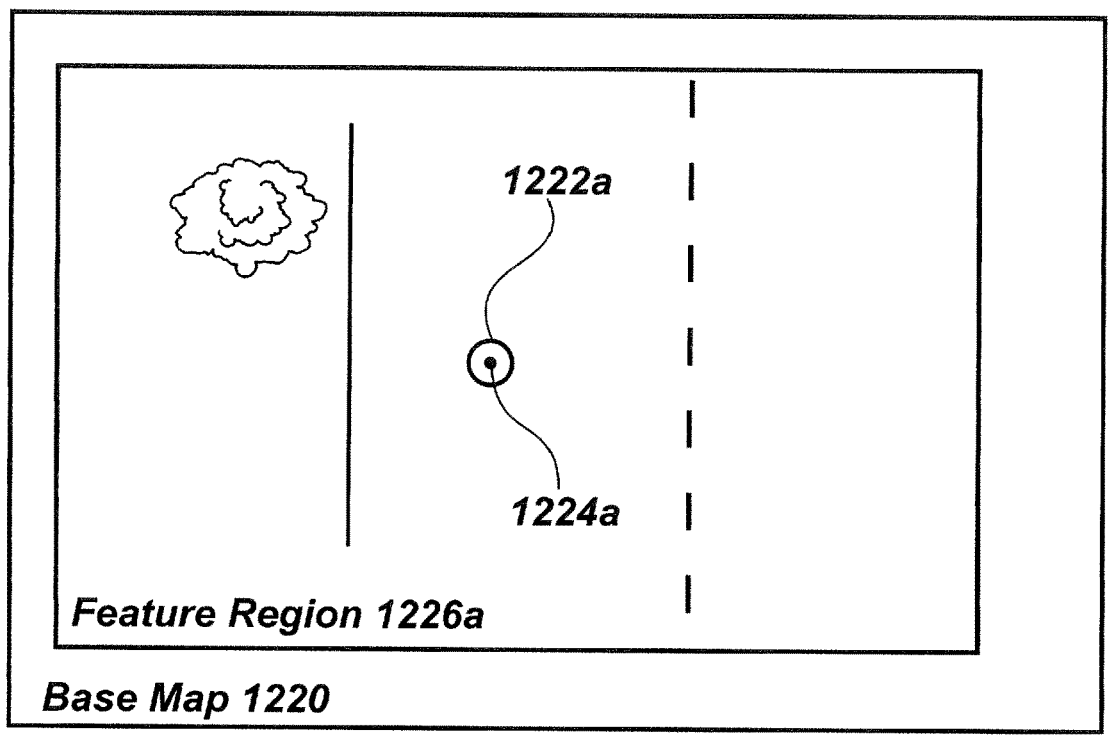
FIG. 12B is an illustration of a base map having at least one identified geographic feature with associated reference point.

As illustrated in FIG. 12B, a base map 1220 may indicate an initial location for a geographic feature 1222*a* with an initial reference point 1224*a* in a feature region 1226*a*. The base map 1220 may comprise a series of contiguous satellite or other aerial photographs or image tiles seamlessly joined together or other feature regions, such as feature region 1226*a*, that may represent the Earth's surface.

Figure 12C:
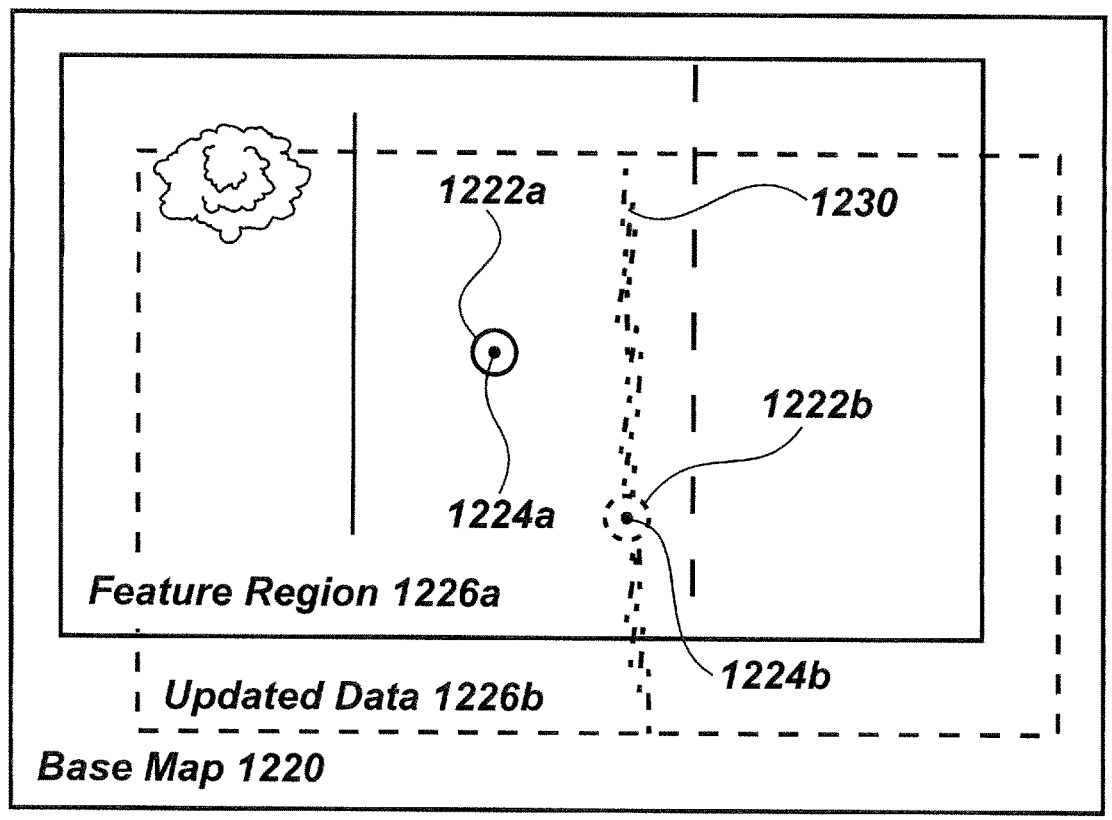
FIG. 12C is an illustration of the base map from step 12B overlaid with utility line position data relative to an updated position of the geographic feature as determined through a utility locating and mapping procedure.

Turning to FIG. 12C, during a utility locating and mapping procedure, updated data 1226*b* for a geographic feature 1222*b* with an updated reference point 1224*b* is determined which may have utility line positions and other utility data indexed thereto. The utility line position and related utility data is represented by a series of line segments 1230 in FIG. 12C.

Figure 12D:
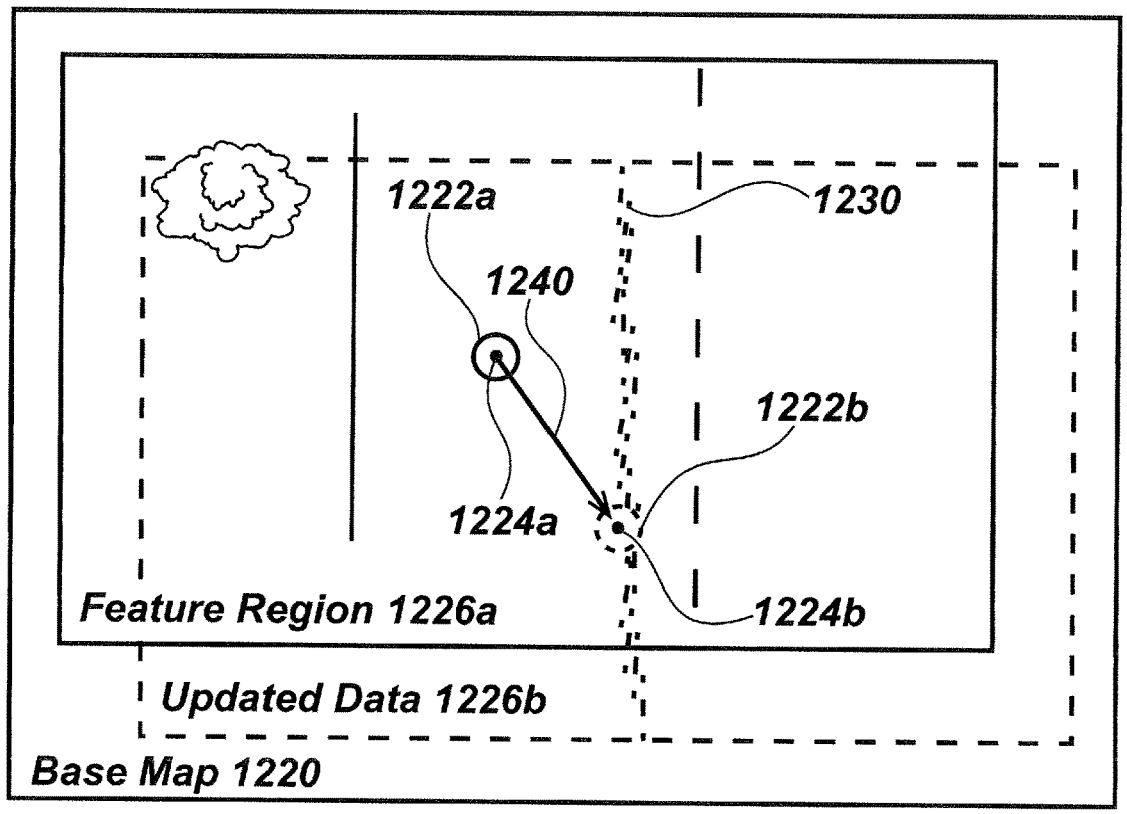
FIG. 12D is the illustration from FIG. 12C with a translation vector.

Turning to FIG. 12D, a translation vector 1240 may be determined between the initial reference point 1224*a* position and the updated reference point 1224*b* position determined by the utility locating and mapping procedure. The feature region 1226*a* containing the geographic feature 1222*a* may translate to the updated geographic feature 1222*b* location determined during the utility locating and mapping procedure.

Figure 12E:
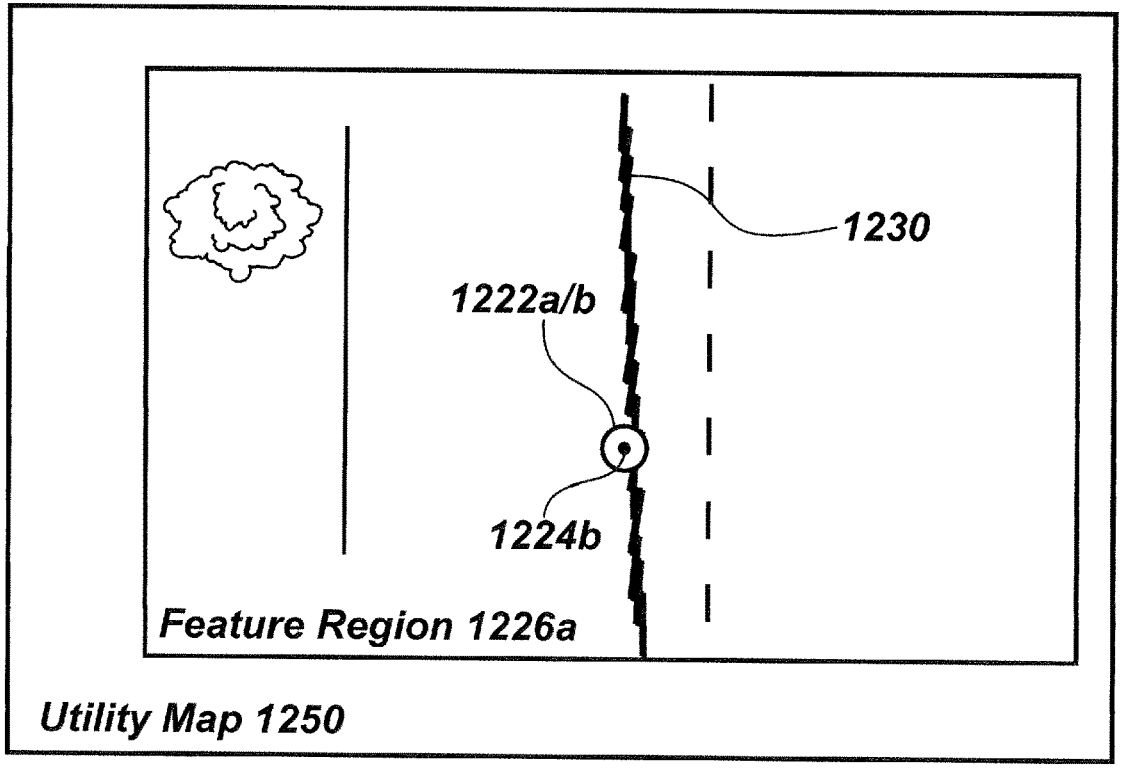
FIG. 12E is an illustration of a utility map having the geographic feature of the base map translated to the updated position determined by the utility locating and mapping procedure.

Turning to FIG. 12E, a utility map 1250 may be generated and optionally displayed and/or stored based on the image of the geographic feature 1222*a* translated to the updated geographic feature 1222*b* location of updated data 1226*b* (illustrated as the alignment of geographic feature 1222*a/b* in FIG. 12E). The utility position and other utility data remaining in place according to its determined location via the utility locating and mapping procedure. The resulting utility map 1250 may provide for a map with improved accuracy while displaying the utility positions.

Figure 13A:
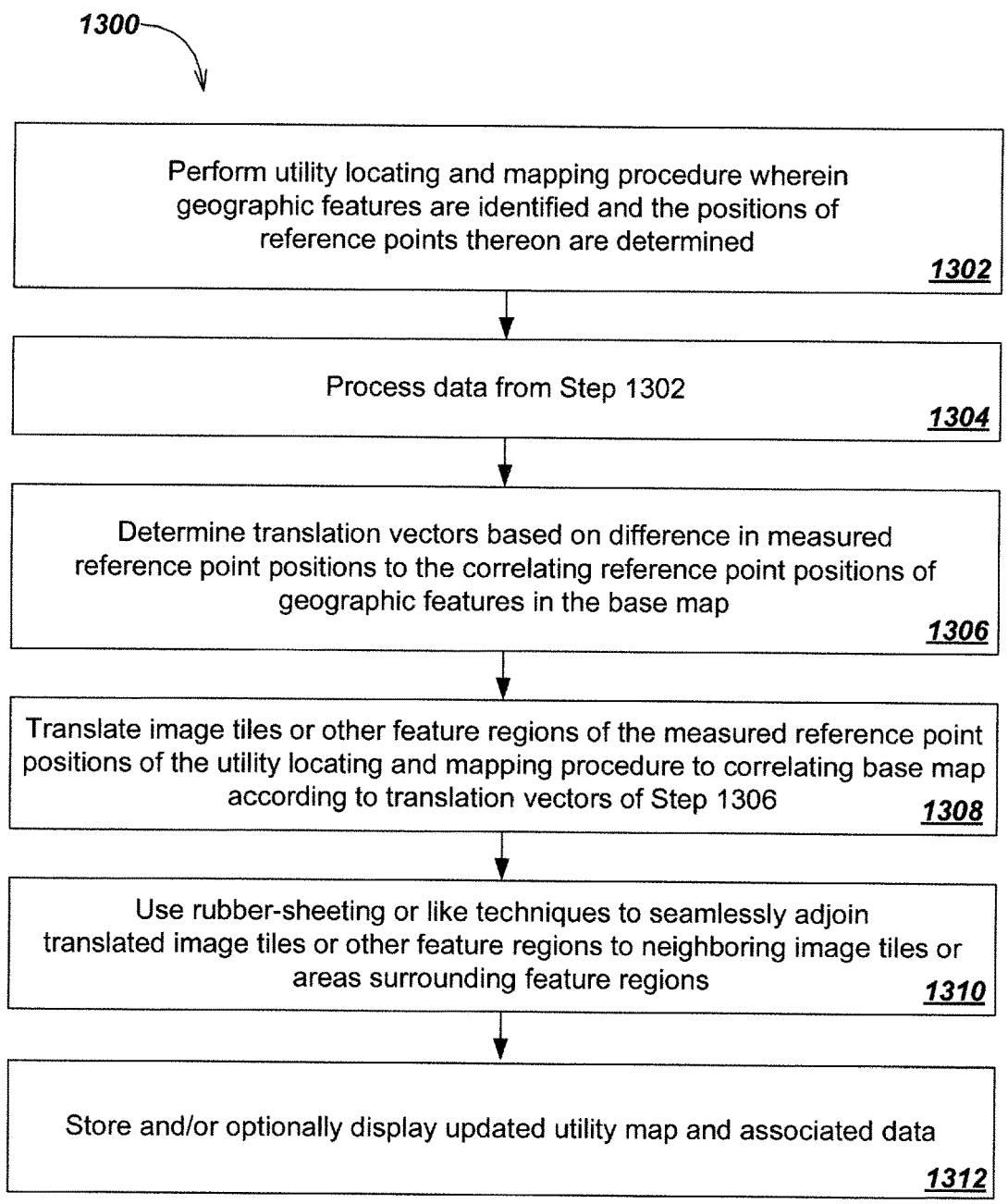
FIG. 13A is another method for geographic map updating to generate a utility locating map.

Turning to FIG. 13A, a method 1300 is disclosed having a step 1302 in which a utility locating and mapping procedure is performed wherein one or more geographic features are identified and the positions are determined via a reference point on each geographic feature. Such systems and methods for generating utility locating and mapping data as well as geographic feature data may be found in the incorporated U.S. patent application Ser. No. 15/866,360, filed Jan. 9, 2018, entitled TRACKED DISTANCE MEASURING DEVICES, SYSTEMS, AND METHODS. Exemplary systems and devices for carrying out step 1302 may, likewise, be described within the utility locating, mapping, and geographic feature identification system 700 illustrated in FIG. 7. For instance, a user equipped with a utility locator device, such as the utility locator device 765 of FIG. 7, may walk about an area and measure and map utility data. A user may also identify various geographic features within the locate area. The user may be equipped with a tracked distance measuring device, which may be a tracked distance measuring device 775 as illustrated in FIG. 7, for identifying and determining the position of a reference point on one or more geographic features. In such a utility locating and mapping operation, geographic features may generally be mapped to identify elements within the locate area that may influence magnetic data measured by the utility locator device. Optionally, the utility locating, mapping, and geographic feature identification system may photograph or otherwise generate imagery of the one or more geographic features. Such geographic features may further be found within a base map covering the same area in order to update and refine the geographic location of the map relative to the Earth's surface. Correlating of geographic features within a base map to those identified during the utility locating and mapping operation may include the use of pattern recognition or other machine learning algorithms or like techniques and algorithms to determine coinciding geographic features within the base map. In a step 1304, utility locating and geographic feature data gathered in step 1302 may be processed. The processing element or elements for carrying out the data processing for step 1304 may, in part or in full, be included within a utility locator device (e.g., utility locator device 765 of FIG. 7), tracked distance measuring device (e.g., tracked distance measuring device 775 of FIG. 7), a computing device such as a smartphone (e.g., smartphone 785 of FIG. 7) or laptop (e.g., computing device 665 of FIG. 6), and/or other computing device or system device (e.g., system device 900 of FIG. 9) capable of receiving and processing the utility locating and mapping data as well as geographic feature data. Likewise, processing of data may occur within a remote server or other cloud based computing system. The processing may occur in real time or near real time and/or fully or partially occur in a post processing procedure in one or more devices. In a step 1306, translation vectors may be determined based on differences in reference point positions measured in the utility locating and mapping procedure to correlating reference point positions of geographic features in the base map. In a step 1308, the image tiles or other feature regions containing the geographic features of the utility locating and mapping procedure and indexed utility positions may be translated according to the translation vectors of step 1306. In a step 1310, rubber-sheeting and/or other like techniques may be used to distort the boundaries of the image tile(s) or other feature region(s) allowing the one or more translated image tiles or feature regions to seamlessly adjoin with neighboring image tiles or feature regions while maintaining the positional accuracy of the updated geographic features. In a step 1312, an updated utility map may be stored or optionally displayed based on the translated features and utility positions and related data. The method 1300 may be carried out in post processing where the data has been stored in a database or may be done in real time or near real time and displayed on a locator display, laptop, smart phone, and/or other computing device.

The translation of geographic features of a base map based on updated geographic feature locations via utility locating and mapping procedure data of method 1300 of FIG. 13A is further illustrated in the sequence of FIGS. 13B-13E.

Figure 13B:
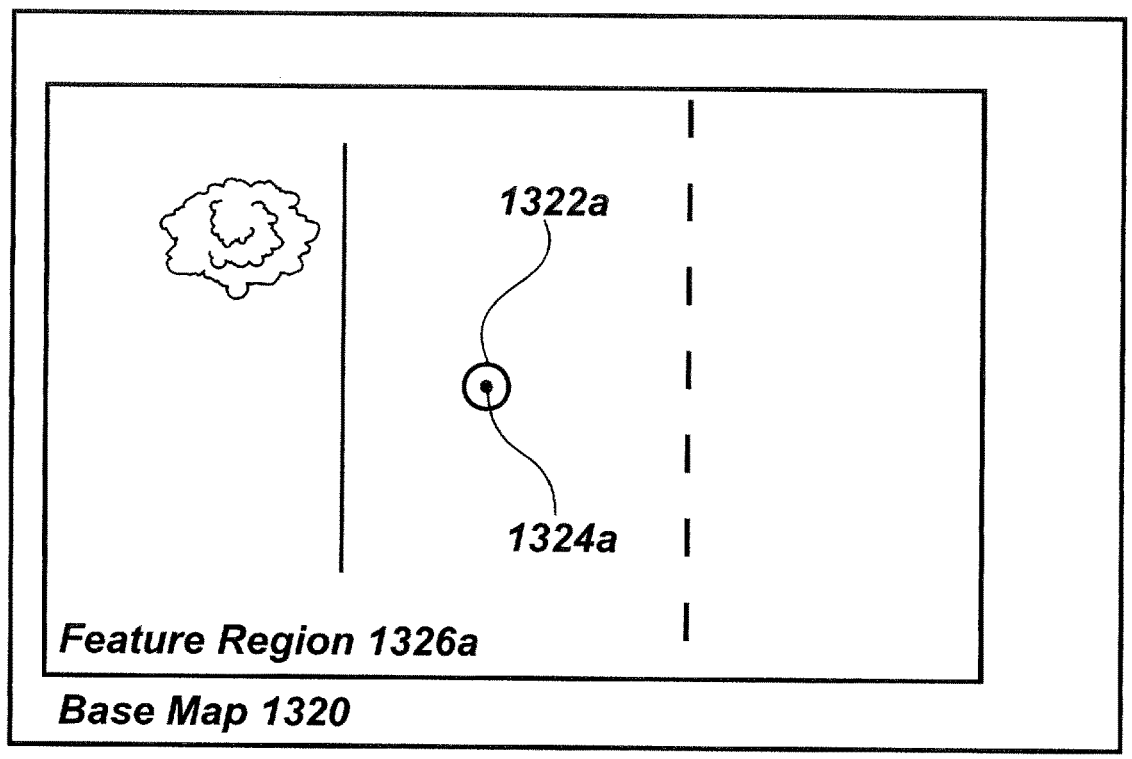
FIG. 13B is an illustration of a base map having at least one identified geographic feature with associated reference point.

As illustrated in FIG. 13B, a base map 1320 may indicate an initial location for a geographic feature 1322a with an initial reference point 1324a in a feature region 1326a. The base map 1320 may comprise a series of contiguous satellite or other aerial photographs or image tiles seamlessly joined together or other feature regions, such as feature region 1326a, that may represent the Earth's surface.

Figure 13C:
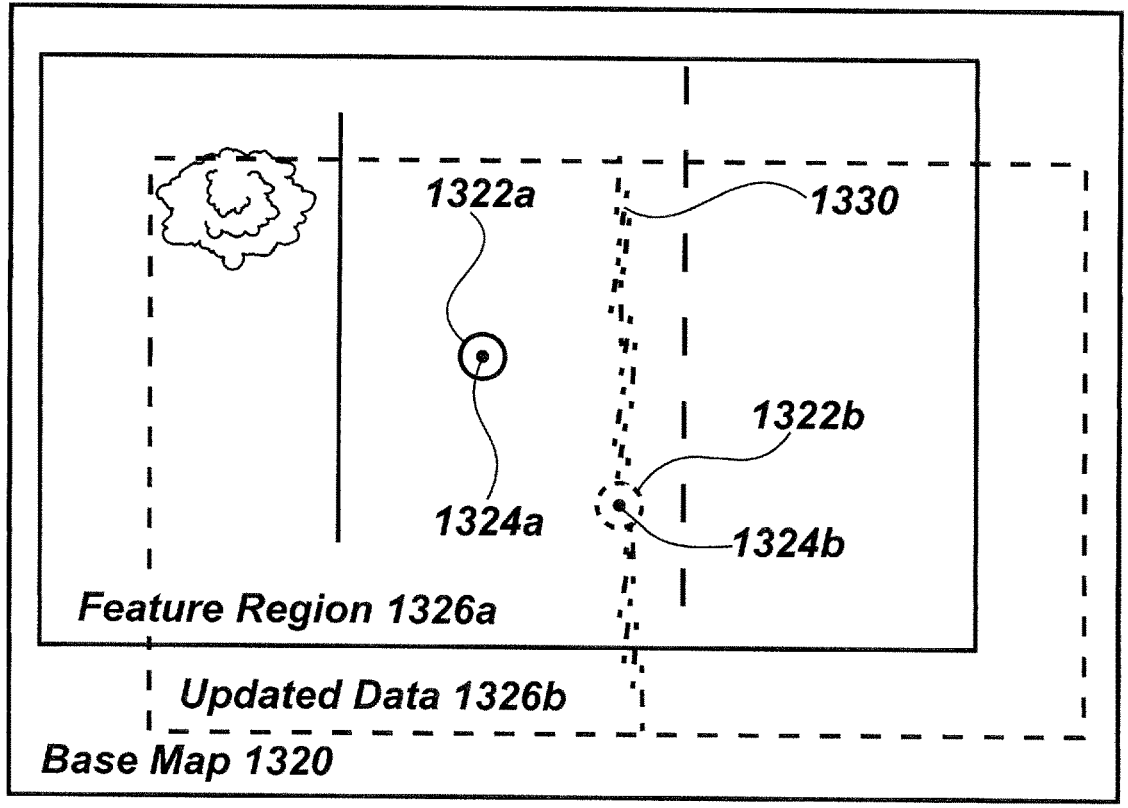
FIG. 13C is an illustration of the base map from step 13B overlaid with utility line position data relative to an updated position of the geographic feature as determined through a utility locating and mapping procedure.

Turning to FIG. 13C, during a utility locating and mapping procedure, updated data 1326b for a geographic feature 1322b with an updated reference point 1324b is determined which may have utility line positions and other utility data indexed thereto. The utility line position and related utility data is represented by a series of line segments 1330 in FIG. 13C.

Figure 13D:
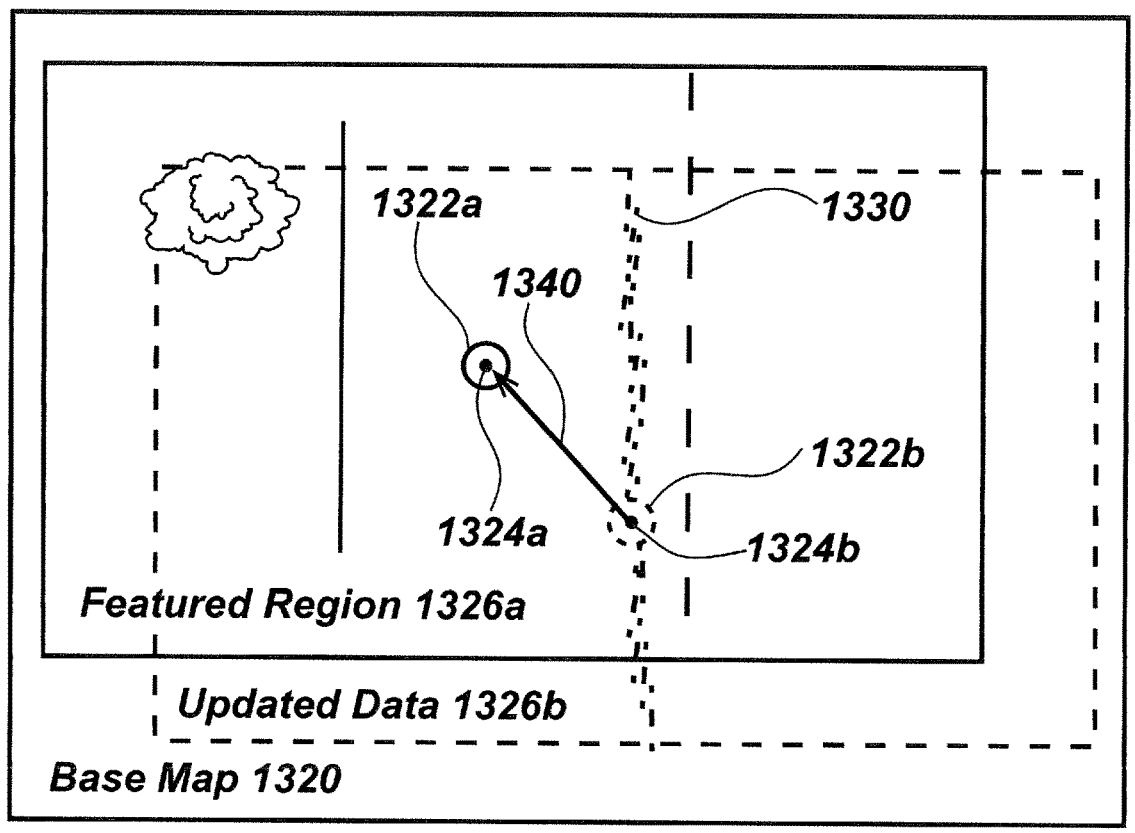
FIG. 13D is the illustration from FIG. 13C with a translation vector.

Turning to FIG. 13D, a translation vector 1340 may be determined between the updated reference point 1324b position determined by the utility locating and mapping procedure and the initial reference point 1324a in the feature region 1326a of the base map 1320. The updated data 1326b including the geographic feature 1322b and indexed line segments 1330 representative of utility line positions may translate along translation vector 1340 to the geographic feature 1322a location.

Figure 13E:
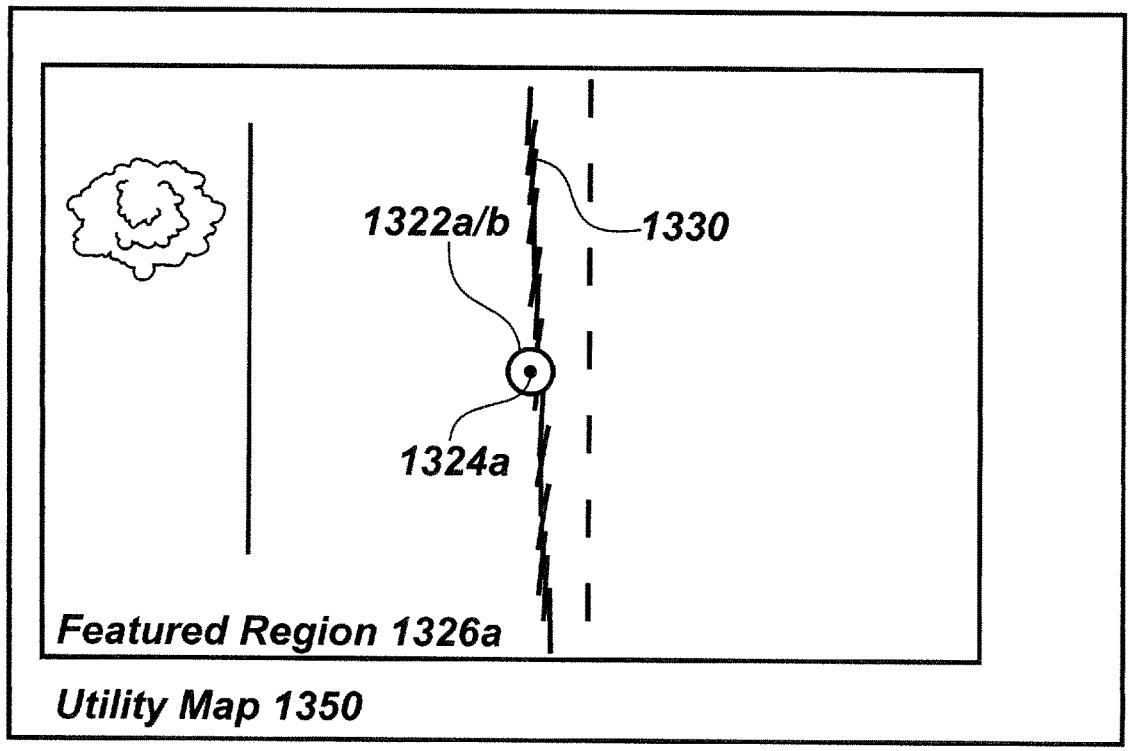
FIG. 13E is an illustration of a utility map having the utility line position determined by the utility locating and mapping procedure translated to the geographic feature position of the base map.

Turning to FIG. 13E, a utility map 1350 may be generated and optionally displayed and/or stored based on the image of the updated geographic feature 1322b and indexed utility line positions represented by line segments 1330 of updated data 1326b translated to the initial geographic feature 1322a position (illustrated as the alignment of geographic feature 1322a/b in FIG. 13E). In such utility mapping embodiments, GPS or other geolocation data associated with the updated data 1326b, including the line segments 1330 representative of utility line positions, may be preserved when the image of the updated data 1326b is translated. The translation of utility line data of the updated data 1326b to the original geographic feature 1322a of the base map 1320 may result in a utility map 1350 where a user may visually identify the location of utility lines existing beneath the ground relative to geographic features on the base map while the GPS or other world coordinate location data of the utilities may be preserved.

Figure 14A:
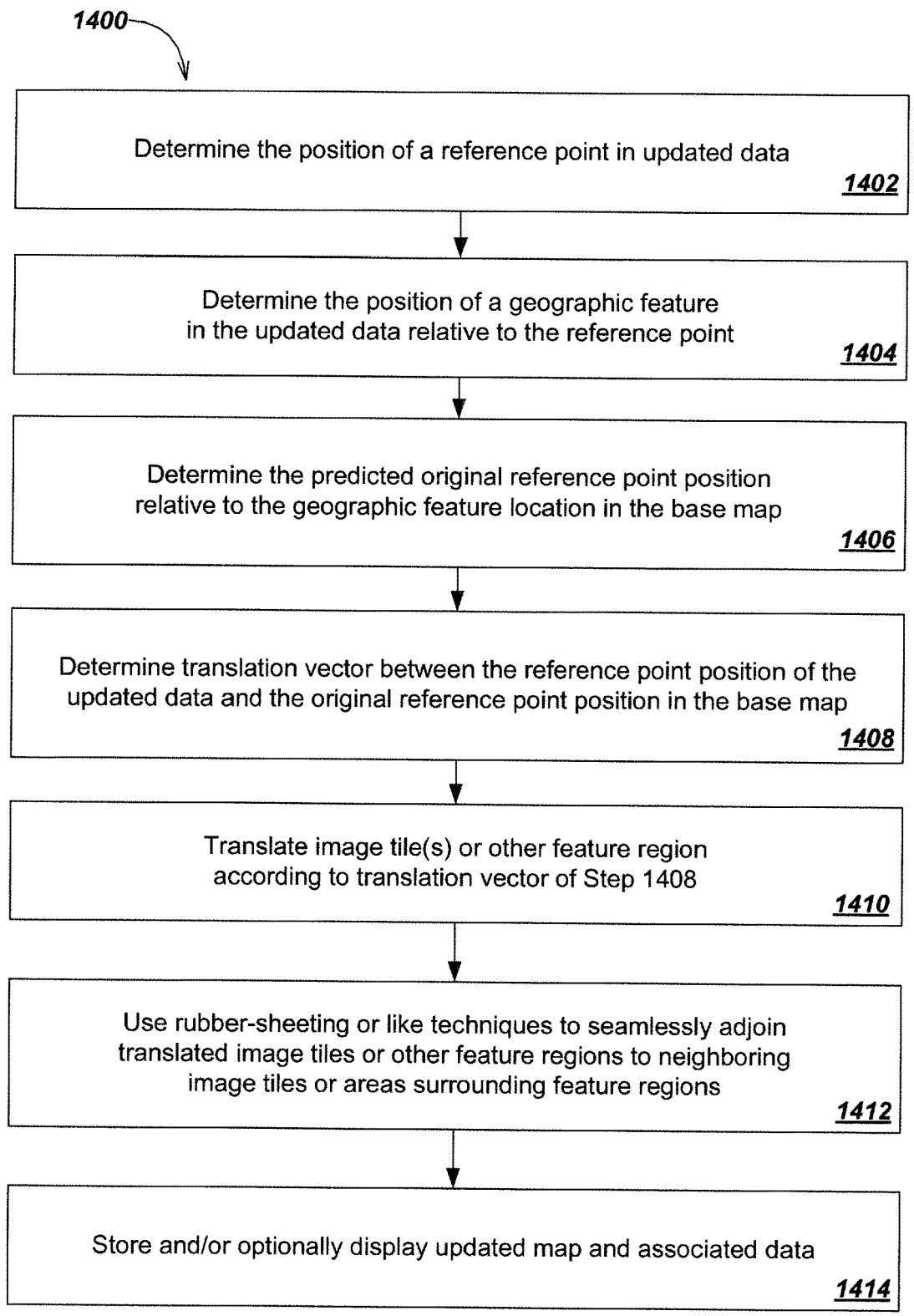
FIG. 14A is another method for geographic map updating wherein the reference point is physically separated from the geographic feature.

Turning to FIG. 14A, a method 1400 is described for map updating wherein the reference point exists in a physically separate location from a geographic feature. In a first step 1402, the position of a reference point is determined. For instance, the position of the reference point may be established via GPS or other global navigation satellite systems, LIDAR, inertial sensors, laser rangefinding devices, and/or other positioning systems. In some embodiments, such as in some embodiments employing utility locating and mapping devices and systems which may include vehicle-mounted locating devices and systems of U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES of the incorporated applications, the reference point may be established at intervals despite the known presence of a geographic feature. In a step 1404, the position of a geographic feature may be determined relative to the known position of the reference point in the updated data. For instance, knowing the tilt and scale of the updated data, the position of the geographic feature relative to the reference point may be calculated. In a step 1406, based on the position difference between the geographic feature and reference point of the updated data, the predicted position of a corresponding reference point in the base map may be determined. For instance, the same direction and distance between geographic feature and reference point of the updated data may be scaled and applied to the base map to predict the location of the reference point in the base map. In a step 1408, a translation vector between the reference point position of the updated data and the reference point of the base map is calculated. In some embodiments, the translation vector may be calculated between corresponding geographic features in the base map and updated data. The translation vectors may run from base map to updated data or from updated data to the base map depending on the desired resulting map. In a step 1410, the image tile(s) or other feature regions containing the geographic feature may be translated. In some embodiments, the updated data may translate to align with the base map. This may be a translation of all updated data or a translation of just visual information wherein the world coordinates and other metadata is preserved. For instance, a utility locating procedure may translate visual data, including utility positions, to corresponding locations of a pre-existing base map, allowing for a readily generated map where a user may visually identify the location of utility lines existing beneath the ground relative to base map geographic features while the GPS or other world coordinate location data of the utilities are preserved. In other embodiments, the feature regions of the base map may translate to the updated data. Such embodiments may result in maps having improved accuracy. In a step 1412, rubber-sheeting and/or other like techniques may be used to distort the boundaries of the image tile(s) or other feature region(s) allowing the one or more translated image tiles or feature regions to seamlessly adjoin with neighboring image tiles or feature regions. In a step 1414, an updated map and associated data may be stored or optionally displayed.

The translation of geographic features of a base map based on updated geographic feature locations using method 1400 of FIG. 14A is further illustrated in the sequence of FIGS. 14B-14E.

Figure 14B:
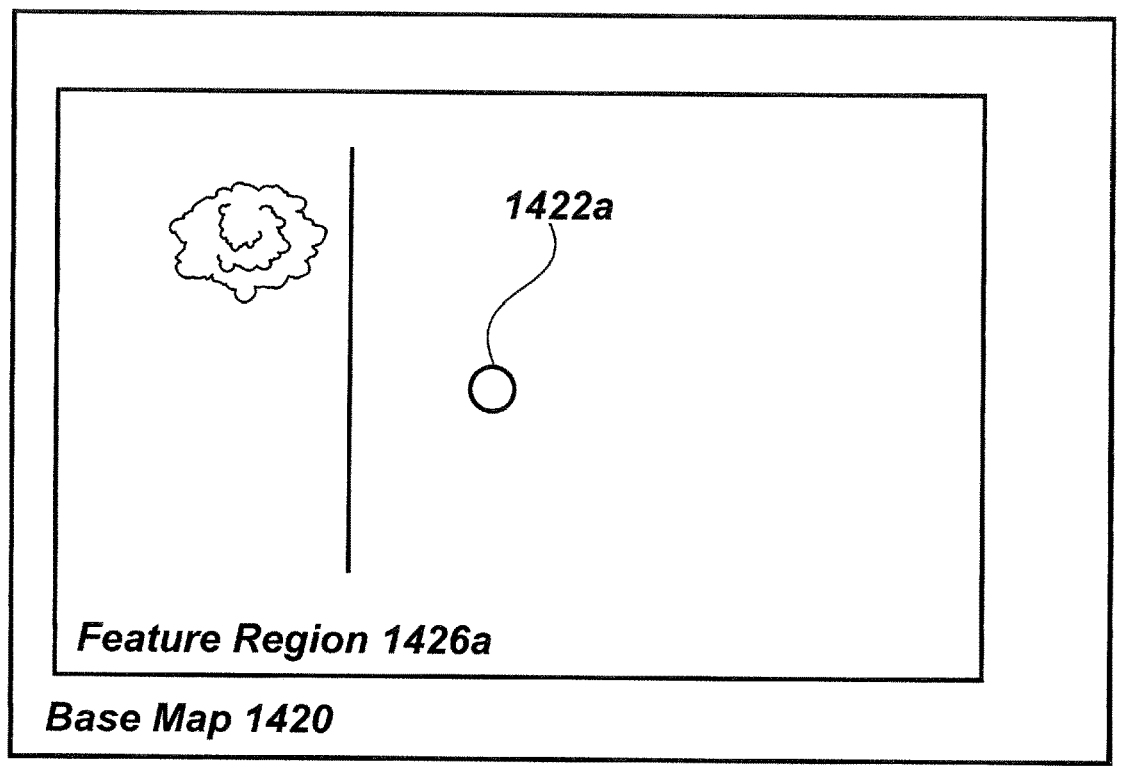
FIG. 14B is an illustration of a base map having at least one identified geographic feature with a reference point separated from the geographic feature.

As illustrated in FIG. 14B, a base map 1420 may indicate an initial location for a geographic feature 1422a in a feature region 1426a. The base map 1420 may comprise a series of contiguous satellite or other aerial photographs or image tiles seamlessly joined together or other feature regions, such as feature region 1426a, that may represent the Earth's surface.

Figure 14C:
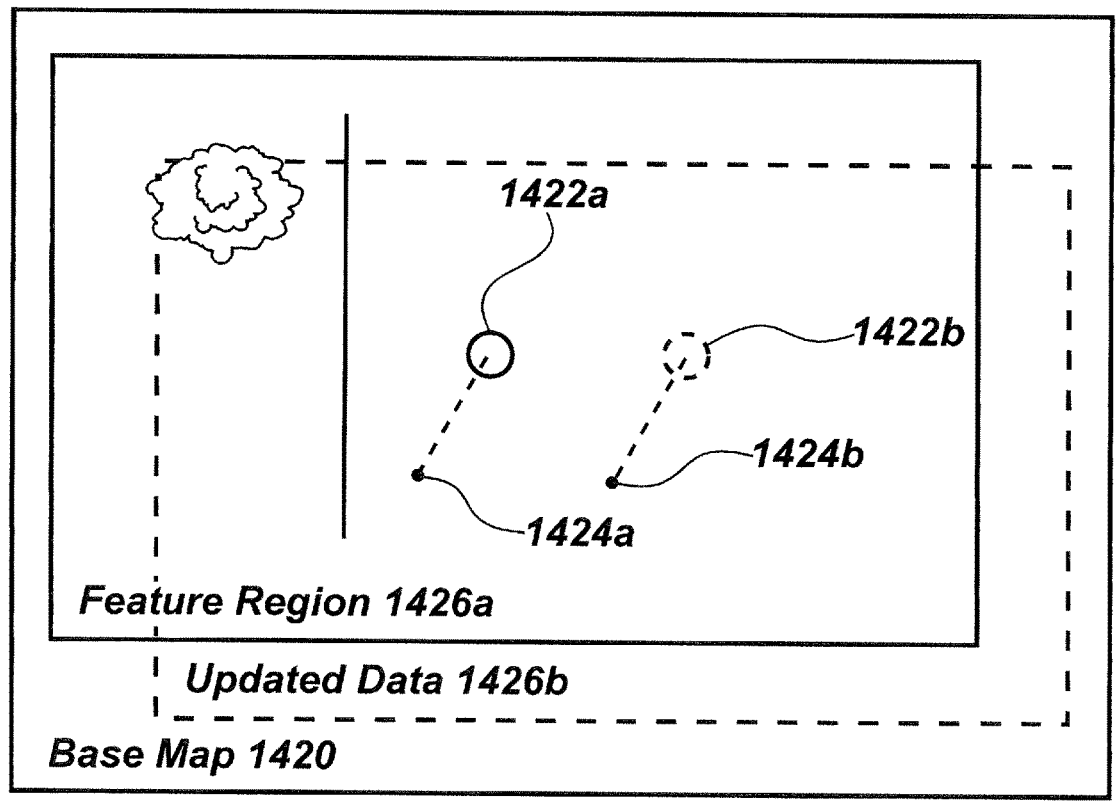
FIG. 14C is an illustration of the base map from step 14B overlaid with updated data overlaid and having an updated position of the geographic feature and a predicted updated position for a corresponding reference point.

Turning to FIG. 14C, updated data 1426b may be determined wherein a reference point 1424b is established having known position on the Earth's surface. For instance, a utility locating and mapping device which may be a vehicle-mounted locating device may periodically determine a precise location of a reference point along the Earth's surface. The reference point 1424b may be a known distance and direction towards a geographic feature 1422b in the updated data 1426b. The updated geographic feature 1422b may further correspond to a geographic feature 1422a of the base map 1420. Wherein the scale and tilt of the updated data 1426b is known relative to the base map 1420, the known distance and direction from the geographic feature 1422a may be used to predict the location of a corresponding reference point 1424a in base map 1420.

Figure 14D:
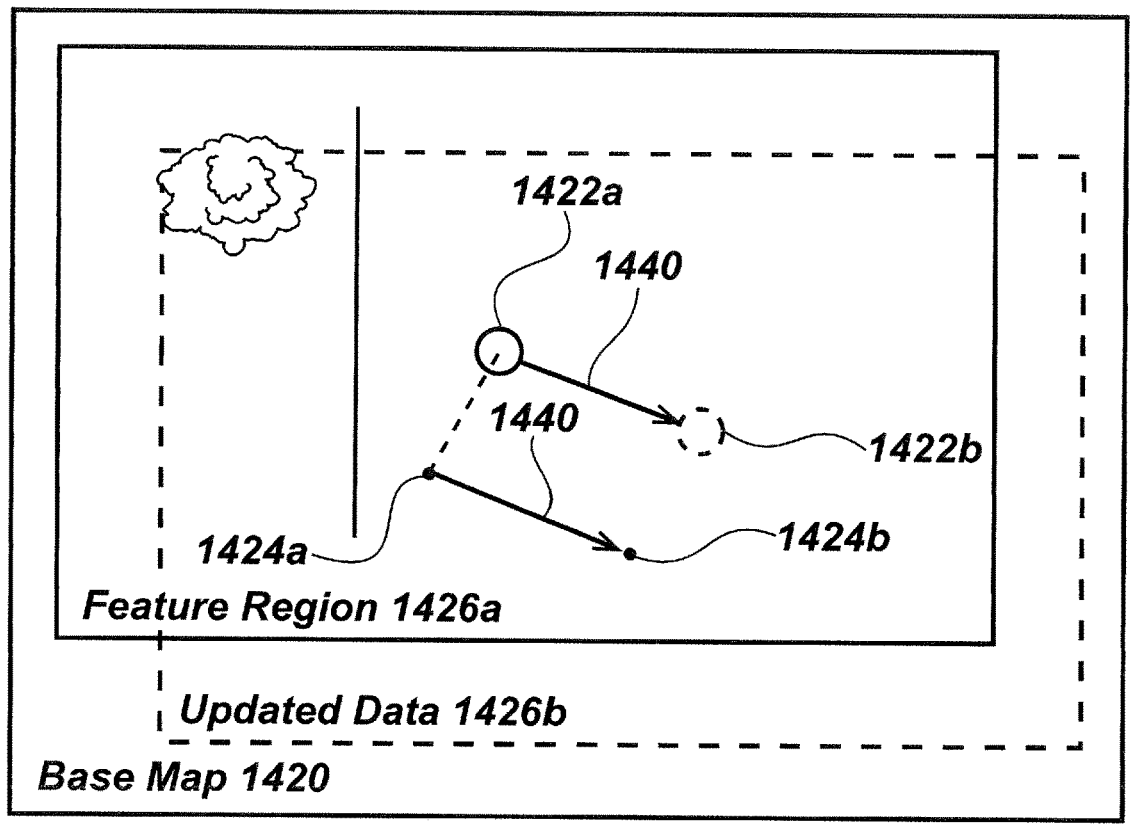
FIG. 14D is the illustration from FIG. 14C with a translation vector.

Turning to FIG. 14D, a translation vector 1440 may be determined between the predicted reference point 1424a position and the updated reference point 1424b and/or between the base map 1420 geographic feature 1422a and the updated data 1426b geographic feature 1422b allowing the feature region 1426a to translate to the updated data 1426b position. In other embodiments, the translation vectors 1440 may be reversed such that the updated data 1426b may visually or fully translate to align to the predicted reference point 1424a and geographic feature 1422a locations.

Figure 14E:
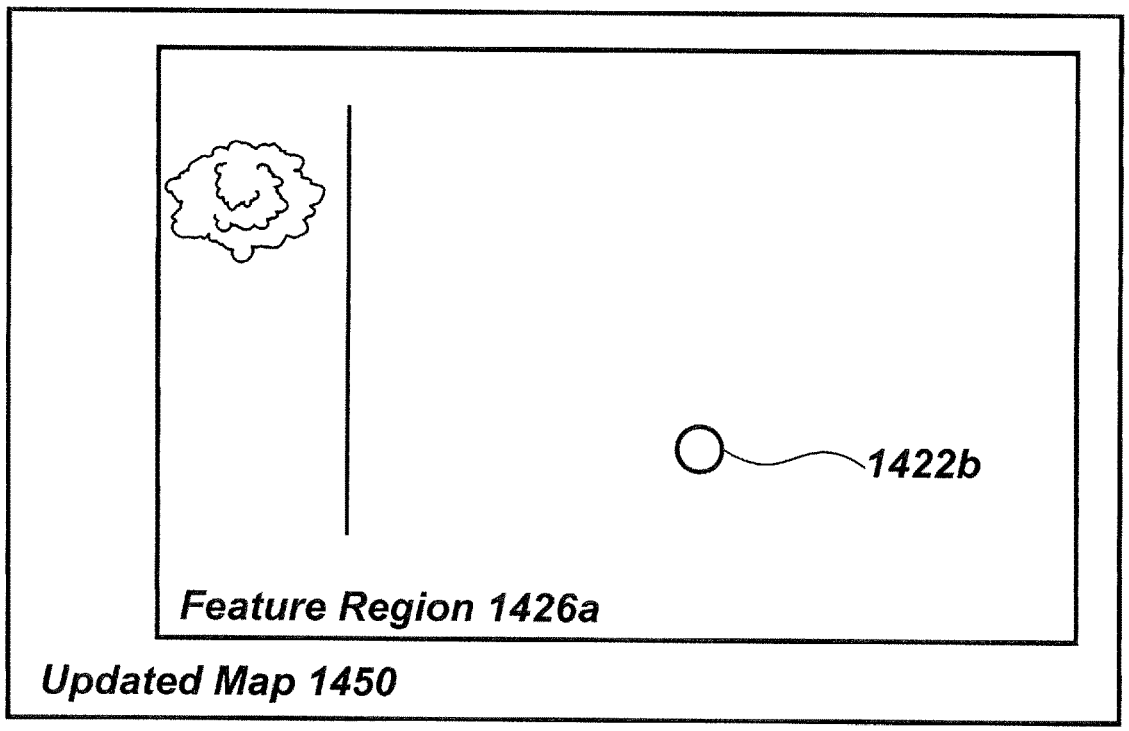
FIG. 14E is an illustration of an updated map wherein the feature region containing the geographic feature is translated.

Turning to FIG. 14E, an updated map 1450 may be generated and optionally displayed and/or stored based on the translation of the feature region 1426a or, in other embodiments, the translation of the updated data 1426b.

In one or more exemplary embodiments, the functions, methods and processes described herein may be implemented in whole or in part in hardware, software, firmware, or any combination thereof. If implemented in software, the functions may be stored on or encoded as one or more instructions or code on a non-transitory processor-readable medium and may be executed in one or more processing elements. Processor-readable media includes computer storage media. Storage media may be any available media that can be accessed by a computer, processor, or other programmable digital device.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. Any method claims may present elements of the various steps in a sample order, and are not meant to be limited to the specific order or hierarchy presented unless explicitly noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps may have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, processes, methods, and/or circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other device. In the alternative, the processor and the storage medium may reside as discrete components. Instructions to be read and executed by a processing element to implement the various methods, processes, and algorithms disclosed herein may be stored in a memory or memories of the devices disclosed herein.

The scope of the invention is not intended to be limited to the aspects shown herein, but is to be accorded the full scope consistent with the disclosures herein and their equivalents, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

It is noted that as used herein that the terms "component," "unit," "element," or other singular terms may refer to two or more of those members. For example, a "component" may comprise multiple components. Moreover, the terms "component," "unit," "element," or other descriptive terms may be used to describe a general feature or function of a group of components, units, elements, or other items. For example, an "RFID unit" may refer to the primary function of the unit, but the physical unit may include non-RFID components, sub-units, and such.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosure. Thus, the presently claimed invention is not intended to be limited solely to the aspects shown herein but is to be accorded the widest scope consistent with the disclosures herein, the associated drawings, and their equivalents as reflected by the claims.

We claim:

1. A geographic map updating system, comprising:
a base map element, including a data representation of an area displaying features thereof; and
an update element, comprising:
a geographic feature identification element, to identify geographic features coinciding with those of the base map element;
a position element for determining a position of the identified geographic features based on provided positional data;
a processing element for comparing the base map element and the update element to determine and generate an updated map;
a non-transitory electronic data storage element for storing the base map element data, update element data, and corresponding updated map data, wherein the update element includes a dipole tracked distance measuring system, comprising:
a signal tracking device, comprising:
one or more magnetic field antenna arrays;
one or more positioning elements for determining the location of a signal tracking element in three dimensional space;
at least one processing element for processing received dipole signals and data signals from the signal tracking device;
a data storage element for storing geographic feature location data and other signal data; and
a tracked distance measuring device, comprising:
a body;
a rangefinder element for measuring distance to a geographic feature;
an alternating current (AC) signal generator;
a magnetic field dipole antenna; and
an actuator for initiating generation of an electromagnetic signal in conjunction with measuring distance;
wherein the electromagnetic dipole signal is generated in conjunction with measuring of a distance by the rangefinder element and wherein information associated with a position of the tracked distance measuring device is determined in the at least one processing element of the signal tracking element based on receiving and processing the electromagnetic dipole signal in the one or more magnetic field antenna arrays.

2. A geographic map updating system, comprising:
a base map element, including a data representation of an area displaying features thereof; and
an update element, comprising:
a mapping buried utility locator including at least one processing element programmed to provide a geographic feature identification element to identify geographic features coinciding with those of the base map element, wherein the geographic feature includes one or more of a manhole cover, an identifiable street, a sidewalk, a direction arrow painted on a street, a painted street element, and an intersection between ground surfaces such as asphalt, concrete, grass, dirt, or other like material;
a position element for determining a position of the identified geographic features based on provided positional data;
at least one processing element for comparing the base map element and the update element to determine and generate an updated map; and
a non-transitory electronic data storage element for storing data representations of the base map element, update element, and corresponding updated map;
wherein the position element includes a global navigation satellite system receiver for providing the positional data to the position element.

3. A geographic map updating system, comprising:
a base map element, including a data representation of an area displaying features thereof; and
an update element, comprising:
a mapping buried utility locator including at least one processing element programmed to provide a geographic feature identification element to identify geographic features coinciding with those of the base map element;
a position element for determining a position of the identified geographic features based on provided positional data;
at least one processing element for comparing the base map element and the update element to determine and generate an updated map; and
a non-transitory electronic data storage element for storing data representations of the base map element, update element, and corresponding updated map;
wherein the position element includes an inertial navigation system for providing the positional data to the position element.

4. A geographic map updating system, comprising:
a base map element including a data representation of an area displaying features thereof; and
an update element, comprising:
a mapping buried utility locator including at least one processing element programmed to provide a geographic feature identification element to identify geographic features coinciding with those of the base map element;
a position element for determining a position of the identified geographic features based on provided positional data;
at least, one processing element for comparing the base map element and the update element to determine and generate an updated map; and
a non-transitory electronic data storage element for storing data representations of the base map element, update element, and corresponding updated map;
wherein the position element includes a rangefinder system for providing the positional data to the position element.

5. A geographic map updating system, comprising:
a base map element, including a data representation of an area displaying features thereof; and
an update element, comprising:
a mapping buried utility locator including at least one processing element programmed to provide a geographic feature identification element to identify geographic features coinciding with those of the base map element;
a position element for determining a position of the identified geographic features based on provided positional data;
at least one processing element for comparing the base map element and the update element to determine and generate an updated map; and
a non-transitory electronic data storage element for storing data representations of the base map element, update element, and corresponding updated map;
wherein the base map element includes one or more satellite or other aerial photographic images, image tiles, or other feature regions organized so as to be joined together to represent all or a portion of the Earth's surface.

6. A geographic map updating system, comprising:
a base map element, including a data representation of an area displaying features thereof; and
an update element, comprising:
a mapping buried utility locator including at least one processing element programmed to provide a geographic feature identification element to identify geographic features coinciding with those of the base map element;
a position element for determining a position of the identified geographic features based on provided positional data;
at least one processing element for comparing the base map element and the update element to determine and generate an updated map; and
a non-transitory electronic data storage element for storing data representations of the base map element, update element, and corresponding updated map;
wherein the update element includes a mapping buried utility locator, comprising:
a locator housing;
a front end subsystem, coupled to or disposed in the locator housing, comprising a plurality of magnetic field antenna arrays and a receiver circuit coupled thereto, the plurality of antenna arrays including at least a first antenna array located at a first position and a second antenna array located at a second position, spatially separated from the first position, the front end subsystem configured to receive, simultaneously at the first position and the second position, an ambient magnetic field electromagnetic signal;
positioning elements, disposed in the locator housing and coupled to the front end subsystem, comprising one or more global navigation systems and/or real time kinematic (RTK) systems antennas and a receiver circuitry coupled thereto, for generating location data;
a geographic feature identification element, generating a location for geographic features within a work environment;
the at least one processing element, disposed in the locator housing and coupled to the front end subsystem, programmed to process a first measurement of an ambient electromagnetic signal at the first position, and a second measurement of the ambient electromagnetic signal at the second position, and determine, based at least in part on the first measurement and the second measurement, information pertaining to a buried conductor corresponding to location data generated by the positioning elements as well as geographic feature locations; and
a non-transitory electronic memory coupled to the at least one processing element to store the determined information pertaining to the buried conductor; wherein the ambient electromagnetic signal includes a combination of a direct magnetic field signal emitted from a radio transmitting antenna and a magnetic field signal emitted from the buried conductor resulting from electromagnetic coupling of the direct magnetic field signal to the buried conductor.

7. The system of claim 1, further comprising an electronic display device.

8. The system of claim 1, wherein the base map element comprises a series of contiguous satellite and/or aerial photographs or images joined or tiled together to represent the Earth's surface.

9. The system of claim 8, wherein the series of contiguous satellite and/or aerial photographs or images joined or tiled together form one or more image tiles of an area surrounding the geographic feature that is predefined or user defined or defined by machine algorithms.

10. The system of claim 9, wherein the image tiles are seamlessly joined together.

11. The system of claim 1, wherein the identified geographic features include one or more of manhole covers, identifiable street, sidewalk, or other infrastructure elements.

12. The system of claim 11, wherein the identifiable street, sidewalk, or other infrastructure elements include painted or otherwise human created marks such as the tip of a direction arrow painted on a street, and/or other elements along the Earth's surface.

13. The system of claim 1, wherein the positional data includes a location having latitudinal and longitudinal world coordinates.

14. The system of claim 1, wherein the positional data includes orientation data.

* * * * *